United States Patent
Ishiwata et al.

(10) Patent No.: US 9,593,194 B2
(45) Date of Patent: *Mar. 14, 2017

(54) METHOD FOR PRODUCING OLEFIN BLOCK POLYMER USING GROUP 4 TRANSITION METAL COMPLEX

(71) Applicant: Sumitomo Chemical Company, Limited, Chuo-ku, Tokyo (JP)

(72) Inventors: Koji Ishiwata, Ichihara (JP); Masato Takano, Ichihara (JP); Kazuo Takaoki, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/176,537

(22) Filed: Feb. 10, 2014

(65) Prior Publication Data

US 2014/0163173 A1 Jun. 12, 2014

Related U.S. Application Data

(63) Continuation-in-part of application No. PCT/JP2012/070565, filed on Aug. 10, 2012.

(30) Foreign Application Priority Data

Aug. 11, 2011 (JP) ................. 2011-175677

(51) Int. Cl.
C08L 23/16 (2006.01)
C08F 255/04 (2006.01)
C08L 23/08 (2006.01)
C08F 210/16 (2006.01)
C08F 297/08 (2006.01)
C08L 23/12 (2006.01)

(52) U.S. Cl.
CPC .......... C08F 255/04 (2013.01); C08F 210/16 (2013.01); C08F 297/083 (2013.01); C08L 23/0807 (2013.01); C08L 23/12 (2013.01); C08L 23/16 (2013.01); C08L 2207/02 (2013.01); C08L 2308/00 (2013.01)

(58) Field of Classification Search
CPC ............. C08L 2207/02; C08L 2207/10; C08L 2207/12; C08L 2207/14
See application file for complete search history.

(56) References Cited

U.S. PATENT DOCUMENTS

| | | | |
|---|---|---|---|
| 9,303,112 B2 * | 4/2016 | Shimano | C08L 23/12 |
| 2001/0021732 A1 | 9/2001 | Terano et al. | |
| 2003/0119996 A1 | 6/2003 | Kitano et al. | |
| 2004/0072957 A1 * | 4/2004 | Terano et al. | 525/323 |
| 2004/0176520 A1 | 9/2004 | Machida et al. | |
| 2008/0221256 A1 | 9/2008 | Kanzaki | |

(Continued)

FOREIGN PATENT DOCUMENTS

| | | |
|---|---|---|
| CN | 101255255 A | 9/2008 |
| EP | 0534776 A1 | 3/1993 |

(Continued)

OTHER PUBLICATIONS

Int'l Search Report and Written Opinion issued Oct. 30, 2012 in Int'l Application No. PCT/JP2012/070565.

(Continued)

*Primary Examiner* — Mark Kaucher
(74) *Attorney, Agent, or Firm* — Panitch Schwarze Belisario & Nadel LLP

(57) ABSTRACT

A method for producing an olefin block polymer, the method including: polymerizing olefins using a polymerization catalyst (X) and an organometallic compound (C) containing an atom of any of Groups 2, 12, and 13 of the periodic table of the elements, the organometallic compound (C) excluding an activating co-catalyst agent (B), wherein the polymerization catalyst (X) is formed by bringing a transition metal compound (A) into contact with the activating co-catalyst agent (B), the transition metal compound (A) is represented by the following general formula (1), and the activating co-catalyst agent (B) is selected from among an organoaluminumoxy compound (B-1), an organoboron compound (B-2), a zinc co-catalyst component (B-3), and ion-exchange layered silicate (B-4).

[Chem. 1]

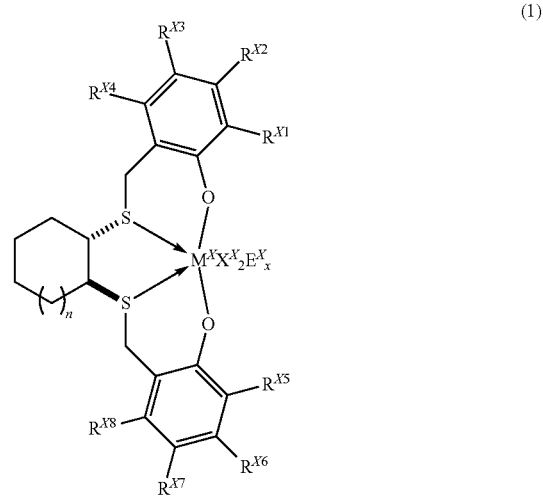

(1)

17 Claims, No Drawings

(56) References Cited

U.S. PATENT DOCUMENTS

| | | |
|---|---|---|
| 2009/0221770 A1 | 9/2009 | Klosin et al. |
| 2011/0082249 A1 | 4/2011 | Shan et al. |
| 2011/0082257 A1 | 4/2011 | Carnahan et al. |
| 2011/0082258 A1 | 4/2011 | Walton et al. |
| 2011/0313106 A1 | 12/2011 | Shan et al. |
| 2011/0313107 A1 | 12/2011 | Shan et al. |
| 2011/0313108 A1 | 12/2011 | Shan et al. |
| 2012/0245296 A1 | 9/2012 | Nakajima et al. |
| 2012/0245297 A1 | 9/2012 | Nakajima et al. |
| 2012/0245302 A1 | 9/2012 | Nakajima et al. |
| 2013/0035462 A1 | 2/2013 | Ishi et al. |
| 2013/0059991 A1 | 3/2013 | Ishii et al. |

FOREIGN PATENT DOCUMENTS

| | | |
|---|---|---|
| JP | S56-125442 A | 10/1981 |
| JP | S58210949 A | 12/1983 |
| JP | H09-241334 A | 9/1997 |
| JP | 2003171515 A | 6/2003 |
| JP | 2004182981 A | 7/2004 |
| JP | 2010-126557 A | 6/2010 |
| JP | 2012-236994 A | 12/2012 |
| JP | 2013-166898 A | 8/2013 |
| WO | 9421700 A1 | 9/1994 |
| WO | 2007035485 A1 | 3/2007 |
| WO | 2009027516 A1 | 3/2009 |
| WO | 2011041696 A1 | 4/2011 |
| WO | 2011041698 A1 | 4/2011 |
| WO | 2011041699 A1 | 4/2011 |
| WO | 2011099583 A1 | 8/2011 |
| WO | 2011099584 A1 | 8/2011 |
| WO | 2011163187 A1 | 12/2011 |
| WO | 2011163189 A1 | 12/2011 |
| WO | 2011163191 A1 | 12/2011 |
| WO | 2013022102 A1 | 2/2013 |

OTHER PUBLICATIONS

Hustad et al, "Continuous Production of Ehylene-Based Diblock Copolymers Using Coordinative Chain Transfer Polymerization," Macromolecules, vol. 40, pp. 7061-7064 (2007).

Toda et al, "Synthesis and structure of dialkyl zirconium complexes with an [OSSO]-type bis (phenolate) ligand bearing a trans-1,2-cyclooctanediylbis (thio) unit," Journal of Organometallic Chemistry, vol. 696, pp. 1258-1261 (Mar. 15, 2011).

Ishii et al, "Zirconium Complex of an [OSSO]-Type Diphenolate Ligand Bearing trans-1,2-Cyclooctanediylbis (thio) Core: Synthesis, Structure, and Isospecific 1-Hexene Polymerization," Journal of American Chemical Society, vol. 131, pp. 13566-13567 (2009).

Nakata et al, "Recent advances in the chemistry of Group 4 metal complexes incorporating [OSSO]-type bis (phenolato) ligands as post-metallocene catalysts," Polymer Chemistry, vol. 2, pp. 1597-1610 (Mar. 16, 2011).

Int'l Preliminary Report on Patentability and Written Opinion issued Feb. 11, 2014 in Int'l Application No. PCT/JP2012/070565.

Office Action issued May 4, 2015 in CN 201280039137.7.

Office Action issued Mar. 23, 2016 in CN Application No. 201280039137.7.

Office Action issued Jan. 12, 2016 in JP Application No. 2013528087.

Office Action issued Jan. 2, 2015 in U.S. Appl. No. 14/028,768, by Shimano.

Office Action issued Aug. 14, 2015 in U.S. Appl. No. 14/028,768, by Shimano.

Office Action issued Dec. 13, 2016 in CN Application No. 201280039137.7.

\* cited by examiner

METHOD FOR PRODUCING OLEFIN BLOCK POLYMER USING GROUP 4 TRANSITION METAL COMPLEX

CROSS-REFERENCE TO RELATED APPLICATIONS

This application is a Continuation-in-part of PCT International Application No. PCT/JP2012/070565 filed in Japan on Aug. 10, 2012, which claims the benefit of Patent Application No. 2011-175677 filed in Japan on Aug. 11, 2011, the entire contents of which are hereby incorporated by reference.

TECHNICAL FIELD

The present invention relates to a method for producing an olefin block polymer using a group 4 transitional metal complex.

BACKGROUND ART

A block polymer, in which two or more segments which differ in property are chemically linked, has been known to exhibit excellent physical properties. For example, in a case where a specific block polymer having segments compatible with respective phases of a mixture of incompatible resins is added to the mixture, the block polymer serves both as a compatibilizer which controls a morphology of a dispersed phase by acting on an interface between the phases of the mixture and as a modifier which improves physical properties, such as impact resistance, of the mixture.

It has been known that, in a case where olefins are polymerized under a proper condition with use of (i) a polymerization catalyst containing a specific transition metal compound and (ii) a specific organometallic compound (organoaluminum compound, organozinc compound, organogallium compound, or the like), reversible chain transfer polymerization proceeds, that is to say that a growing polymer chain reversibly transfers, between the transition metal compound, which is catalytic active species, and the organometallic compound. By making use of the reversible chain transfer polymerization, it is possible to synthesize an olefin block polymer.

For example, Non-patent Literature 1 and Patent Literature 1 disclose methods for obtaining an olefin block polymer by solution polymerization performed with a transition metal compound and an organoaluminum compound or an organozinc compound by use of polymerization tanks containing respective olefins differing in composition and are connected in series. Patent Literature 2 discloses a method for obtaining an olefin block polymer by sequentially adding, under equivalent polymerization conditions, two transition metal compounds which differ in copolymerizability.

CITATION LIST

Patent Literatures

Patent Literature 1
International publication No. WO 2007/035485 (Publication Date: Mar. 29, 2007)
Patent Literature 2
Japanese Patent Application Publication, Tokukai, No. 2010-126557 A (Publication Date: Jun. 10, 2010)

Nonpatent Literature

Nonpatent literature 1
Hustad, P. D.; Kuhlman, R. L.; Arriola, D. J.; Carnahan, E. M.; Wenzel, T. T. Macromolecules 2007, 40, 7061-7064

SUMMARY OF INVENTION

Technical Problem

Conventional synthesis of an olefin block polymer by reversible chain transfer polymerization produces a polymer which contains, as a by-product, a polymer that is not bound to other polymers. The conventional synthesis of an olefin block polymer by reversible chain transfer polymerization was therefore not necessarily satisfactory in terms of efficiency in producing the olefin block polymer. In view of this, an object of the present invention is to provide a method for producing an olefin block polymer by reversible chain transfer polymerization, in which method less by-products are produced and the olefin block polymer is produced with high efficiency.

Solution to Problem

The present invention relates to a method for producing an olefin block polymer, the method comprising:
polymerizing olefins using a polymerization catalyst (X) and an organometallic compound (C) containing an atom of any of Groups 2, 12, and 13 of the periodic table of the elements, the organometallic compound (C) excluding an activating co-catalyst agent (B),
wherein the polymerization catalyst (X) is formed by bringing a transition metal compound (A) into contact with an activating co-catalyst agent (B),
the transition metal compound (A) is represented by the following general formula (1), and
the activating co-catalyst agent (B) is selected from among an organoaluminumoxy compound (B-1), an organoboron compound (B-2), a zinc co-catalyst component (B-3), and ion-exchange layered silicate (B-4).

[Chem. 1]

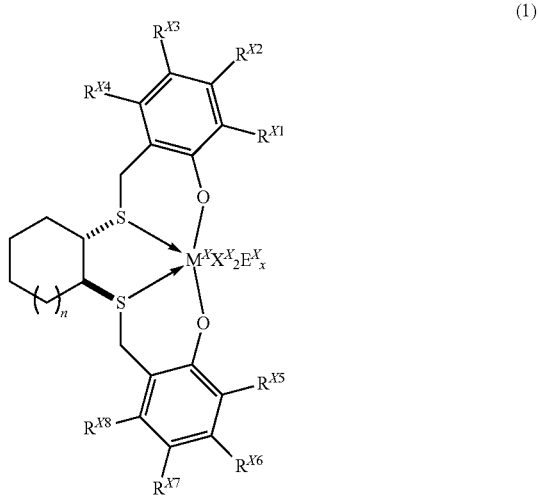

(1)

n is 1, 2, or 3.
$M^X$ represents a titanium atom, a zirconium atom, or a hafnium atom.
$R^{X1}$ to $R^{X8}$ are independently
a hydrogen atom,
a halogen atom,
an alkyl group having 1 to 20 carbon atoms,
a cycloalkyl group having 3 to 10 ring carbon atoms, an alkenyl group having 2 to 20 carbon atoms,
an alkynyl group having 2 to 20 carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group, or
a heterocyclic compound residue having 3 to 20 ring carbon atoms.

The alkyl groups, the cycloalkyl groups, the alkenyl groups, the alkynyl groups, the aralkyl groups, the aryl groups, the alkoxy groups, the aralkyloxy groups, the aryloxy groups, and the heterocyclic compound residues represented by $R^{X1}$ to $R^{X8}$ each optionally have a substituent.

Notwithstanding the above definitions of $R^{X1}$ to $R^{X8}$, each of the following pairs, $R^{X1}$ and $R^{X2}$, $R^{X2}$ and $R^{X3}$, $R^{X3}$ and $R^{X4}$, $R^{X5}$ and $R^{X6}$, $R^{X6}$ and $R^{X7}$, and $R^{X7}$ and $R^{X8}$, are optionally linked to each other to form a ring optionally having a substituent.

Each $X^X$ is independently
a hydrogen atom,
a halogen atom,
an alkyl group having 1 to 20 carbon atoms,
a cycloalkyl group having 3 to 10 ring carbon atoms,
an alkenyl group having 2 to 20 carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group having 1 to 20 carbon atoms,
a substituted amino group having 1 to 20 carbon atoms,
a substituted thiolate group having 1 to 20 carbon atoms, or
a carboxylate group having 1 to 20 carbon atoms.

The alkyl group, the cycloalkyl group, the alkenyl group, the aralkyl group, the aryl group, the alkoxy group, the aralkyloxy group, the aryloxy group, and the carboxylate group represented by $X^X$ optionally have a substituent.

$X^X$ groups are optionally linked to each other to form a ring.

$E^X$ is independently a neutral Lewis base. The subscript x representing the number of $E^X$ groups is 0, 1, or 2. When the subscript x is 2, the $E^X$ groups are the same or different.

Advantageous Effects of Invention

The method of the present invention makes it possible to obtain, via synthesis of an olefin block polymer by reversible chain transfer polymerization, an olefin block polymer which is produced with high efficiency. Furthermore, in a case, for example, where the olefin block polymer produced with high efficiency is mixed with a polypropylene resin composition, the olefin block polymer enables improvements in rigidity and impact resistance.

DESCRIPTION OF EMBODIMENTS

The following description will discuss a specific method of the present invention for producing an olefin block polymer.

Transition Metal Compound (A)

A transition metal compound (A) used in the present invention is represented by the following general formula (1). The following description will discuss the transition metal compound (A) represented by the formula (1).

[Chem. 2]

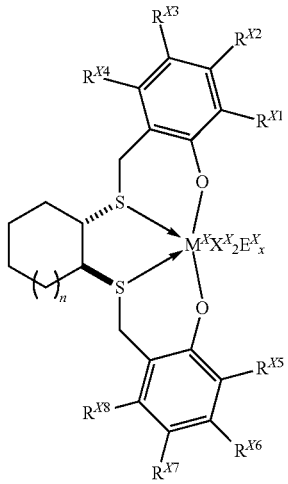

(1)

n is 1, 2, or 3.

$M^X$ represents a titanium atom, a zirconium atom, or a hafnium atom.

$R^{X1}$ to $R^{X8}$ are independently
a hydrogen atom,
a halogen atom,
an alkyl group having 1 to 20 carbon atoms,
a cycloalkyl group having 3 to 10 ring carbon atoms,
an alkenyl group having 2 to 20 carbon atoms,
an alkynyl group having 2 to 20 carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group, or
a heterocyclic compound residue having 3 to 20 ring carbon atoms.

The alkyl groups, the cycloalkyl groups, the alkenyl groups, the alkynyl groups, the aralkyl groups, the aryl groups, the alkoxy groups, the aralkyloxy groups, the aryloxy groups, and the heterocyclic compound residues represented by $R^{X1}$ to $R^{X8}$ each optionally have a substituent.

Notwithstanding the above definitions of $R^{X1}$ to $R^{X8}$, each of the following pairs, $R^{X1}$ and $R^{X2}$, $R^{X2}$ and $R^{X3}$, $R^{X3}$ and $R^{X4}$, $R^{X5}$ and $R^{X6}$, $R^{X6}$ and $R^{X7}$, and $R^{X7}$ and $R^{X8}$, are optionally linked to each other to form a ring optionally having a substituent.

Each $X^X$ is independently
a hydrogen atom,
a halogen atom,
an alkyl group having 1 to 20 carbon atoms,
a cycloalkyl group having 3 to 10 ring carbon atoms,
an alkenyl group having 2 to 20 carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group,
a substituted amino group,
a substituted thiolate group, or
a carboxylate group having 1 to 20 carbon atoms.

The alkyl group, the cycloalkyl group, the alkenyl group, the aralkyl group, the aryl group, the alkoxy group, the aralkyloxy group, the aryloxy group, and the carboxylate group represented by $X^X$ optionally have a substituent.

$X^X$ groups are optionally linked to each other to form a ring.

$E^X$ is independently a neutral Lewis base. The subscript x representing the number of $E^X$ groups is 0, 1, or 2. When the subscript x is 2, the $E^X$ groups are the same or different.

$M^X$ represents a titanium atom, a zirconium atom, or a hafnium atom, and preferably a hafnium atom.

n is 1, 2, or 3, preferably 2 or 3, and more preferably 3.

It is preferable that $R^{X1}$ and $R^{X5}$ be independently
a hydrogen atom,
a halogen atom,
an alkyl group having 1 to 20 carbon atoms,
a cycloalkyl group having 3 to 10 ring carbon atoms,
an aralkyl group having 7 to 30 carbon atoms,
an alkoxy group having 1 to 20 carbon atoms,
an aralkyloxy group having 7 to 30 carbon atoms,
an aryloxy group having 6 to 30 carbon atoms, or
a substituted silyl group.

It is more preferable that $R^{X1}$ and $R^{X5}$ be independently
a halogen atom,
an alkyl group having 1 to 20 carbon atoms,
a cycloalkyl group having 3 to 10 ring carbon atoms,
an aralkyl group having 7 to 30 carbon atoms, or
a substituted silyl group.

It is still more preferable that $R^{X1}$ and $R^{X5}$ be the same and be
an alkyl group having 1 to 20 carbon atoms,
a cycloalkyl group having 3 to 10 ring carbon atoms,
an aralkyl group having 7 to 30 carbon atoms, or
a substituted silyl group.

It is preferable that $R^{X2}$ to $R^{X4}$ and $R^{X6}$ to $R^{X8}$ be independently
a hydrogen atom,
a halogen atom,
an alkyl group having 1 to 20 carbon atoms,
a cycloalkyl group having 3 to 10 ring carbon atoms,
an aralkyl group having 7 to 30 carbon atoms,
an aryl group having 6 to 30 carbon atoms,
an alkoxy group having 1 to 20 carbon atoms,
an aralkyloxy group having 7 to 30 carbon atoms,
an aryloxy group having 6 to 30 carbon atoms,
a substituted silyl group, or
a heterocyclic compound residue having 3 to 20 ring carbon atoms.

It is more preferable that $R^{X2}$ to $R^{X4}$ and $R^{X6}$ to $R^{X8}$ be independently
a hydrogen atom,
a halogen atom,
an alkyl group having 1 to 20 carbon atoms,
a cycloalkyl group having 3 to 10 ring carbon atoms,
an aralkyl group having 7 to 30 carbon atoms,
an aryl group having 6 to 30 carbon atoms, or
a substituted silyl group.

It is more preferable that $R^{X2}$, $R^{X4}$, $R^{X6}$, and $R^{X8}$ be a hydrogen atom.

It is more preferable that $R^3$ and $R^7$ be independently
a hydrogen atom,
an alkyl group having 1 to 20 carbon atoms,
a cycloalkyl group having 3 to 10 ring carbon atoms,
an aralkyl group having 7 to 30 carbon atoms,
an aryl group having 6 to 30 carbon atoms, or
a substituted silyl group.

It is still more preferable that $R^{X3}$ and $R^{X7}$ be the same and be
an alkyl group having 1 to 20 carbon atoms,
a cycloalkyl group having 3 to 10 ring carbon atoms,
an aralkyl group having 7 to 30 carbon atoms,
an aryl group having 6 to 30 carbon atoms, or
a substituted silyl group.

It is most preferable that $R^{X3}$ and $R^{X7}$ be the same and be an alkyl group having 1 to 20 carbon atoms.

The alkyl groups, the cycloalkyl groups, the alkenyl groups, the alkynyl groups, the aralkyl groups, the aryl groups, the alkoxy groups, the aralkyloxy groups, the aryloxy groups, and the heterocyclic compound residues represented by $R^{X1}$ to $R^{X8}$ each optionally have a substituent.

Examples of the halogen atom of $R^{X1}$ to $R^{X8}$ include a fluorine atom, a chlorine atom, a bromine atom, and an iodine atom.

Examples of the alkyl group of $R^{X1}$ to $R^{X8}$ which has 1 to 20 carbon atoms and optionally has a substituent include perfluoromethyl group, perfluoroethyl group, perfluoro-n-propyl group, perfluoroisopropyl group, perfluoro-n-butyl group, perfluoro-sec-butyl group, perfluoroisobutyl group, perfluoro-tert-butyl group, perfluoro-n-pentyl group, perfluoroisopentyl group, perfluoro-tert-pentyl group, perfluoroneopentyl group, perfluoro-n-hexyl group, perfluoro-n-heptyl group, perfluoro-n-octyl group, perfluoro-n-decyl group, perfluoro-n-dodecyl group, perfluoro-n-pentadecyl group, perfluoro-n-eicosyl group, methyl group, ethyl group, n-propyl group, isopropyl group, n-butyl group, sec-butyl group, isobutyl group, tert-butyl group, n-pentyl group, isopentyl group, tert-pentyl group, neopentyl group, n-hexyl group, thexyl group, neohexyl group, n-heptyl group, n-octyl group, n-decyl group, n-dodecyl group, n-pentadecyl group, and n-eicosyl group.

The alkyl group of $R^{X1}$ and $R^{X5}$ which has 1 to 20 carbon atoms and optionally has a substituent is preferably an alkyl group having 4 to 10 carbon atoms such as n-butyl group, sec-butyl group, isobutyl group, tert-butyl group, n-pentyl group, isopentyl group, tert-pentyl group, neopentyl group, n-hexyl group, thexyl group, neohexyl group, n-heptyl group, n-octyl group, or n-decyl group, more preferably a tertiary alkyl group having 4 to 6 carbon atoms such as tert-butyl group, tert-pentyl group, or thexyl group.

The alkyl group of $R^{X2}$ to $R^{X4}$ and $R^{X6}$ to $R^{X8}$ which has 1 to 20 carbon atoms and optionally has a substituent is preferably an alkyl group having 1 to 10 carbon atoms such as perfluoromethyl group, methyl group, ethyl group, n-propyl group, isopropyl group, n-butyl group, sec-butyl group, isobutyl group, tert-butyl group, n-pentyl group, isopentyl group, tert-pentyl group, neopentyl group, n-hexyl group, thexyl group, neohexyl group, n-heptyl group, n-octyl group, or n-decyl group, more preferably an alkyl group having 1 to 6 carbon atoms such as perfluoromethyl group, methyl group, isopropyl group, isobutyl group, tert-butyl group, isopentyl group, tert-pentyl group, neopentyl group, or thexyl group, further more preferably an alkyl group having 1 to 4 carbon atoms such as perfluoromethyl group, methyl group, isopropyl group, isobutyl group, or tert-butyl group.

Examples of the cycloalkyl group of $R^{X1}$ to $R^{X8}$ which has 3 to 10 ring carbon atoms and optionally has a substituent include cyclopropyl group, cyclobutyl group, cyclopentyl group, cyclohexyl group, cycloheptyl group, cyclooctyl group, 1-methylcyclopentyl group, 1-methylcyclohexyl group, 1-phenylcyclohexyl group, 1-indanyl group, 2-indanyl group, norbornyl group, bornyl group, menthyl group, 1-adamantyl group, and 2-adamantyl group. The cycloalkyl group $R^{X1}$ to $R^{X8}$ which has 3 to 10 ring carbon atoms and optionally has a substituent is preferably a cycloalkyl group having 5 to 10 ring carbon atoms, such as cyclopentyl group, cyclohexyl group, cycloheptyl group, cyclooctyl group, 1-methylcyclopentyl group, 1-methylcyclohexyl group, 1-indanyl group, 2-indanyl group, norbornyl group, bornyl group, menthyl group, 1-adamantyl group, or 2-adamantyl group, more preferably a cycloalkyl group having 6 to 10 ring carbon atoms, such as cyclohexyl group, 1-methylcyclohexyl group, norbornyl group, bornyl group, 1-adamantyl group, or 2-adamantyl group.

Furthermore, these cycloalkyl groups optionally have, as a substituent, a hydrocarbyl group having 1 to 10 carbon atoms. For example, in a case where the group which constitutes a ring is 1-adamantyl group, examples of the cycloalkyl groups having, as a substituent, the hydrocarbyl group include 3,5-dimethyladamantyl group, 3,5,7-trimethyladamantyl group, 3,5-diethyladamantyl group, 3,5,7-triethyladamantyl group, 3,5-diisopropyladamantyl group, 3,5,7-triisopropyladamantyl group, 3,5-diisobutyladamantyl group, 3,5,7-triisobutyladamantyl group, 3,5-diphenyladamantyl group, 3,5,7-triphenyladamantyl group, 3,5-di(3,5-xylyl)adamantyl group, and 3,5,7-tri(3,5-xylyl)adamantyl group, and preferably 3,5-dimethyladamantyl group, 3,5-diethyladamantyl group, 3,5-diisopropyladamantyl group, 3,5-diisobutyladamantyl group, 3,5-diphenyladamantyl group, or 3,5-di(3,5-xylyl)adamantyl group.

Examples of the alkenyl group of $R^{X1}$ to $R^{X8}$ which has 2 to 20 carbon atoms and optionally has a substituent include vinyl group, allyl group, propenyl group, 2-methyl-2-propenyl group, homoallyl group, pentenyl group, hexenyl group, heptenyl group, octenyl group, nonenyl group, and decenyl group, and preferably an alkenyl group having 3 to 6 carbon atoms, more preferably an allyl group or a homoallyl group.

Examples of the alkynyl group of $R^{X1}$ to $R^{X8}$ which has 2 to 20 carbon atoms and optionally has a substituent include ethynyl group, 1-propynyl group, 2-propynyl group, 1-butynyl group, 3-methyl-1-butynyl group, 3,3-dimethyl-1-butynyl group, 2-butynyl group, 3-butynyl group, 1-pentynyl group, 4-methyl-1-pentynyl group, 2-pentynyl group, 3-pentynyl group, 4-pentynyl group, 1-hexynyl group, 1-octynyl group, and phenylethynyl group, and preferably an alkynyl group having 3 to 8 carbon atoms, more preferably 3-methyl-1-butynyl group, 3,3-dimethyl-1-butynyl group, or phenylethynyl group.

Examples of the aralkyl group of $R^{X1}$ to $R^{X8}$ which has 7 to 30 carbon atoms and optionally has a substituent include benzyl group, (2-methylphenyl)methyl group, (3-methylphenyl)methyl group, (4-methylphenyl)methyl group, (2,3-dimethylphenyl)methyl group, (2,4-dimethylphenyl)methyl group, (2,5-dimethylphenyl)methyl group, (2,6-dimethylphenyl)methyl group, (3,4-dimethylphenyl)methyl group, (3,5-dimethylphenyl)methyl group, (2,3,4-trimethylphenyl)methyl group, (2,3,5-trimethylphenyl)methyl group, (2,3,6-trimethylphenyl)methyl group, (3,4,5-trimethylphenyl)methyl group, (2,4,6-trimethylphenyl)methyl group, (2,3,4,5-tetramethylphenyl)methyl group, (2,3,4,6-tetramethylphenyl)methyl group, (2,3,5,6-tetramethylphenyl)methyl group, (pentamethylphenyl)methyl group, (ethylphenyl)methyl group, (n-propylphenyl)methyl group, (isopropylphenyl)methyl group, (n-butylphenyl)methyl group, (sec-butylphenyl)methyl group, (tert-butylphenyl)methyl group, (isobutylphenyl)methyl group, (n-pentylphenyl)methyl group, (neopentylphenyl)methyl group, (n-hexylphenyl)methyl group, (n-octylphenyl)methyl group, (n-decylphenyl)methyl group, naphthylmethyl group, anthracenylmethyl group, dimethyl (phenyl)methyl group, dimethyl(4-methylphenyl)methyl group, dimethyl(1-naphthyl)methyl group, dimethyl(2-naphthyl)methyl group, methyl(diphenyl)methyl group, methylbis(4-methylphenyl)methyl group, and triphenylmethyl group, and preferably a tertiary aralkyl group having 9 to 20 carbon atoms such as dimethyl(phenyl)methyl group, dimethyl(4-methylphenyl)methyl group, dimethyl(1-naphthyl)methyl group, dimethyl(2-naphthyl)methyl group, methyl(diphenyl)methyl group, methylbis(4-methylphenyl) methyl group, or triphenylmethyl group.

Examples of the aryl group of $R^{X1}$ to $R^{X8}$ which has 6 to 30 carbon atoms and optionally has a substituent include phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, 2,3,4,5-tetramethylphenyl group, 2,3,4,6-tetramethylphenyl group, 2,3,5,6-tetramethylphenyl group, pentamethylphenyl group, ethylphenyl group, n-propylphenyl group, isopropylphenyl group, n-butylphenyl group, sec-butylphenyl group, tert-butylphenyl group, isobutylphenyl group, n-pentylphenyl group, neopentylphenyl group, n-hexylphenyl group, n-octylphenyl group, n-decylphenyl group, n-dodecylphenyl group, n-tetradecylphenyl group, naphthyl group, anthracenyl group, 3,5-diisopropylphenyl group, 2,6-diisopropylphenyl group, 3,5-ditert-butylphenyl group, 2-fluorophenyl group, 3-fluorophenyl group, 4-fluorophenyl group, pentafluorophenyl group, 2-trifluoromethylphenyl group, 3-trifluoromethylphenyl group, 4-trifluoromethylphenyl group, 2,3-difluorophenyl group, 2,4-difluorophenyl group, 2,5-difluorophenyl group, 2,6-difluorophenyl group, 2-chlorophenyl group, 2,3-dichlorophenyl group, 2,4-dichlorophenyl group, 2,5-dichlorophenyl group, 2-bromophenyl group, 3-bromophenyl group, 4-bromophenyl group, 2,3-dibromophenyl group, 2,4-dibromophenyl group, and 2,5-dibromophenyl group, and preferably a phenyl group having 6 to 20 carbon atoms such as phenyl group, 2-tolyl group, 3-tolyl group, 4-tolyl group, 2,3-xylyl group, 2,4-xylyl group, 2,5-xylyl group, 2,6-xylyl group, 3,4-xylyl group, 3,5-xylyl group, 2,3,4-trimethylphenyl group, 2,3,5-trimethylphenyl group, 2,3,6-trimethylphenyl group, 2,4,6-trimethylphenyl group, 3,4,5-trimethylphenyl group, ethylphenyl group, n-propylphenyl group, isopropylphenyl group, 3,5-diisopropylphenyl group, 2,6-diisopropylphenyl group, or 3,5-ditert-butylphenyl group; a fluorinated phenyl group such as 2-fluorophenyl group, 3-fluorophenyl group, 4-fluorophenyl group, pentafluorophenyl group, 2,3-difluorophenyl group, 2,4-difluorophenyl group, 2,5-difluorophenyl group, or 2,6-difluorophenyl group; or a fluorinated alkylphenyl group such as 2-trifluoromethylphenyl group, 3-trifluoromethylphenyl group, or 4-trifluoromethylphenyl group.

Examples of the substituted silyl group of $R^{X1}$ to $R^{X8}$ include trimethylsilyl group, triethylsilyl group, tri-n-propylsilyl group, triisopropylsilyl group, tri-n-butylsilyl group, triisobutylsilyl group, tert-butyldimethylsilyl group, methyldiphenylsilyl group, dimethyl(phenyl)silyl group, tert-butyldiphenylsilyl group, triphenylsilyl group, methylbis(trimethylsilyl) silyl group, dimethyl(trimethylsilyl)silyl group, and tris(trimethylsilyl)silyl group, and preferably a trialkylsilyl group having 3 to 20 carbon atoms such as trimethylsilyl group, triethylsilyl group, tri-n-propylsilyl group, triisopropylsilyl group, or tert-butyldimethylsilyl group; or silyl group having, as a substituent, a hydrocarbylsilyl group having 3 to 20 carbon atoms such as methylbis(trimethylsilyl) silyl group, dimethyl(trimethylsilyl)silyl group, or tris(trimethylsilyl)silyl group.

Examples of the alkoxy group of $R^{X1}$ to $R^{X8}$ which has 1 to 20 carbon atoms and optionally has a substituent include perfluoromethoxy group, perfluoroethoxy group, perfluoro-n-propoxy group, perfluoroisopropoxy group, perfluoro-n-butoxy group, perfluoro-sec-butoxy group, perfluoroisobutoxy group, perfluoro-n-pentyloxy group, perfluoroneopentyloxy group, perfluoro-n-hexyloxy group, perfluoro-n-heptyloxy group, perfluoro-n-octyloxy group, perfluoro-n-decyloxy group, perfluoro-n-dodecyloxy group, perfluoro-n-pentadecyloxy group, perfluoro-n-eicosyloxy group, methoxy group, ethoxy group, n-propoxy group, isopropoxy group, n-butoxy group, sec-butoxy group, isobutoxy group, n-pentyloxy group, neopentyloxy group, n-hexyloxy group, n-heptyloxy group, n-octyloxy group, n-decyloxy group, n-dodecyloxy group, n-pentadecyloxy group, and n-eicosyloxy group, and preferably an alkoxy group having 1 to 4 carbon atoms, more preferably methoxy group, ethoxy group, n-propoxy group, isopropoxy group, or n-butoxy group.

Examples of the aryloxy group of $R^{X1}$ to $R^{X8}$ which has 6 to 30 carbon atoms and optionally has a substituent include phenoxy group, 2,3,4-trimethylphenoxy group, 2,3,5-trimethylphenoxy group, 2,3,6-trimethylphenoxy group, 2,4,6-trimethylphenoxy group, 3,4,5-trimethylphenoxy group, 2,3,4,5-tetramethylphenoxy group, 2,3,4,6-tetramethylphenoxy group, 2,3,5,6-tetramethylphenoxy group, pentamethylphenoxy group, 2,6-diisopropylphenoxy group, 2-fluorophenoxy group, 3-fluorophenoxy group, 4-fluorophenoxy group, pentafluorophenoxy group, 2-trifluoromethylphenoxy group, 3-trifluoromethylphenoxy group, 4-trifluoromethylphenoxy group, 2,3-difluorophenoxy group, 2,4-fluorophenoxy group, 2,5-difluorophenoxy group, 2-chlorophenoxy group, 2,3-dichlorophenoxy group, 2,4-dichlorophenoxy group, 2,5-dichlorophenoxy group, 2-bromophenoxy group, 3-bromophenoxy group, 4-bromophenoxy group, 2,3-dibromophenoxy group, 2,4-dibromophenoxy group, and 2,5-dibromophenoxy group, and preferably an aryloxy group having 6 to 14 carbon atoms, more preferably 2,4,6-trimethylphenoxy group, 3,4,5-trimethylphenoxy group, 2,6-diisopropylphenoxy group, or a pentafluorophenoxy group.

Examples of the aralkyloxy group of $R^{X1}$ to $R^{X8}$ which has 7 to 30 carbon atoms and optionally has a substituent include benzyloxy group, (2-methylphenyl)methoxy group, (3-methylphenyl)methoxy group, (4-methylphenyl)methoxy group, (2,3-dimethylphenyl)methoxy group, (2,4-dimethylphenyl)methoxy group, (2,5-dimethylphenyl)methoxy group, (2,6-dimethylphenyl)methoxy group, (3,4-dimethylphenyl)methoxy group, (3,5-dimethylphenyl)methoxy group, (2,3,4-trimethylphenyl)methoxy group, (2,3,5-trimethylphenyl)methoxy group, (2,3,6-trim ethylphenyl) methoxy group, (2,4,5-trimethylphenyl)methoxy group, (2,4,6-trim ethylphenyl)methoxy group, (3,4,5-trimethylphenyl)methoxy group, (2,3,4,5-tetramethylphenyl) methoxy group, (2,3,4,6-tetramethylphenyl)methoxy group, (2,3,5,6-tetramethylphenyl)methoxy group, (pentamethylphenyl)methoxy group, (ethylphenyl)methoxy group, (n-propylphenyl)methoxy group, (isopropylphenyl)methoxy group, (n-butylphenyl)methoxy group, (sec-butylphenyl) methoxy group, (tert-butylphenyl)methoxy group, (n-hexylphenyl)methoxy group, (n-octylphenyl)methoxy group, (n-decylphenyl)methoxy group, (n-tetradecylphenyl) methoxy group, naphthylmethoxy group, and anthracenylmethoxy group, and preferably an aralkyloxy group having 7 to 12 carbon atoms, more preferably benzyloxy group.

Examples of the heterocyclic compound residue of $R^{X1}$ to $R^{X8}$ which has 3 to 20 ring carbon atoms and optionally has a substituent include thienyl group, furil group, 1-pyrrolyl group, 1-imidazolyl group, 1-pyrazolyl group, pyridyl group, pyrazinyl group, pyrimidinyl group, pyridazinyl group, 2-isoindolyl group, 1-indolyl group, quinolyl group, dibenzo-1H-pyrrol-1-yl group, and N-carbazolyl group, and preferably thienyl group, furil group, 1-pyrrolyl group, pyridyl group, pyrimidinyl group, 2-isoindolyl group, 1-indolyl group, quinolyl group, dibenzo-1H-pyrrol-1-yl group, or N-carbazolyl group.

$R^{X1}$ and $R^{X2}$, $R^{X2}$ and $R^{X3}$, $R^{X3}$ and $R^{X4}$, $R^{X5}$ and $R^{X6}$, $R^{X6}$ and $R^{X7}$, $R^{X7}$ and $R^{X8}$ are optionally linked to each other to form a ring which optionally has a substituent, notwithstanding the above definitions of $R^{X1}$ to $R^{X8}$. The ring is preferably a 4- to 10-membered hydrocarbyl ring or heterocyclic ring containing two carbon atoms on a benzene ring. The 4- to 10-membered ring optionally has a substituent.

Specifically, examples of the ring include a cyclobutene ring, a cyclopentene ring, a cyclopentadiene ring, a cyclohexene ring, a cycloheptene ring, a cyclooctene ring, a benzene ring, a naphthalene ring, a furan ring, a 2,5-dimethylfuran ring, a thiophene ring, a 2,5-dimethylthiophene ring, and a pyridine ring, and preferably a cyclopentene ring, a cyclopentadiene ring, a cyclohexene ring, a benzene ring and a naphthalene ring, more preferably a cyclopentene ring, a cyclohexene ring, a benzene ring, and a naphthalene ring each of which is formed by linkage between $R^{x1}$ and $R^{x2}$ and/or $R^{x5}$ and $R^{x6}$.

The two $X^X$ are independently a hydrogen atom, a halogen atom, an alkyl group having 1 to 20 carbon atoms, a cycloalkyl group having 3 to 10 ring carbon atoms, an alkenyl group having 2 to 20 carbon atoms, an aralkyl group having 7 to 30 carbon atoms, an aryl group having 6 to 30 carbon atoms, an alkoxy group having 1 to 20 carbon atoms, an aralkyloxy group having 7 to 30 carbon atoms, an aryloxy group having 6 to 30 carbon atoms, a substituted silyl group having 1 to 20 carbon atoms, a substituted amino group having 1 to 20 carbon atoms, a substituted thiolate group having 1 to 20 carbon atoms, or a carboxylate group having 1 to 20 carbon atoms.

Examples of the halogen atom, the alkyl group having 1 to 20 carbon atoms, the cycloalkyl group having 3 to 10 ring carbon atoms, the alkenyl group having 2 to 20 carbon atoms, the aralkyl group having 7 to 30 carbon atoms, the aryl group having 6 to 30 carbon atoms, the alkoxy group having 1 to 20 carbon atoms, the aralkyloxy group having 7 to 30 carbon atoms, the aryloxy group having 6 to 30 carbon atoms, and the substituted silyl group of $X^X$ are the same as the examples of $R^{X2}$ to $R^{X4}$ and $R^{X6}$ to $R^{X8}$.

Examples of the substituted amino group having 1 to 20 carbon atoms of $X^X$ include a hydrocarbylamino group having 2 to 14 carbon atoms such as dimethylamino group, diethylamino group, di-n-butylamino group, di-n-propylamino group, diisopropylamino group, dibenzylamino group, and diphenylamino group, and preferably dimethylamino group, diethylamino group, di-n-propylamino group, diisopropylamino group, or dibenzylamino group.

Examples of the substituted thiolate group having 1 to 20 carbon atoms of $X^X$ include a hydrocarbyl thiolate group having 6 to 12 carbon atoms such as thiophenoxy group, 2,3,4-trimethylthiophenoxy group, 2,3,5-trimethylthiophenoxy group, 2,3,6-trimethylthiophenoxy group, 2,4,6-trimethylthiophenoxy group, 3,4,5-trimethylthiophenoxy group, 2,3,4,5-tetramethylthiophenoxy group, 2,3,4,6-tetramethylthiophenoxy group, 2,3,5,6-tetramethylphenoxy group, pentamethylphenoxy group, 2-fluorothiophenoxy group, 3-fluorothiophenoxy group, 4-fluorophenoxy group, 2-pentafluorothiophenoxy group, 3-trifluoromethylthiophenoxy group, 4-trifluoromethylthiophenoxy group, trifluoromethylthiophenoxy group, 2,3-difluorothiophenoxy 2,4-fluorothiophenoxy group, 2,5-group, difluorothiophenoxy group, 2-chlorothiophenoxy group, 2,3-dichlorothiophenoxy group, 2,4-dichlorothiophenoxy group, 2,5-dichlorothiophenoxy group, 2-bromothiophenoxy group, 3-bromothiophenoxy group, 4-bromothiophenoxy group, 2,3-dibromothiophenoxy group, 2,4-dibromothiophenoxy group, and 2,5-dibromothiophenoxy group, and preferably thiophenoxy group, 2,4,6-trimethylthiophenoxy group, 3,4,5-trimethylthiophenoxy group, 2,3,4,5-tetramethylthiophenoxy group, 2,3,4,6-tetramethylthiophenoxy group, 2,3,5,6-tetramethylthiophenoxy group, pentamethylthiophenoxy group, or pentafluorothiophenoxy group.

Examples of the carboxylate group having 1 to 20 carbon atoms of $X^X$ include acetate group, propionate group, butyrate group, pentanate group, hexanoate group, 2-ethylhexanoate group, and trifluoroacetate group, and preferably a hydrocarbyl carboxylate group having 2 to 10 carbon atoms, more preferably acetate group, propionate group, 2-ethylhexanoate group, or trifluoroacetate group.

$X^X$ is preferably a fluorine atom, a chlorine atom, a bromine atom, an alkyl group having 1 to 20 carbon atoms, an aralkyl group having 7 to 30 carbon atoms, an alkoxy group having 1 to 20 carbon atoms, an aryloxy group having 6 to 30 carbon atoms, or a hydrocarbylamino group having 1 to 20 carbon atoms, more preferably a chlorine atom, a bromine atom, an alkyl group having 1 to 6 carbon atoms, an aralkyl group having 7 to 10 carbon atoms, an alkoxy group having 1 to 6 carbon atoms, an aryloxy group having 6 to 10 carbon atoms, or a hydrocarbylamino group having 2 to 10 carbon atoms, further more preferably a chlorine atom, methyl group, ethyl group, n-butyl group, tert-butyl group, benzyl group, methoxy group, ethoxy group, isopropoxy group, tert-butoxy group, phenoxy group, dimethylamino group, or diethylamino group, especially preferably a chlorine atom, methyl group, benzyl group, isopropoxy group, phenoxy group, or dimethylamino group, most preferably a chlorine atom.

The alkyl group, the cycloalkyl group, the alkenyl group, the aralkyl group, the aryl group, the alkoxy group, the aralkyloxy group, the aryloxy group, and the carboxylate group of $X^X$ optionally have a substituent.

$X^X$ groups may be linked to each other to form a ring which may have a substituent.

$R^{x1}$ to $R^{x8}$ and $X^X$ optionally independently have a substituent containing any of a halogen atom, an oxygen atom, a silicon atom, a nitrogen atom, a phosphorus atom, and a sulfur atom.

$E^X$ is independently a neutral Lewis base. Examples of $E^X$ include an ether, an amine, a thioether or the like. Specific examples of $E^X$ include tetrahydrofuran, diethyl ether, 1,4-dioxane, and pyridine. $E^X$ is preferably tetrahydrofuran.

The subscript x indicates the number of $E^X$, which is 0, 1, or 2, and preferably 0 or 1, and more preferably 0. When the subscript x is 2, the $E^X$ groups are the same or different.

Examples of (i) the substituent which may be included in the alkyl group, the cycloalkyl group, the alkenyl group, the alkynyl group, the aralkyl group, the aryl group, the alkoxy group, the aralkyloxy group, the aryloxy group, and the heterocyclic compound residue of $R^{X1}$ to $R^{X8}$, (ii) the substituent which may be included in the ring formed by linking $R^{X1}$ and $R^{X2}$, $R^{X2}$ and $R^{X3}$, $R^{X3}$ and $R^{X4}$, $R^{X5}$ and $R^{X6}$, $R^{X6}$ and $R^{X7}$, or $R^{X7}$ and $R^{X8}$, (iii) the substituent which may be included in the alkyl group, the cycloalkyl group, the alkenyl group, the aralkyl group, the aryl group, the alkoxy group, the aralkyloxy group, the aryloxy group, and the carboxylate group of $X^X$, and (iv) the substituent which may be included in the ring formed by linking the $X^X$ groups include a fluorine atom, a chlorine atom, a bromine atom, an iodine atom, an alkoxy group, an aryloxy group, a substituted silyl group, a substituted amino group, a substituted thiolate group, a heterocyclic compound residue, or the like.

Specific examples of the transition metal compound (A) represented by the formula (1) include the following compounds.

[Chem. 3]

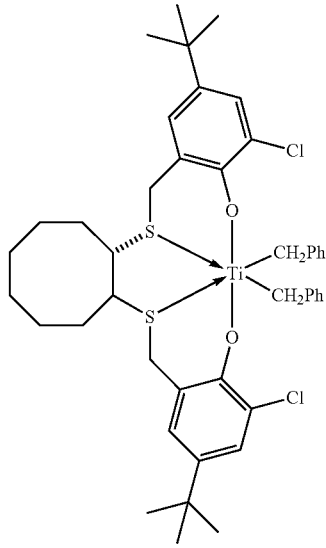

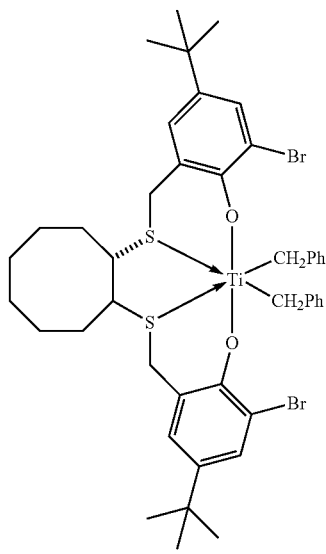

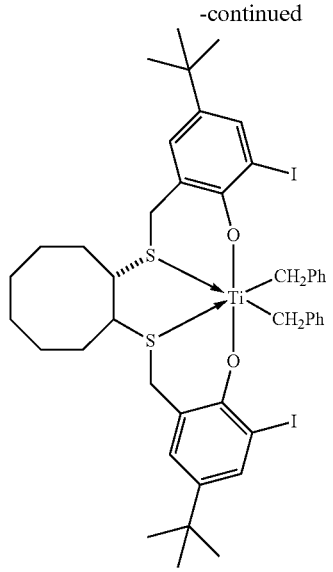
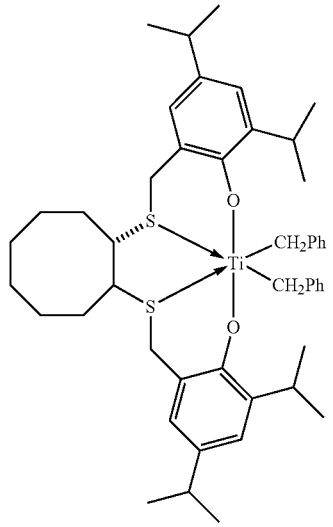
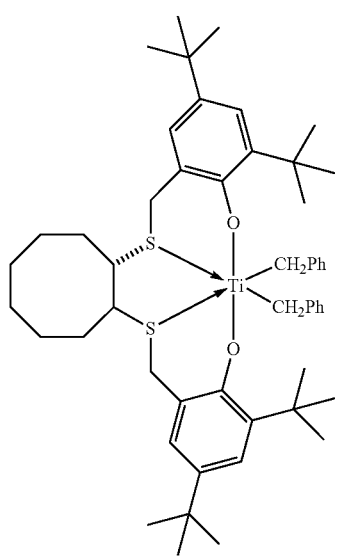
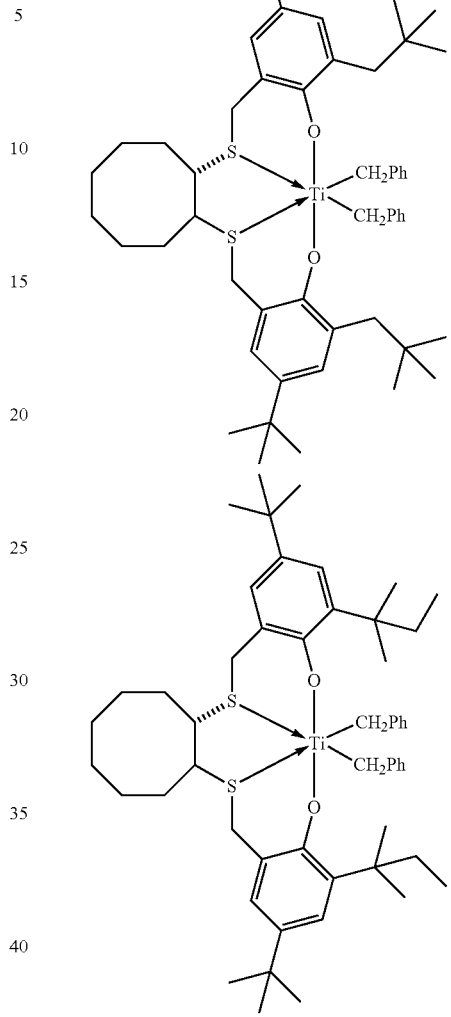
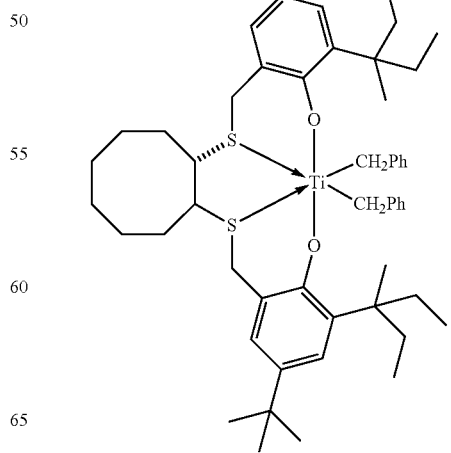

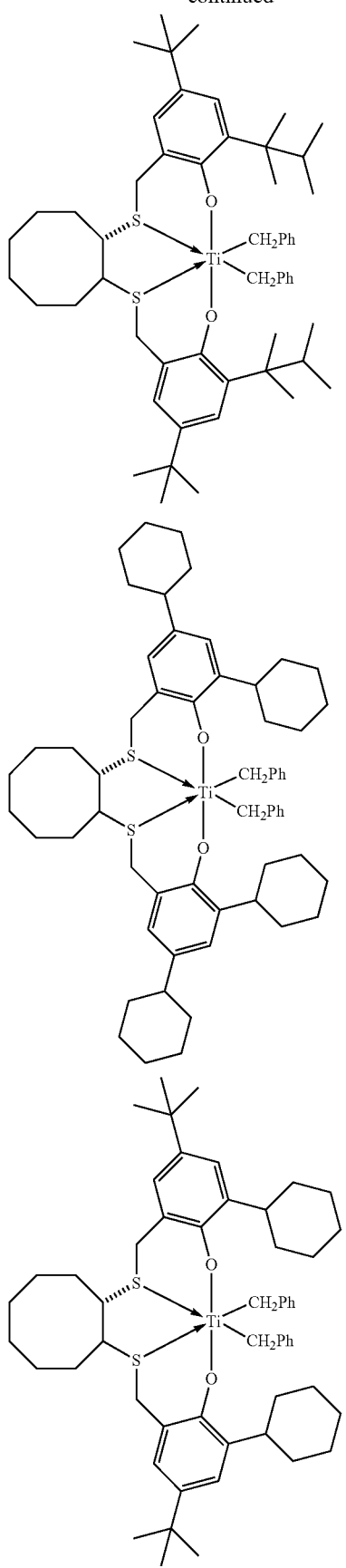
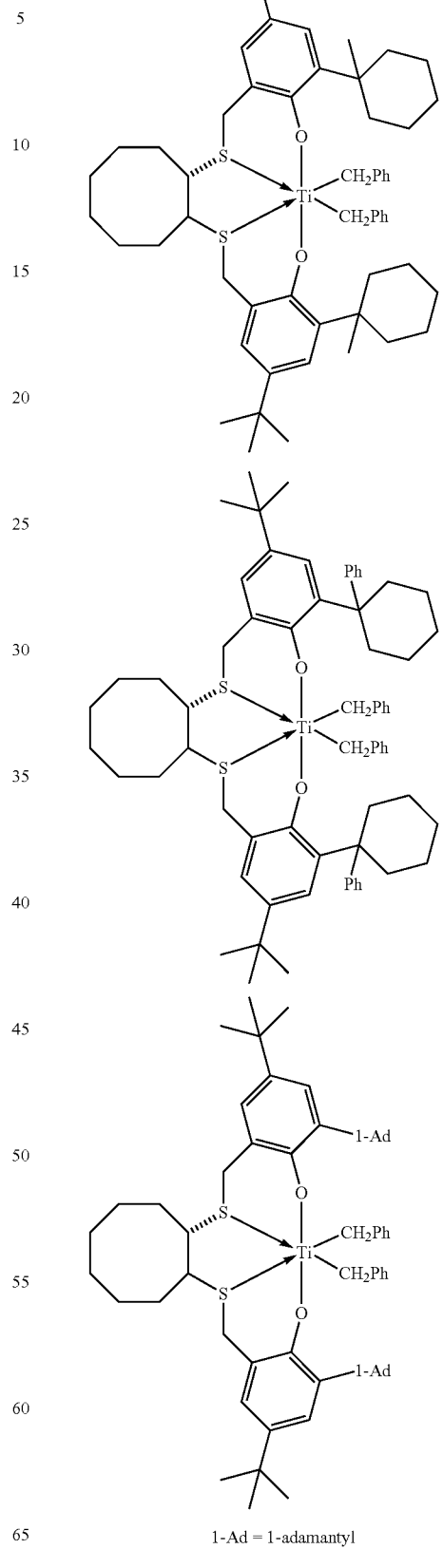
1-Ad = 1-adamantyl

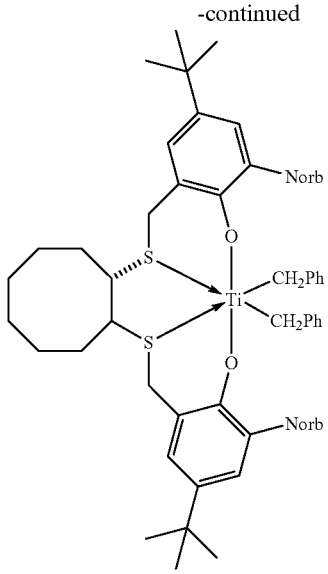
Norb = norbornyl
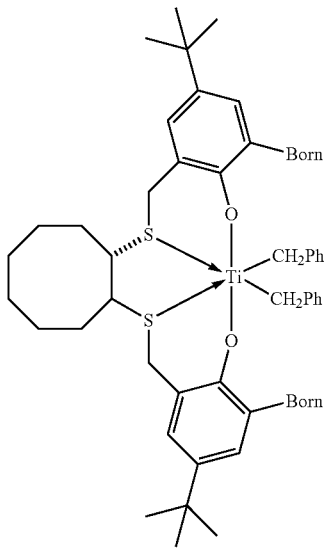
Born = bornyl
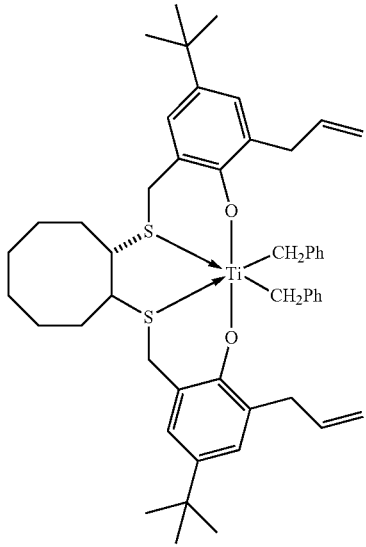
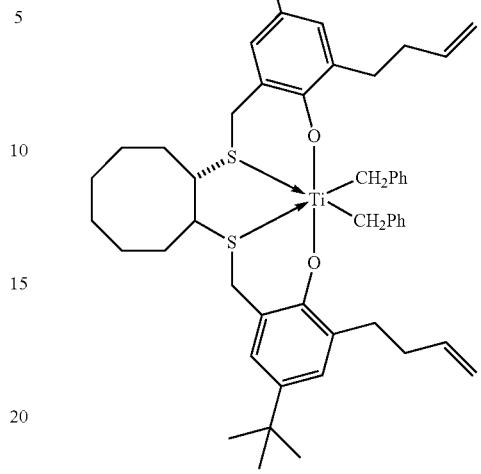
[Chem. 4]
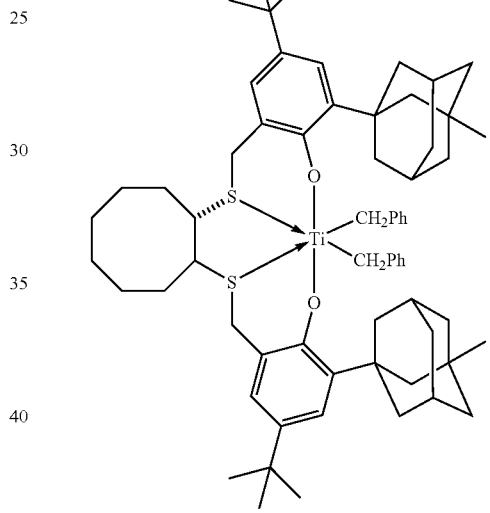
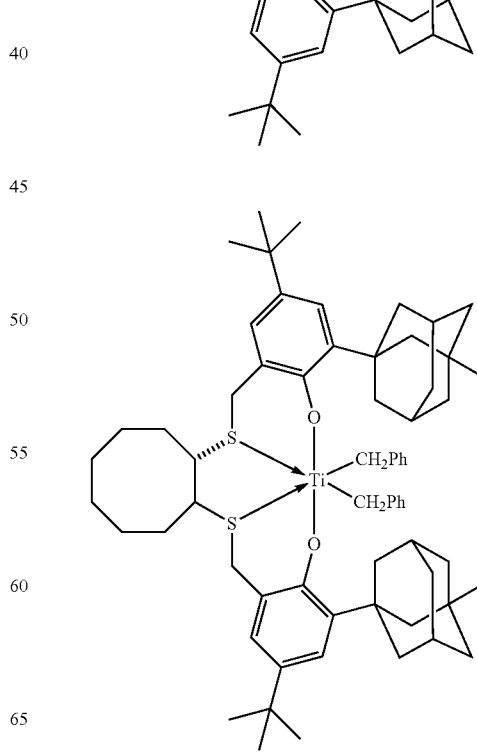

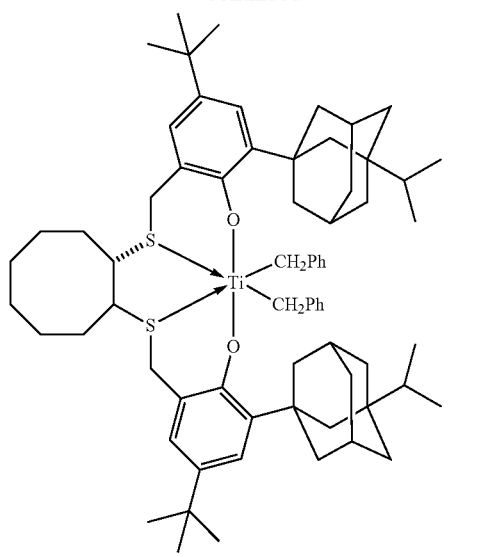
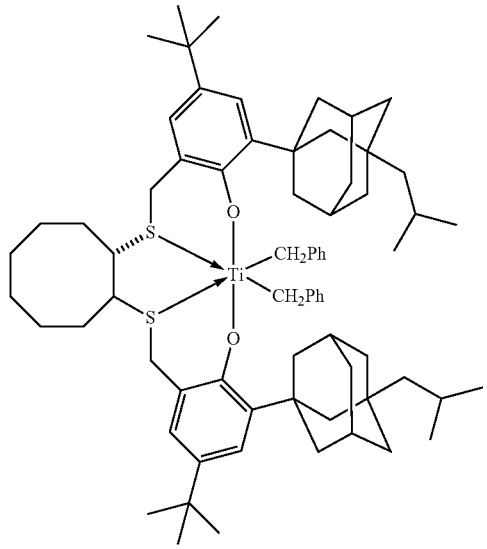
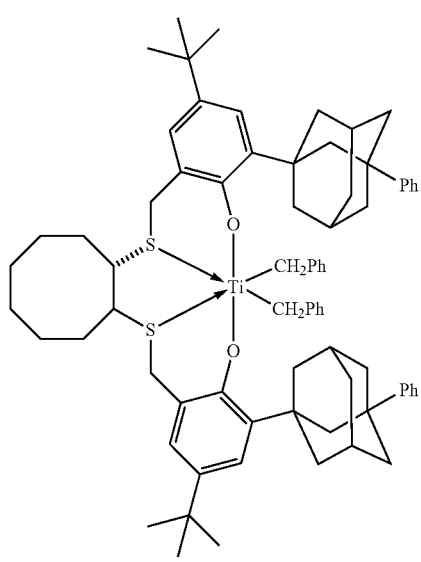
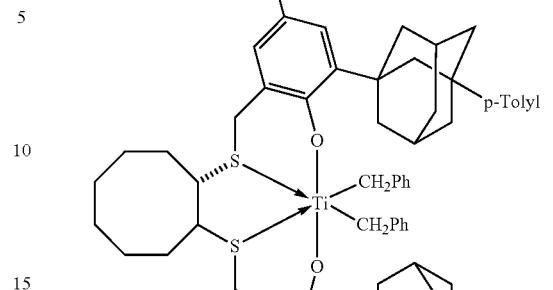
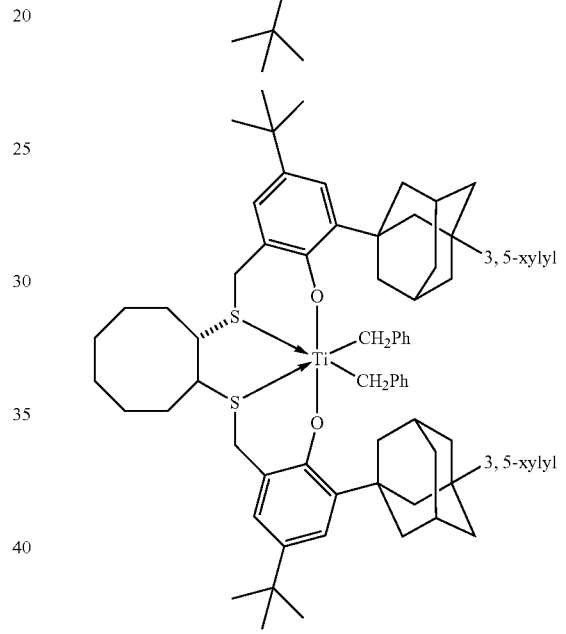
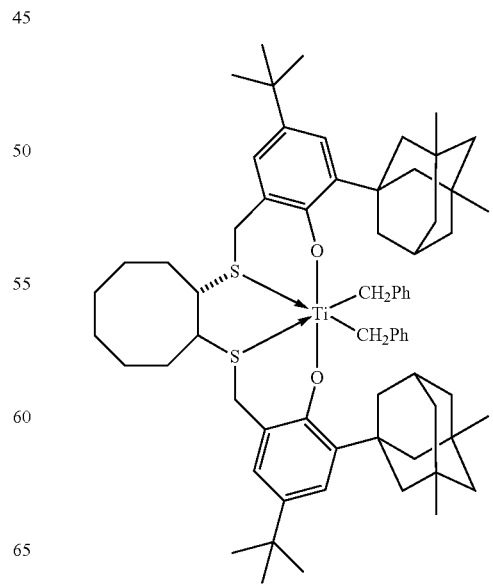

21
-continued
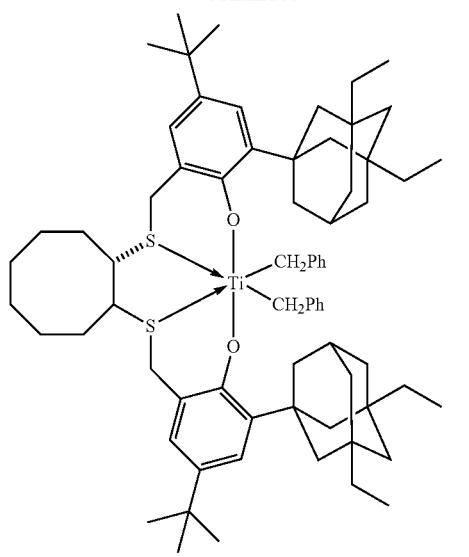
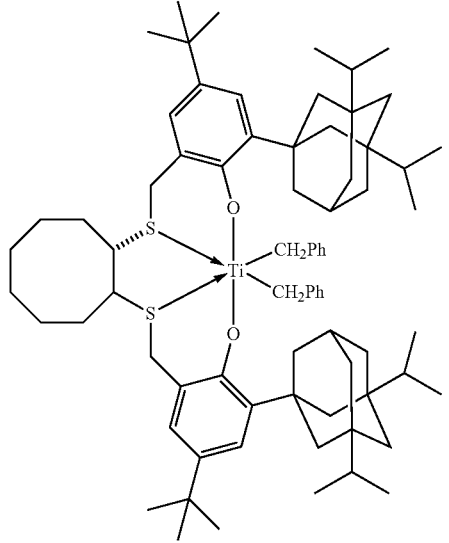
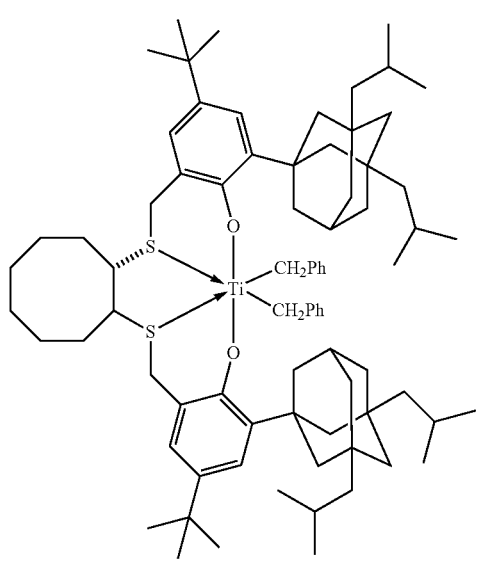
22
-continued
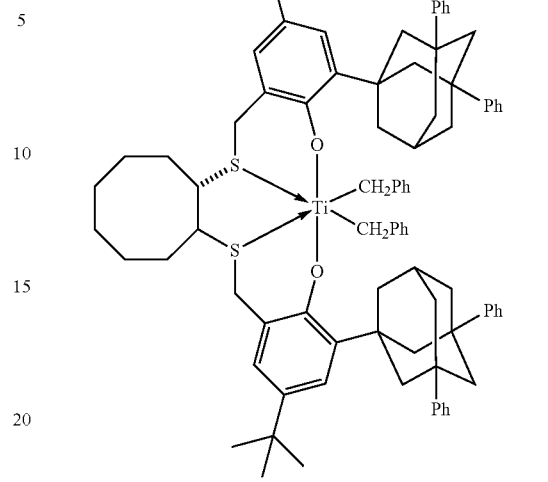
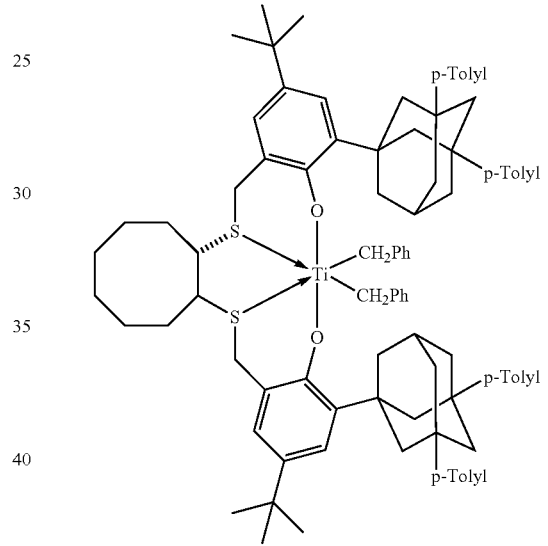
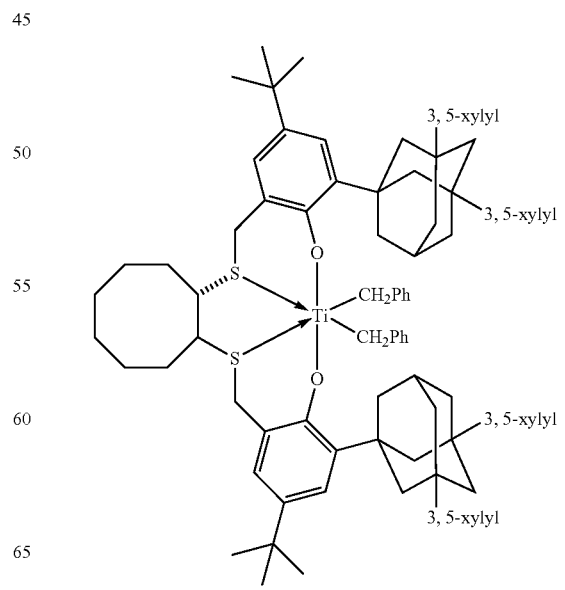

[Chem. 5]
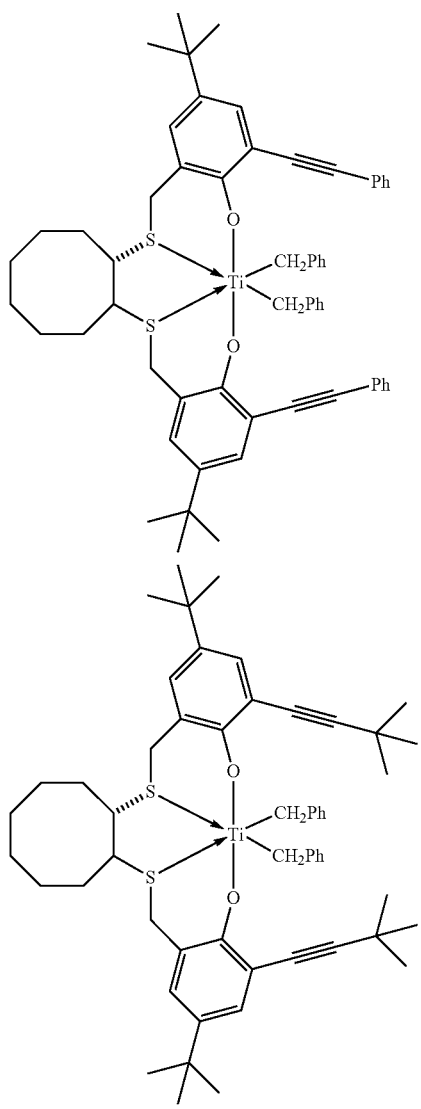
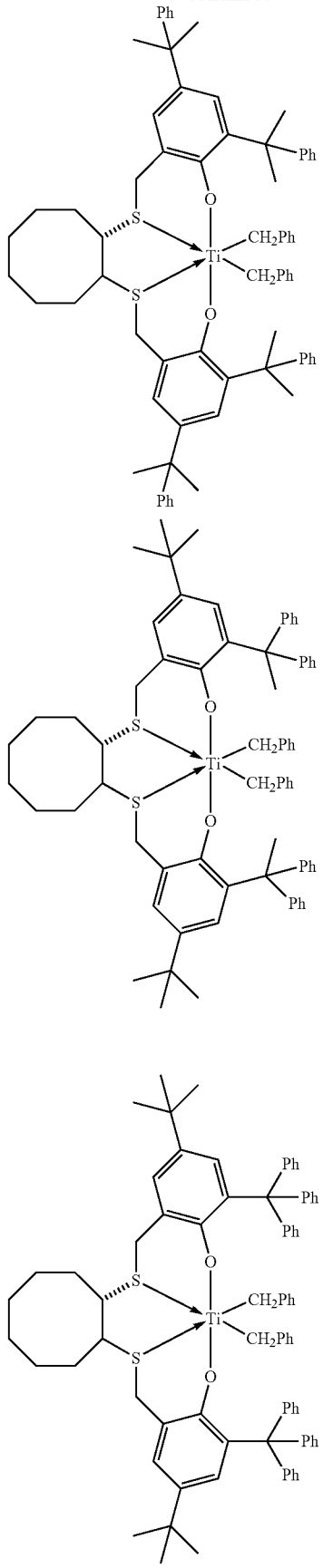

-continued
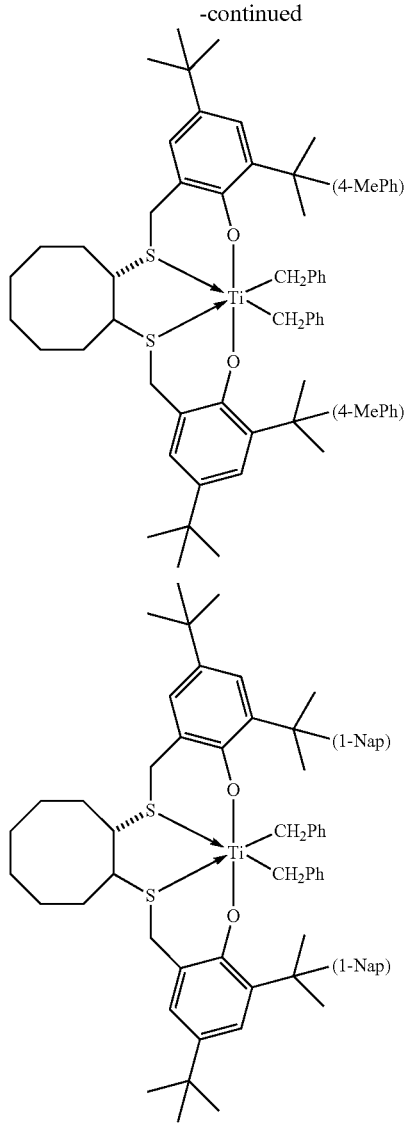
1-Nap = 1-naphthyl
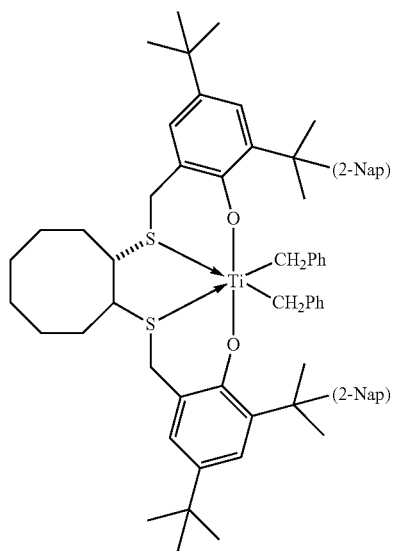
2-Nap = 2-naphthyl
-continued
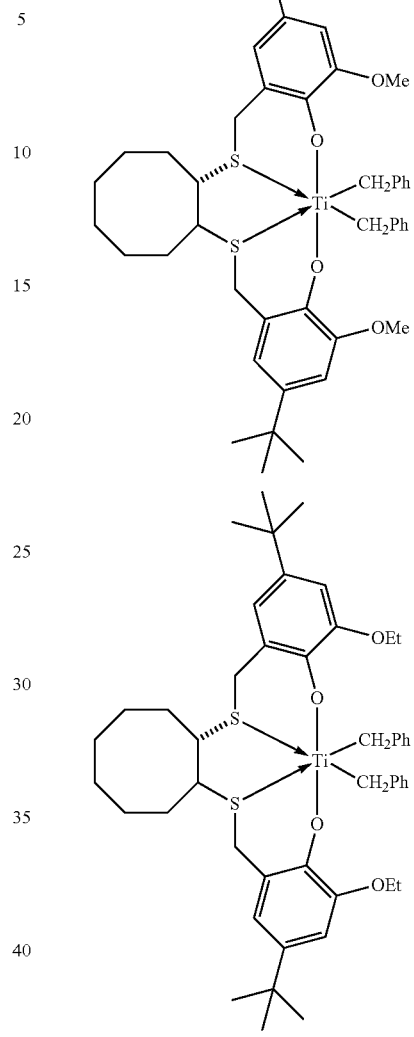
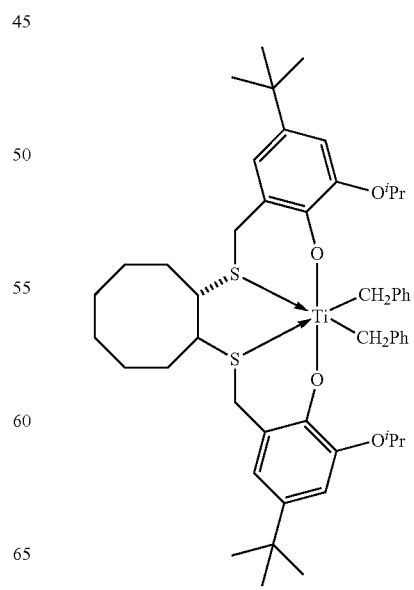

27
-continued
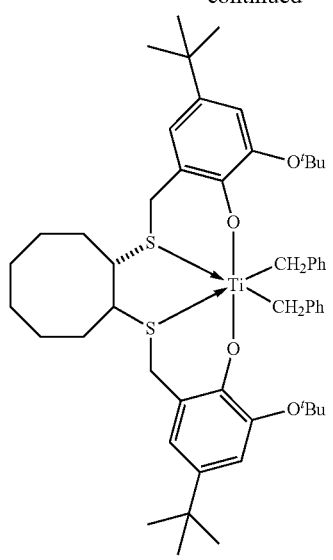
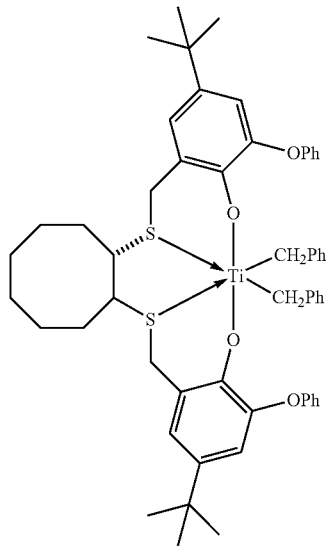
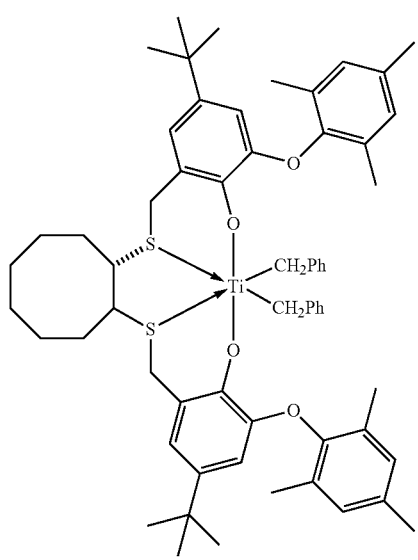
28
-continued
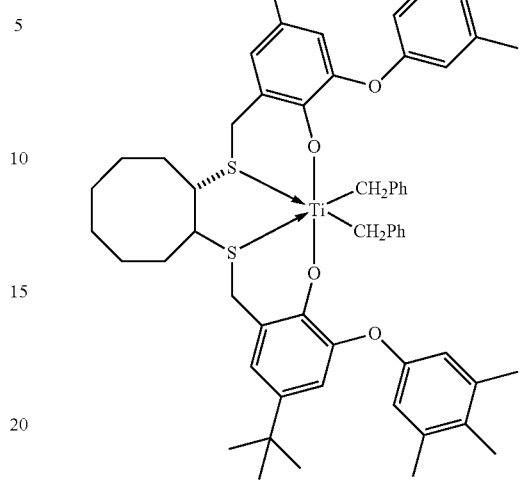
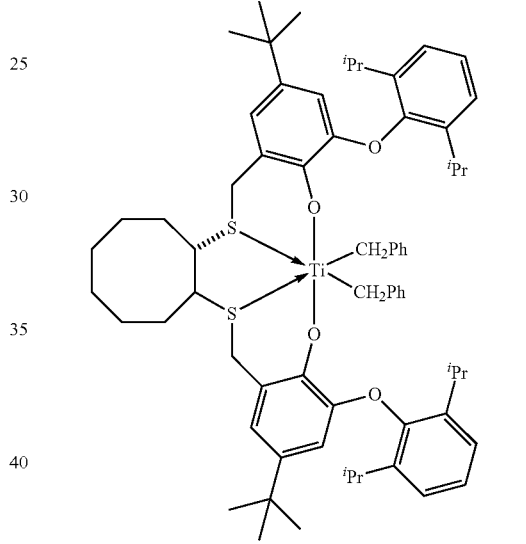
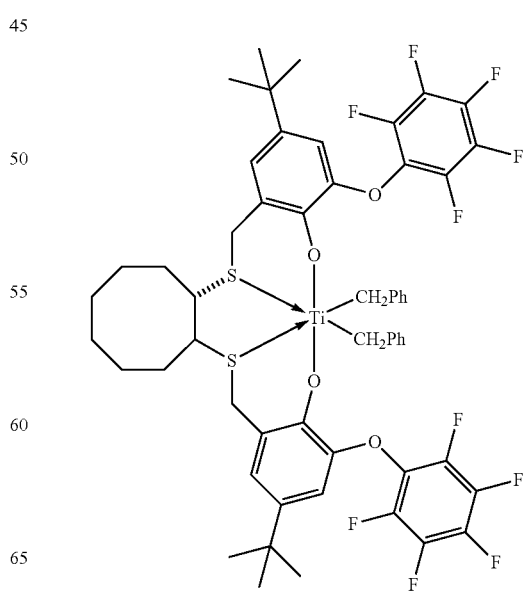

[Chem. 6]
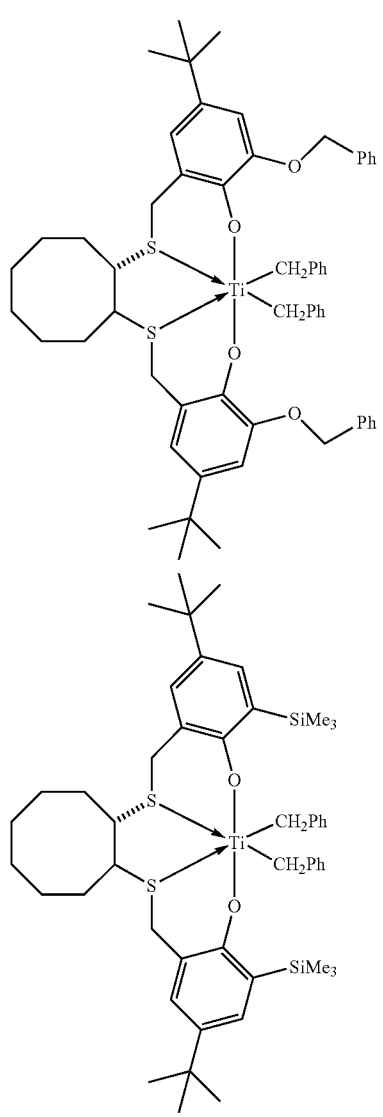
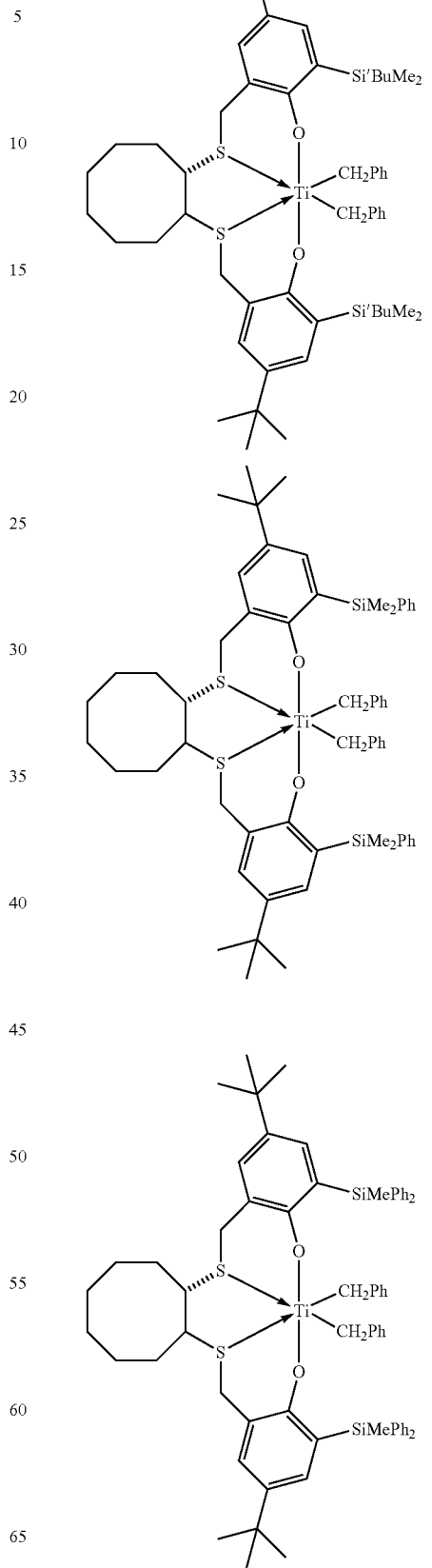

31
-continued
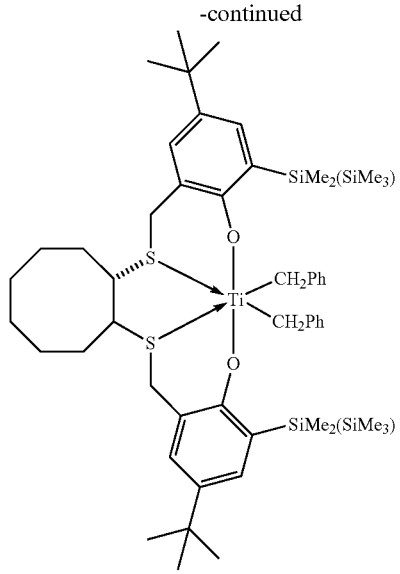
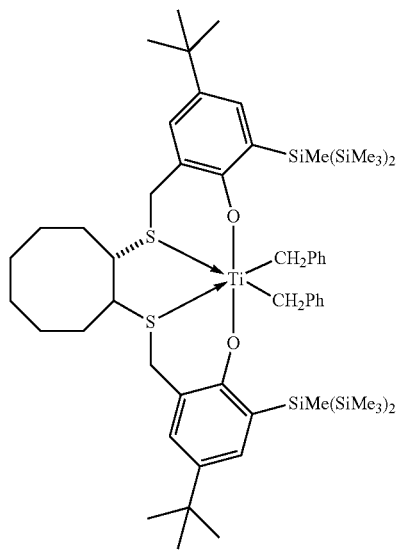
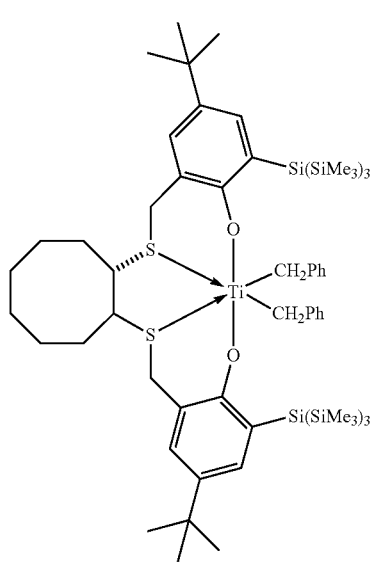
32
-continued
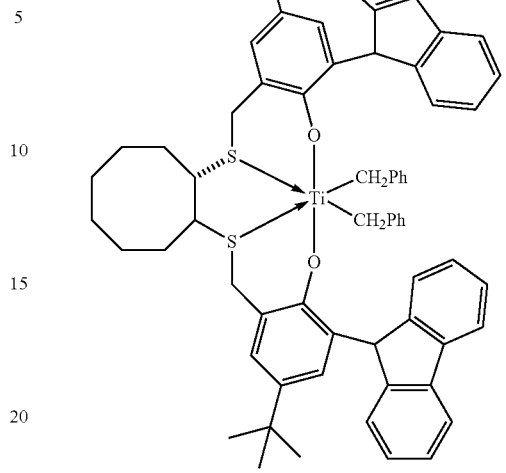
[Chem. 7]
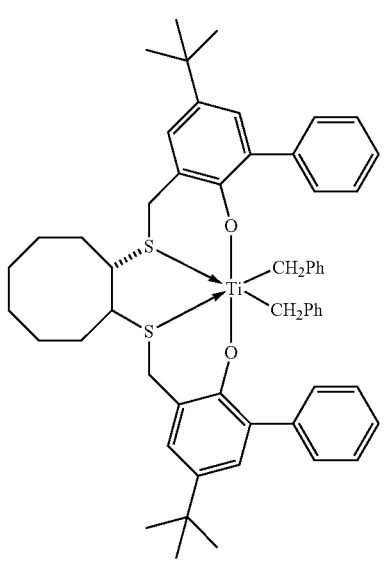
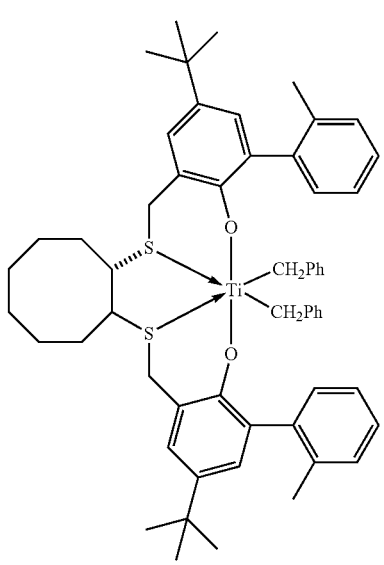

33
-continued
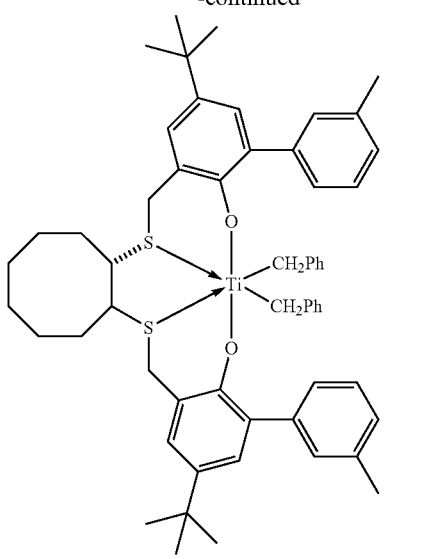
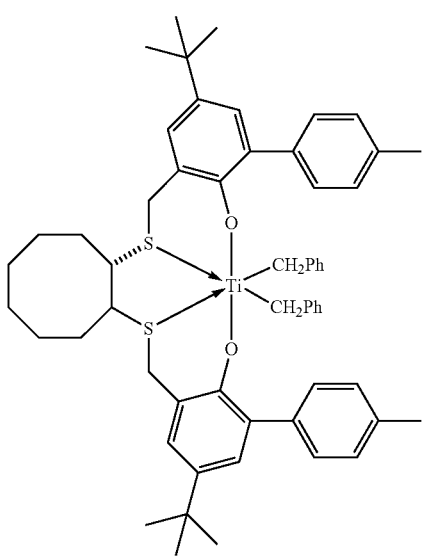
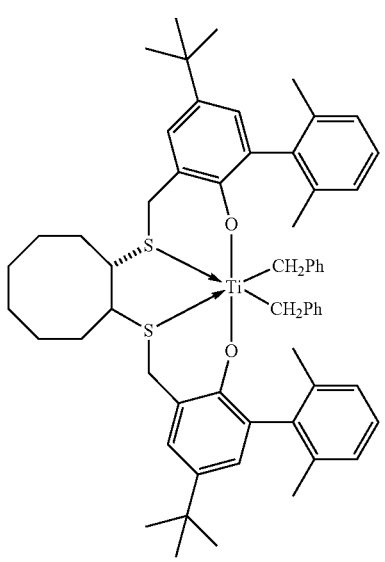
34
-continued
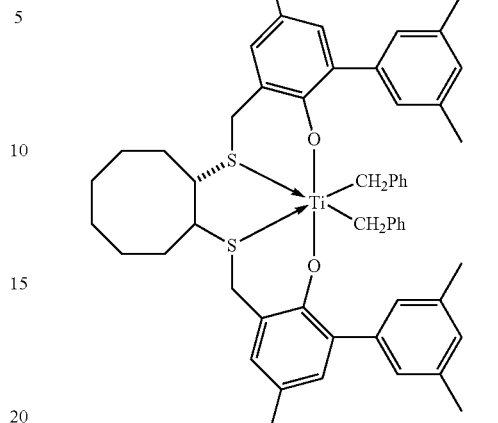
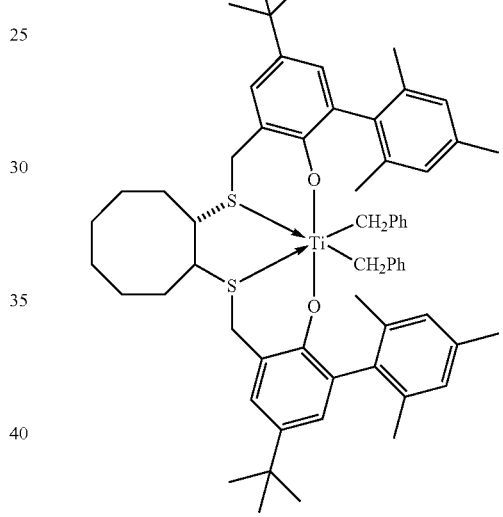
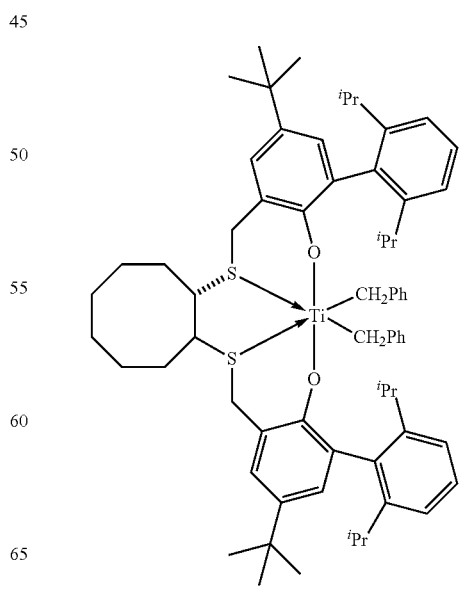

35
-continued
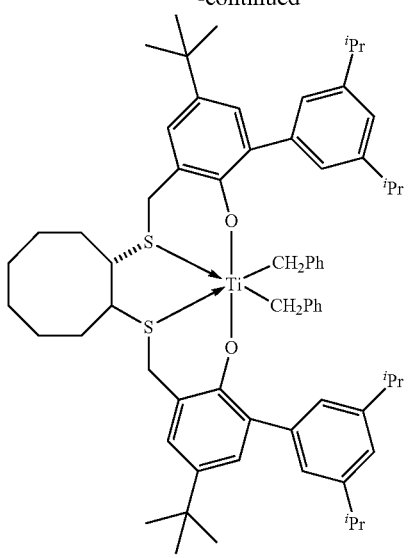
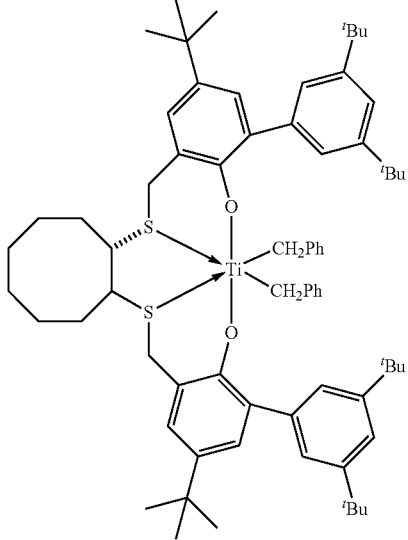
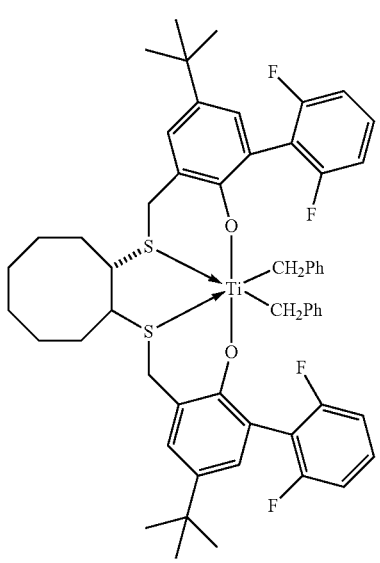
36
-continued
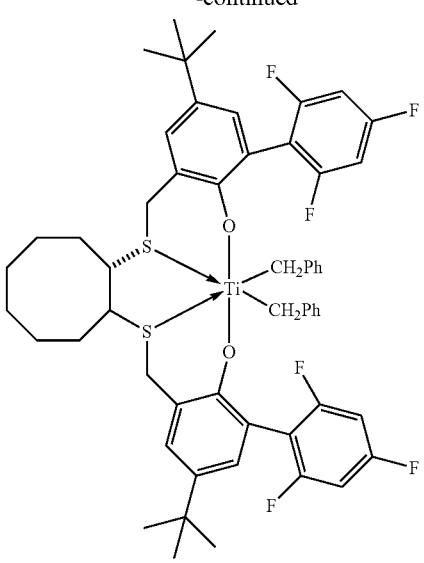
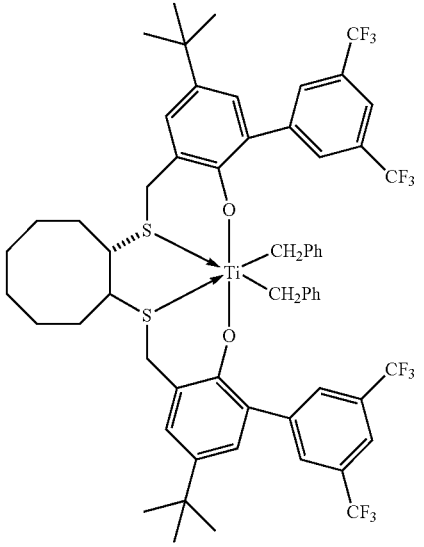
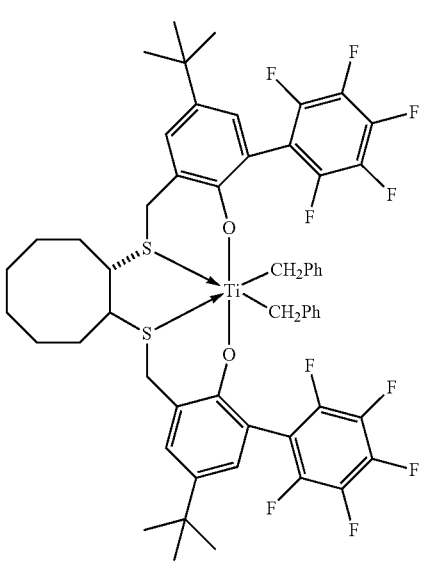

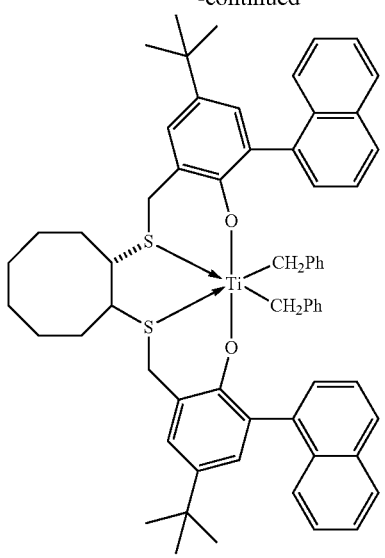
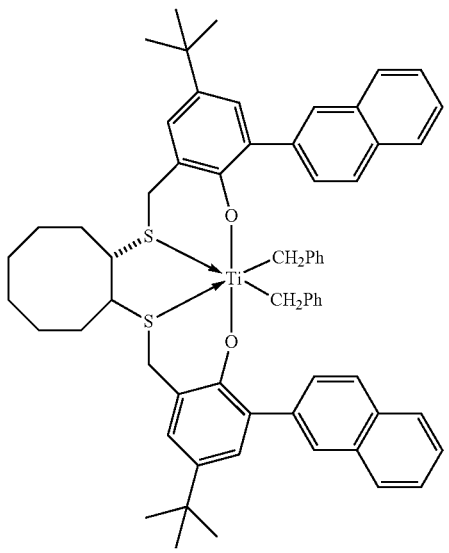
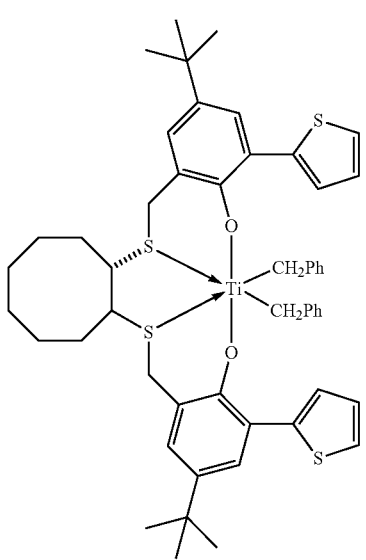
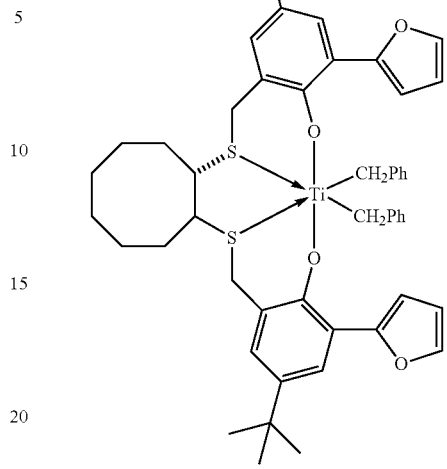
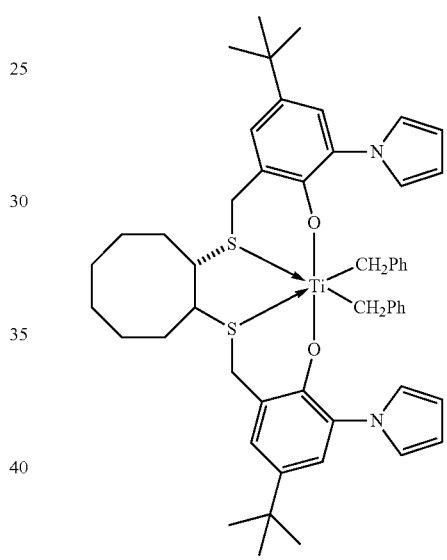
[Chem. 8]
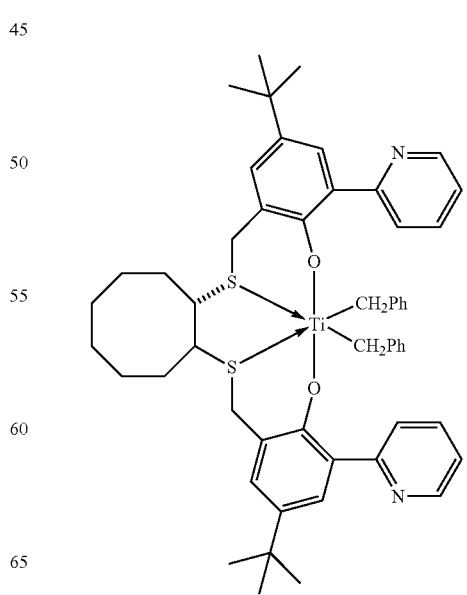

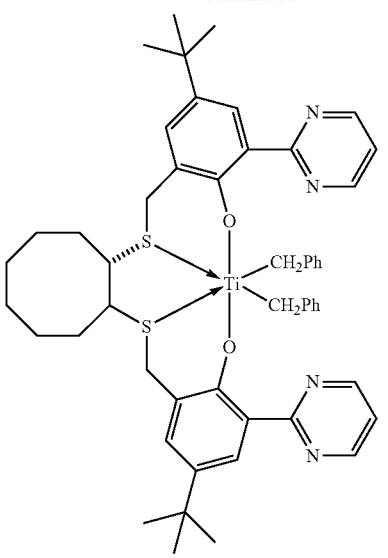

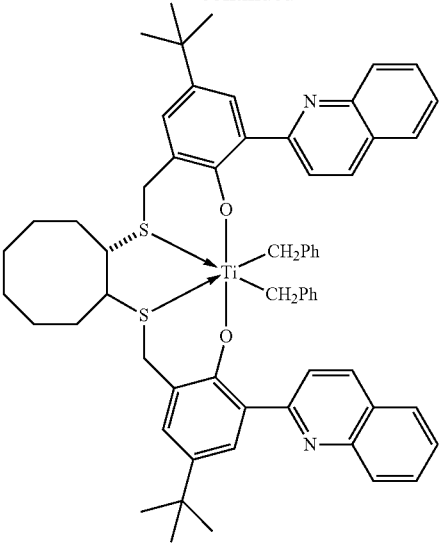

The examples of the transition metal compound (1) include, in addition to the compounds as shown above, the above compounds modified such that the two benzyl groups directly bonded to the individual titanium atoms are substituted with a chlorine atom, a methyl group, a dimethyl amino group, an isopropoxy group, a tert-butoxy group, or a phenoxy group.

The examples of the transition metal compound (1) further include the above compounds modified such that the titanium atom is substituted with a zirconium atom or a hafnium atom.

The examples of the transition metal compound (1) still further include the above compounds modified such that groups respectively corresponding to $R^{X3}$ and $R^{X7}$ in the formula (1) above are independently a hydrogen atom, a fluorine atom, a chlorine atom, a bromine atom, an iodine atom or a methyl group.

The examples of the transition metal compound (1) still further include the above compounds modified such that the cyclooctane ring crosslinking the sulfur atoms is substituted with a cycloheptane ring or a cyclohexane ring.

Preferable examples of the transition metal compound (1) include the following compounds:

[Chem. 9]

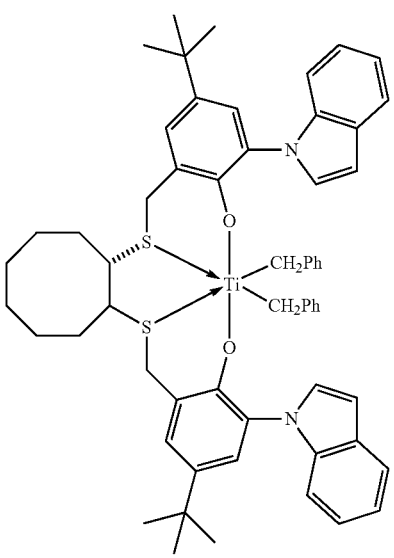

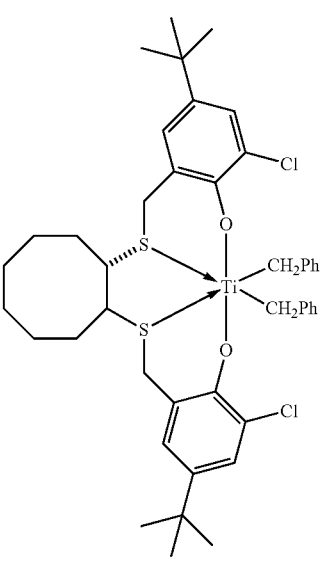

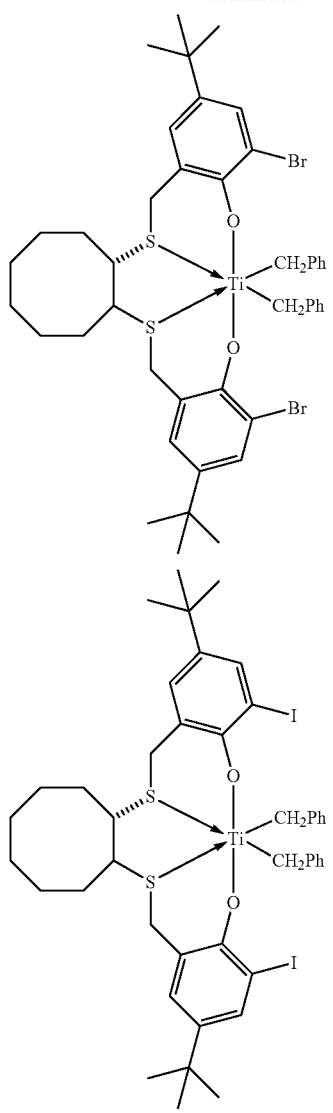
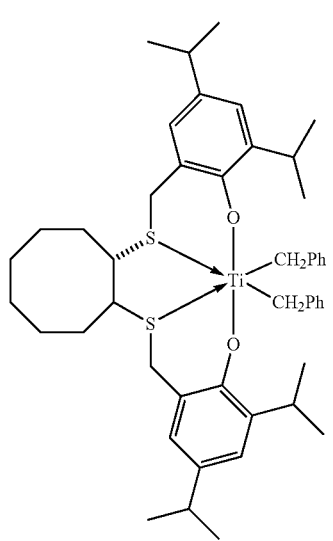
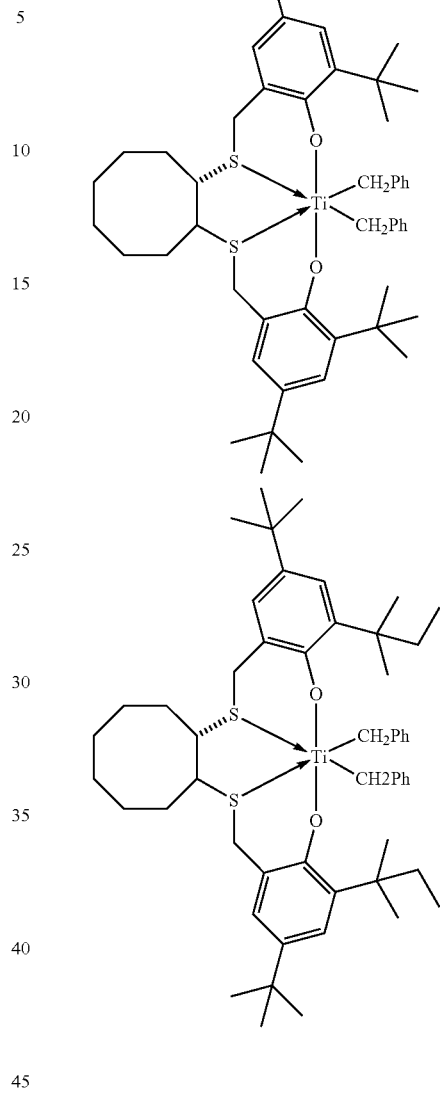

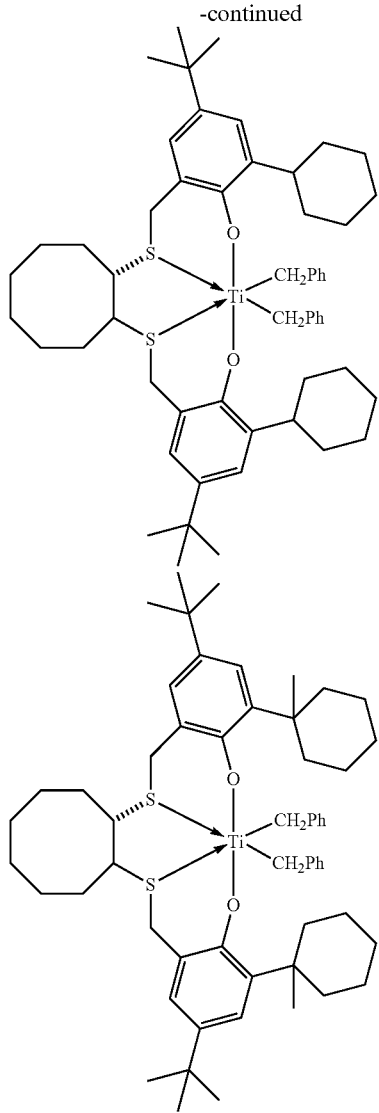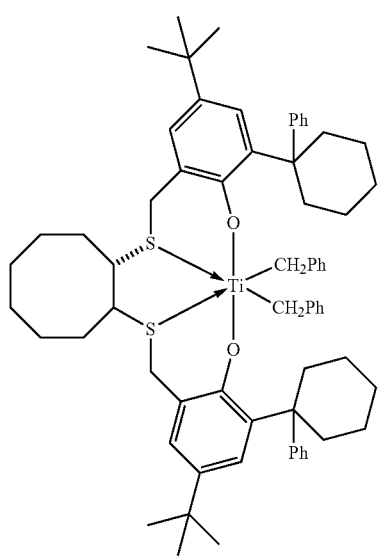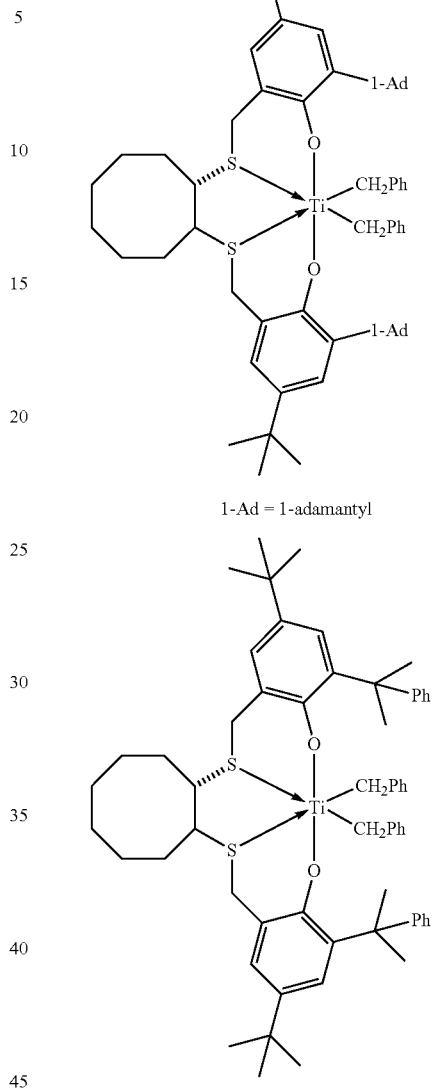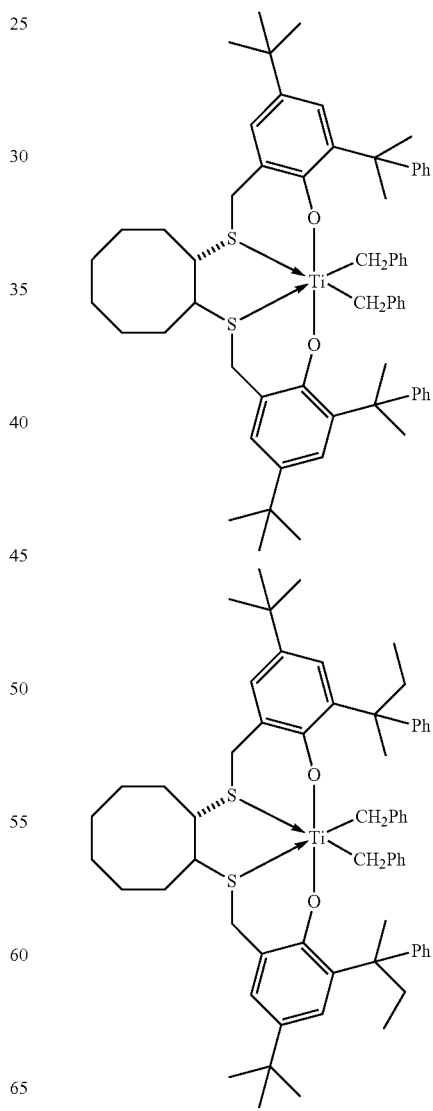
1-Ad = 1-adamantyl

45
-continued
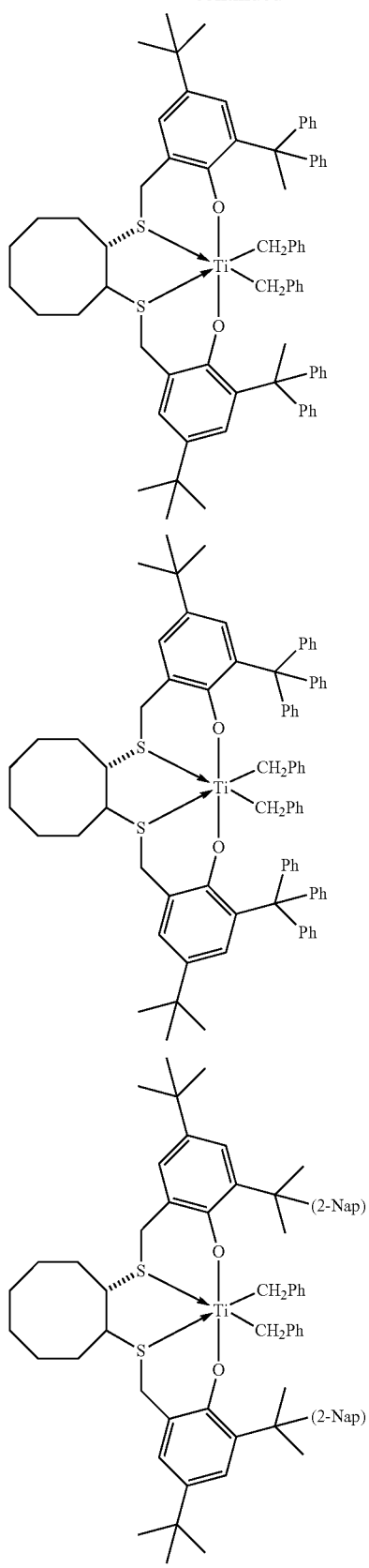
2-Nap = 2-naphthyl
46
-continued
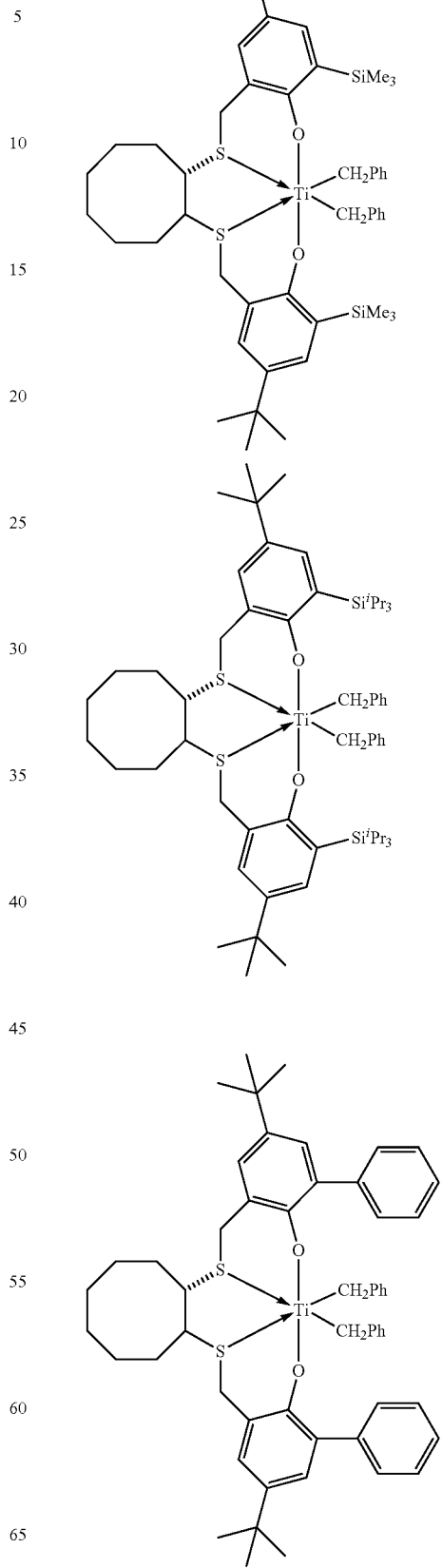

47
-continued
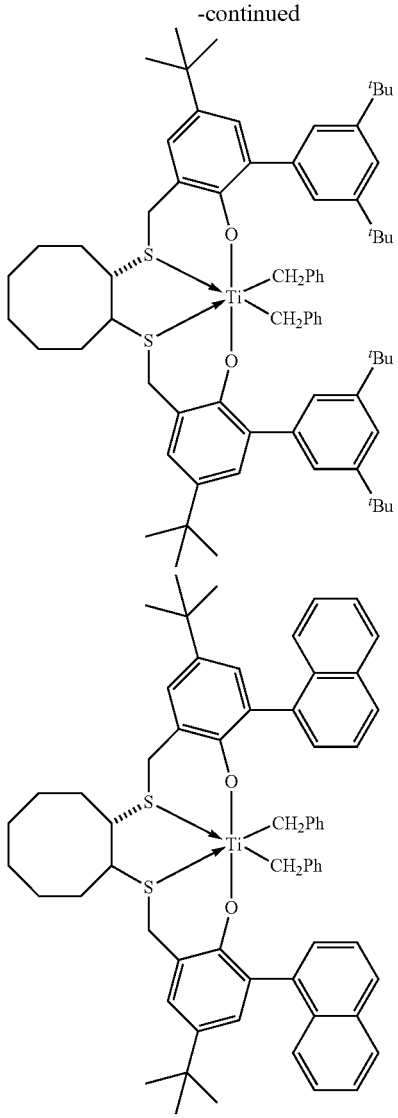
[Chem. 10]
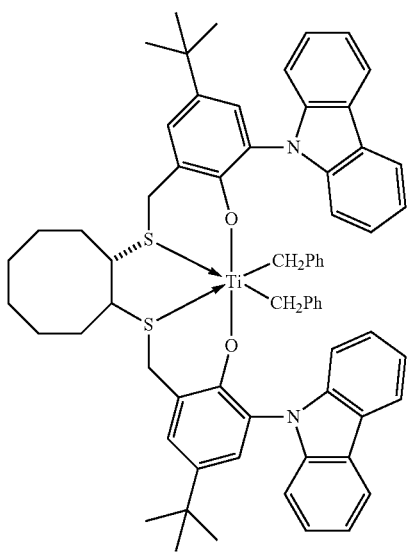
48
-continued
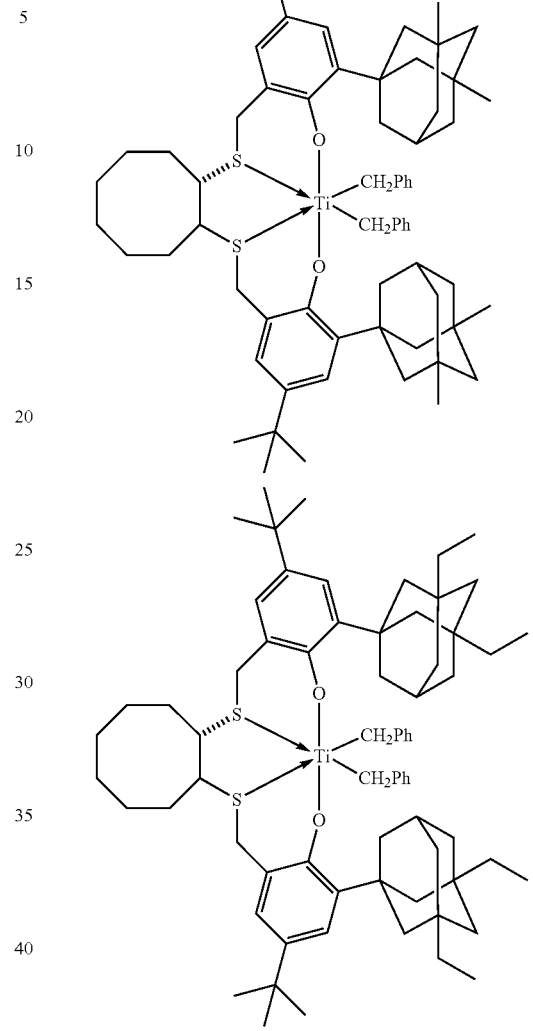
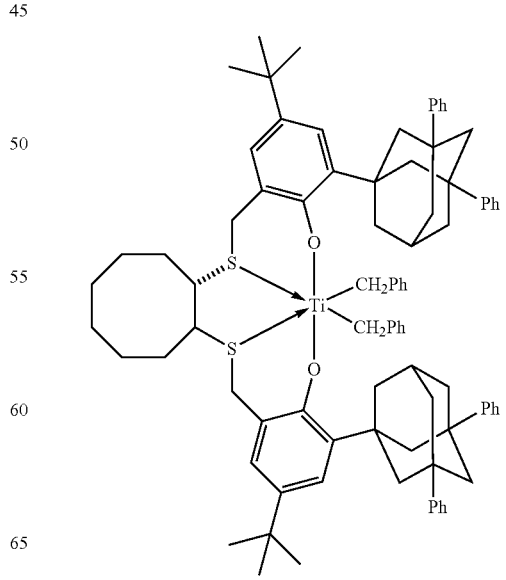

-continued

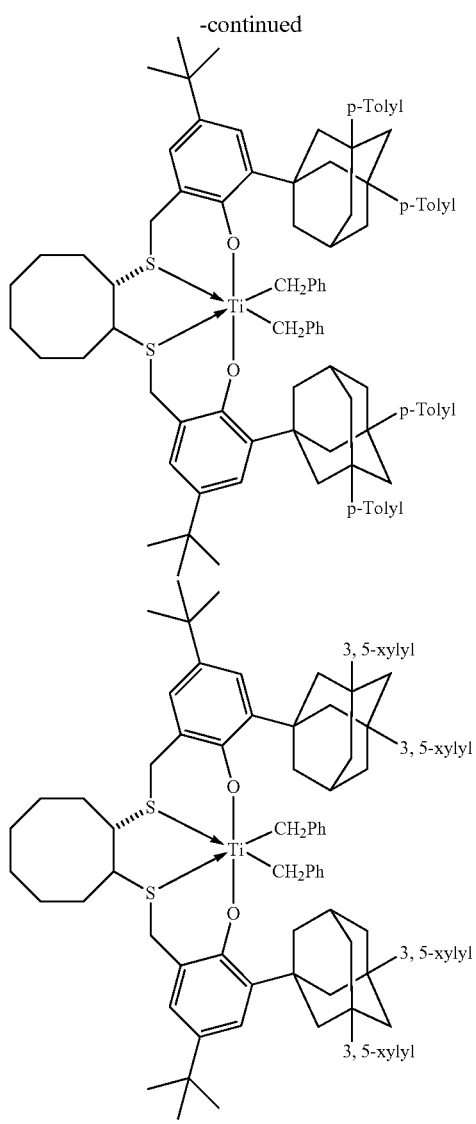

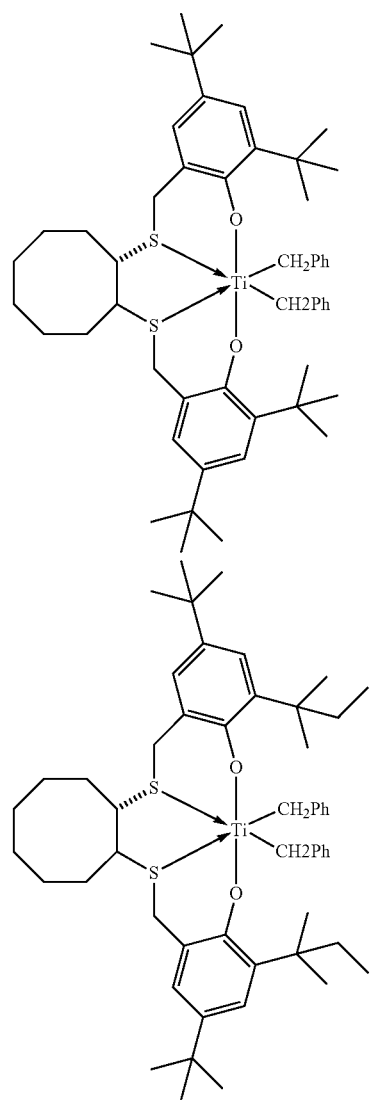

The preferable examples of the transition metal compound (A) include, in addition to the compounds as shown above, the above compounds modified such that the two benzyl groups directly bonded to the individual titanium atoms are substituted with a chlorine atom or a methyl group.

The preferable examples of the transition metal compound (A) further include the above compounds modified such that the titanium atom is substituted with a zirconium atom or a hafnium atom.

The preferable examples of the transition metal compound (A) still further include the above compounds modified such that groups respectively corresponding to $R^{X3}$ and $R^{X7}$ in the general formula (1) above are independently a hydrogen atom, a fluorine atom, a chlorine atom, a bromine atom, an iodine atom or a methyl group.

The preferable examples of the transition metal compound (A) still further include the above compounds modified such that the cyclooctane ring crosslinking the sulfur atoms is substituted with a cycloheptane ring.

More preferable examples of the transition metal compound (1) include the following compounds:

[Chem. 11]

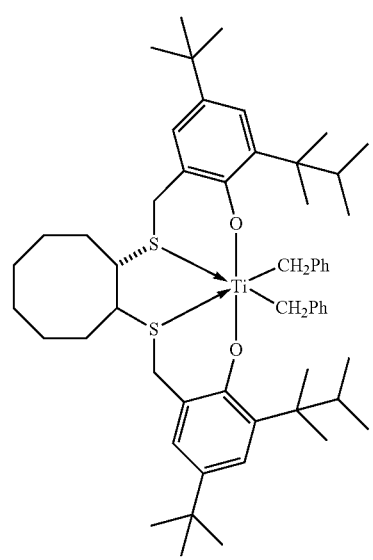

51
-continued
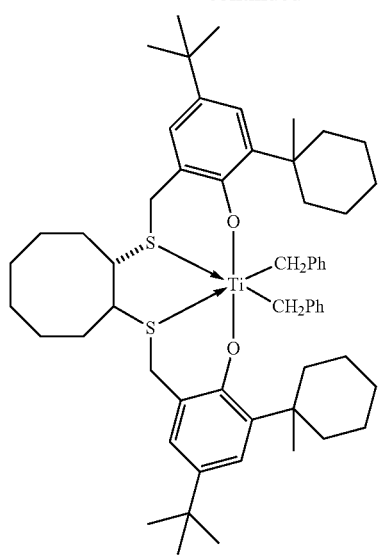
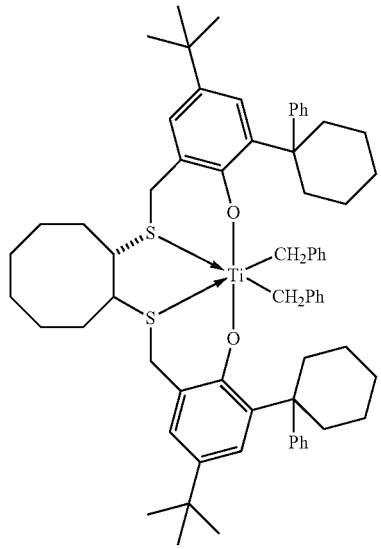
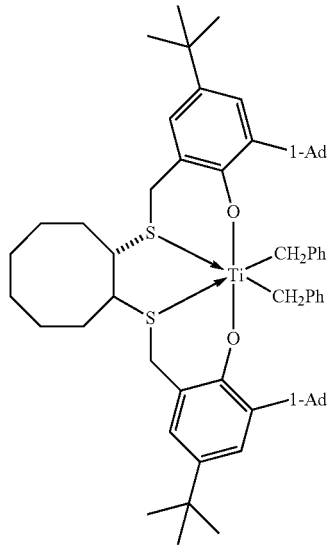
1-Ad = 1-adamantyl
52
-continued
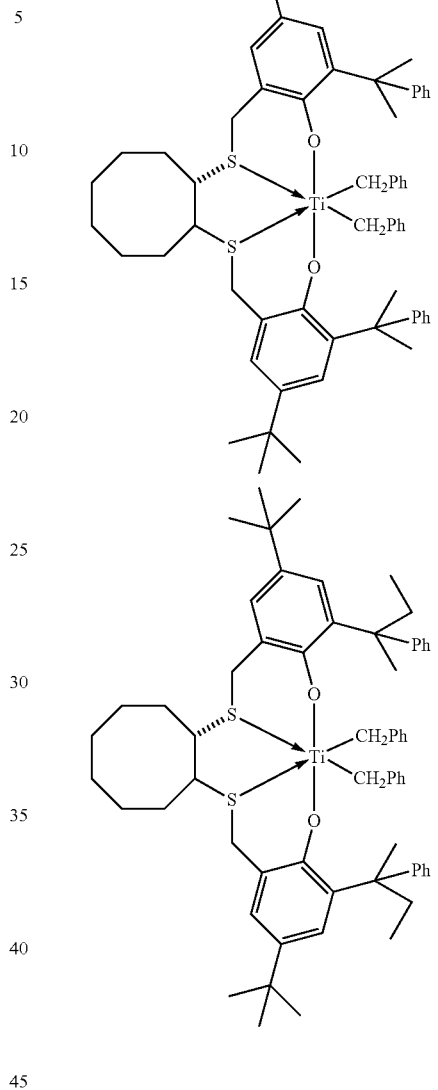
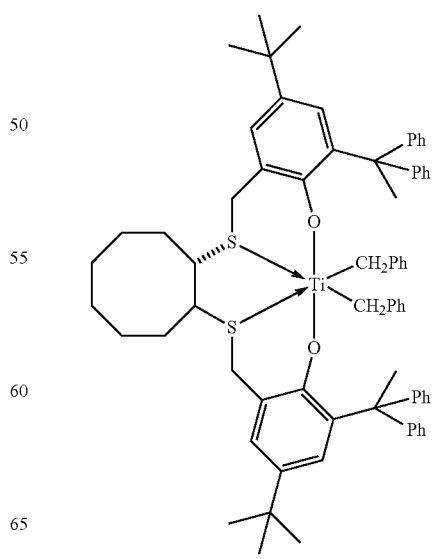

53
-continued
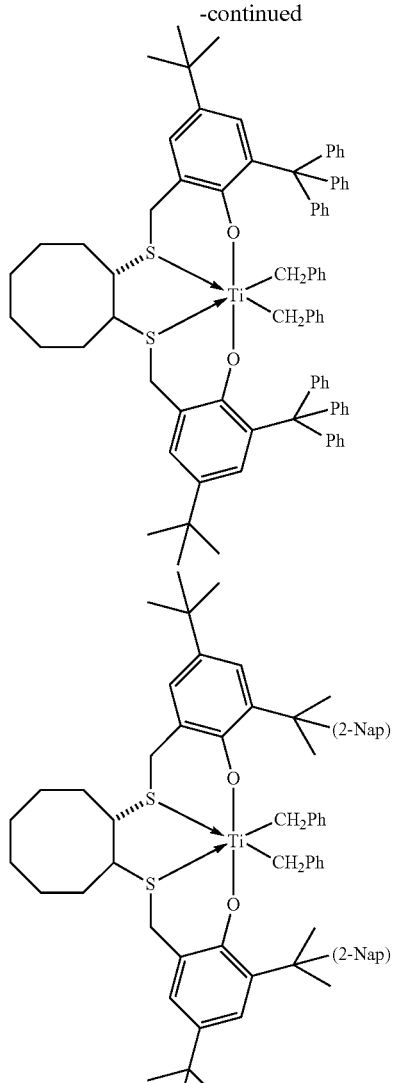
2-Nap = 2-naphthyl
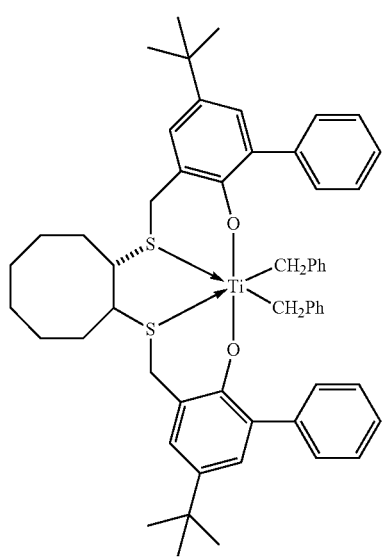
54
-continued
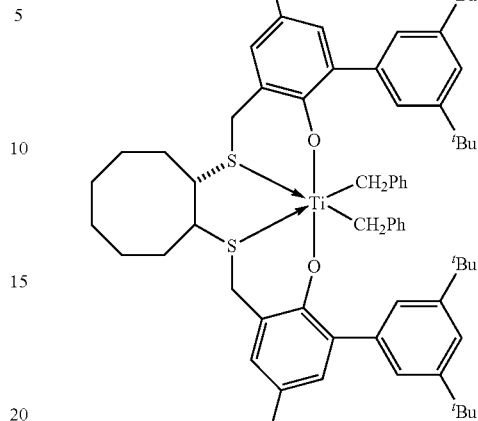
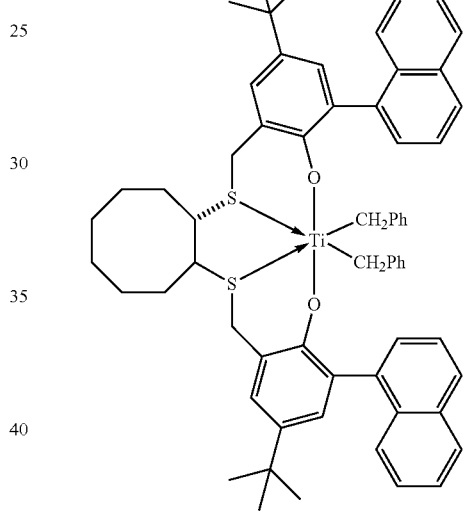
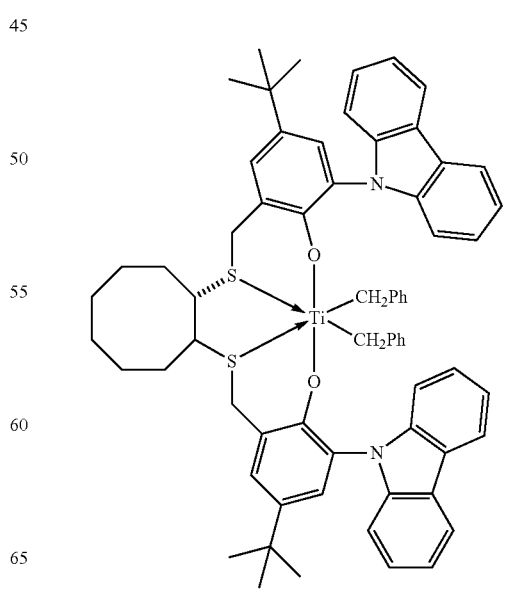

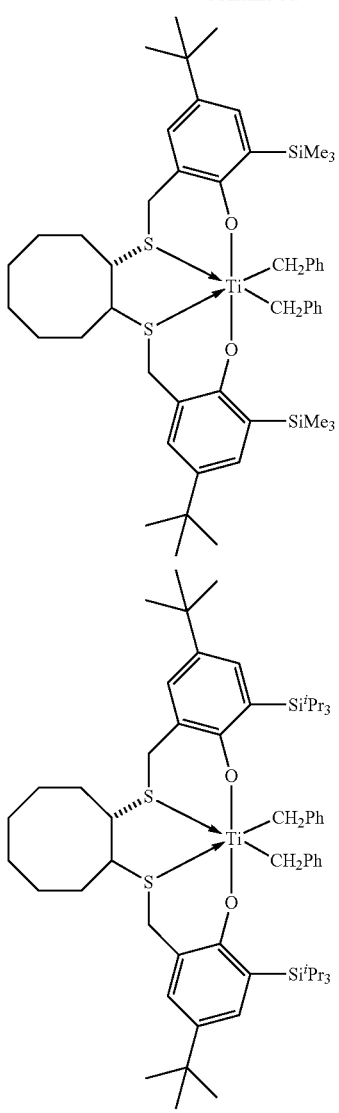

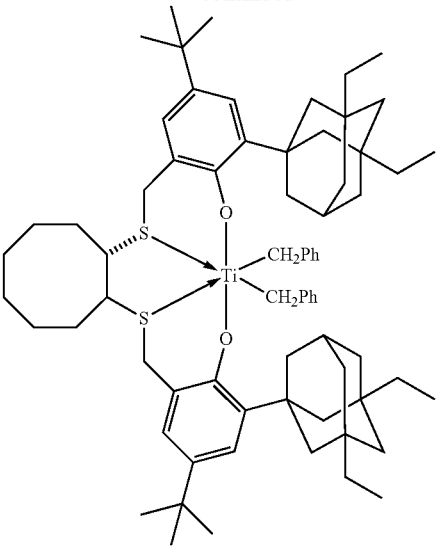

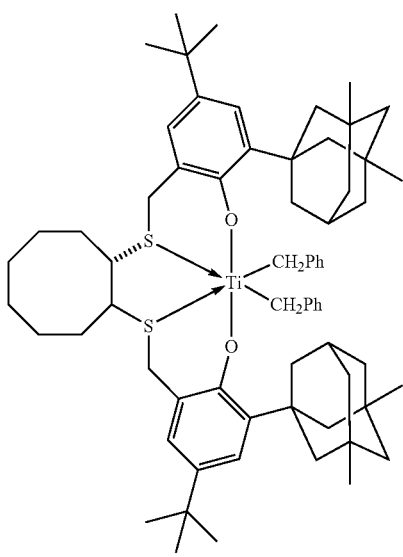

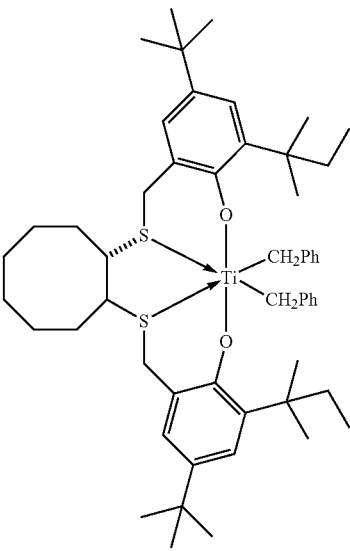

The more preferable examples of the transition metal compound (A) include, in addition to the compounds as shown above, the above compounds modified such that the two benzyl groups directly bonded to the individual titanium atoms are substituted with a chlorine atom.

The more preferable examples of the transition metal compound (A) further include the above compounds modified such that the titanium atom is substituted with a zirconium atom or a hafnium atom.

The more preferable examples of the transition metal compound (A) still further include the above compounds modified such that groups respectively corresponding to $R^{X3}$ and $R^{X7}$ in the general formula (1) above are a methyl group.

Particularly preferable examples of the transition metal compound (1) include the following compounds:

[Chem. 12]

[Chem. 13]

57
-continued
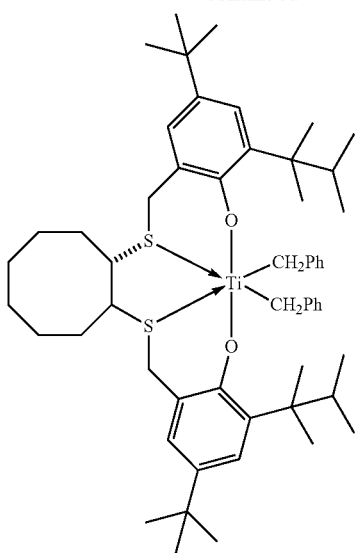
58
-continued
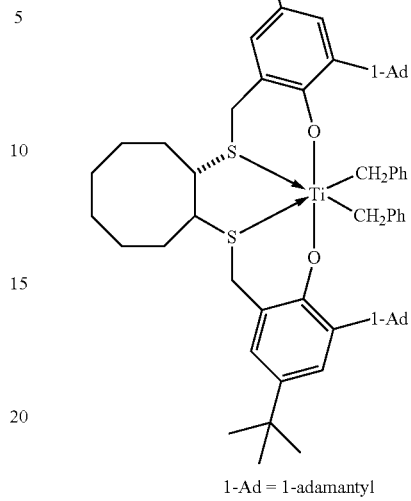
1-Ad = 1-adamantyl
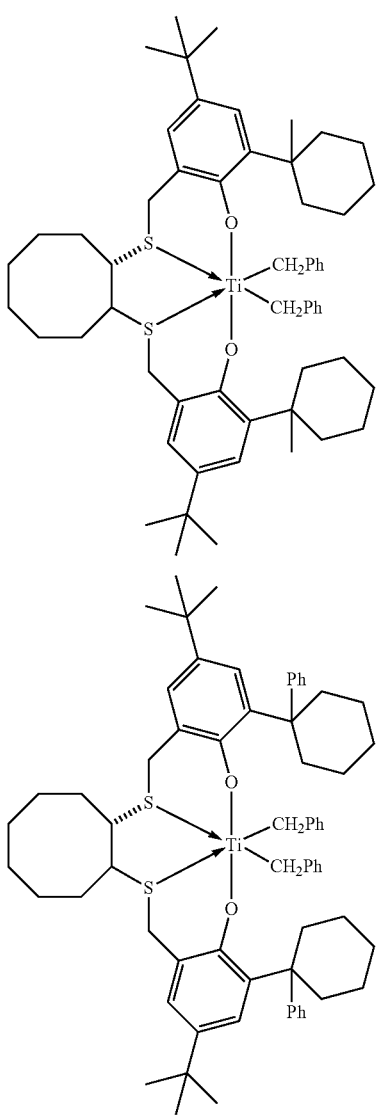
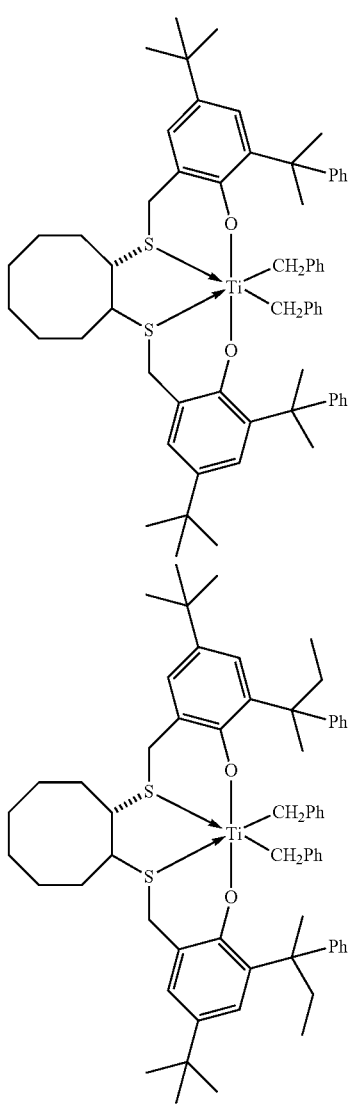

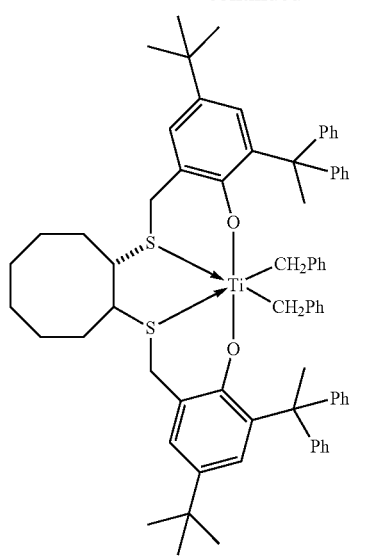
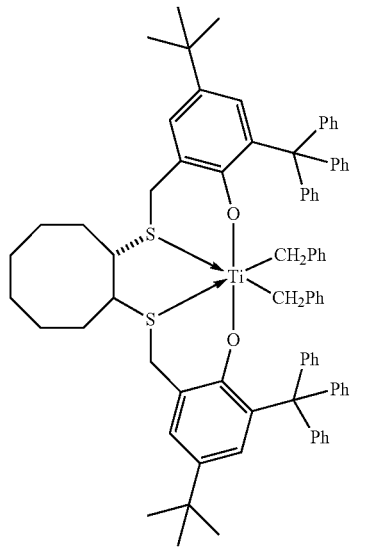
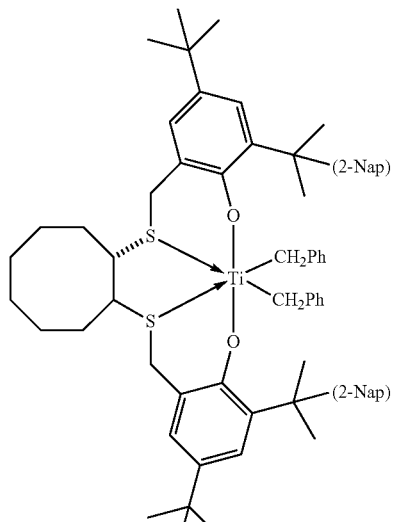
2-Nap = 2-naphthyl
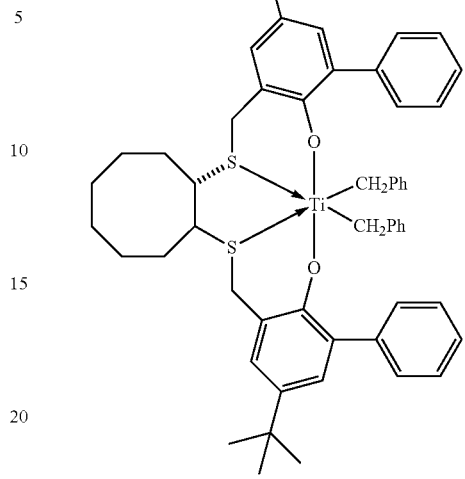
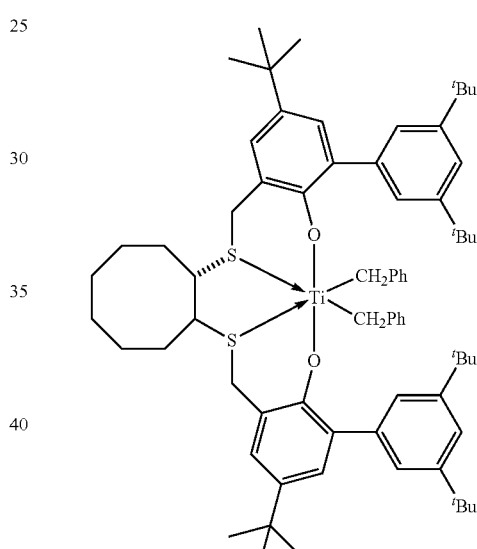
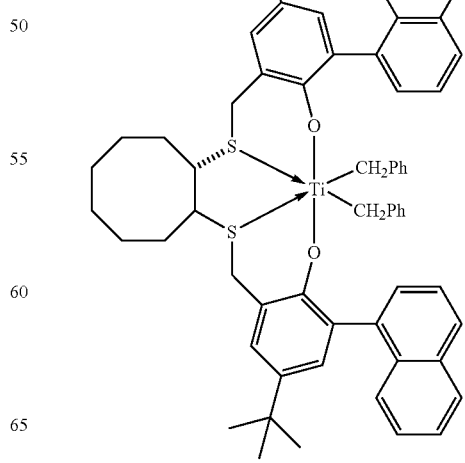

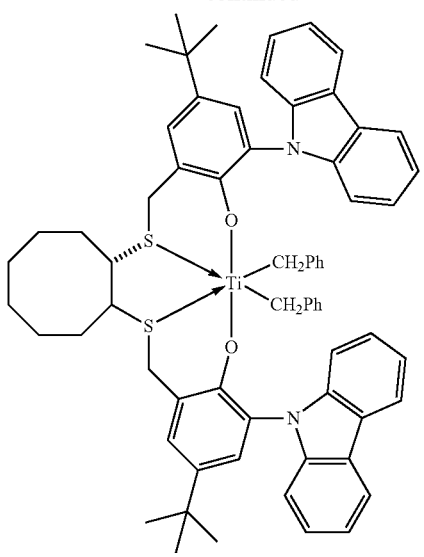

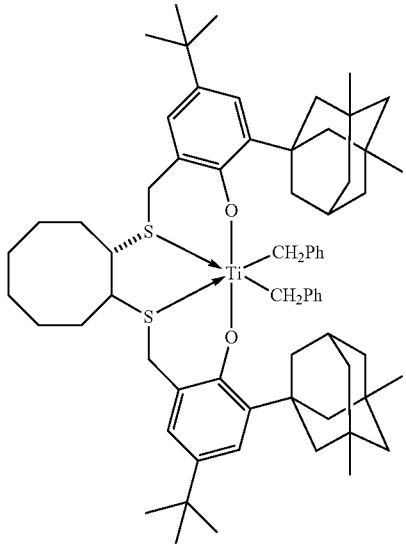

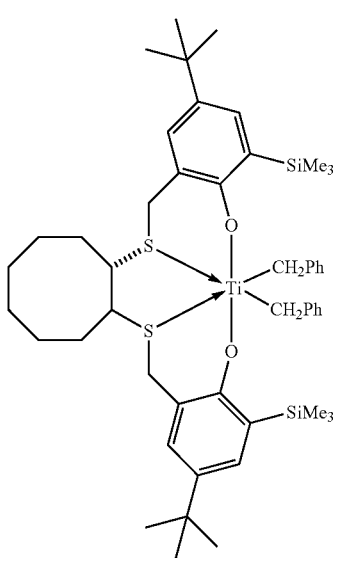

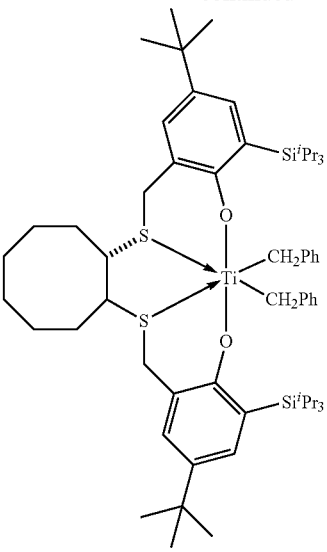

The particularly preferable examples of the transition metal compound (A) include, in addition to the compounds as shown above, the above compounds modified such that the two benzyl groups directly bonded to the individual titanium atoms are substituted with a chlorine atom.

The particularly preferable examples of the transition metal compound (A) further include the above compounds modified such that the titanium atom is substituted with a zirconium atom or a hafnium atom.

The particularly preferable examples of the transition metal compound (A) still further include the above compounds modified such that groups respectively corresponding to $R^{X3}$ and $R^{X7}$ in the general formula (1) above are a methyl group.

The transition metal compound (1) can be synthesized by, for example, a method described in Journal of American Chemical Society, 2009, Volume 131, 13566-13567. Specifically, the transition metal compound (A) represented by general formula (1) can be produced under scheme 1 below with use of a compound represented by general formula (2) (hereinafter "compound (2)") and a compound represented by general formula (3) (hereinafter "compound (3)") as starting materials. $R^{X1}$-$R^{X8}$ and n in the general formula (2) are equal to $R^{X1}$-$R^{X8}$ and n in the general formula (1).

scheme 1

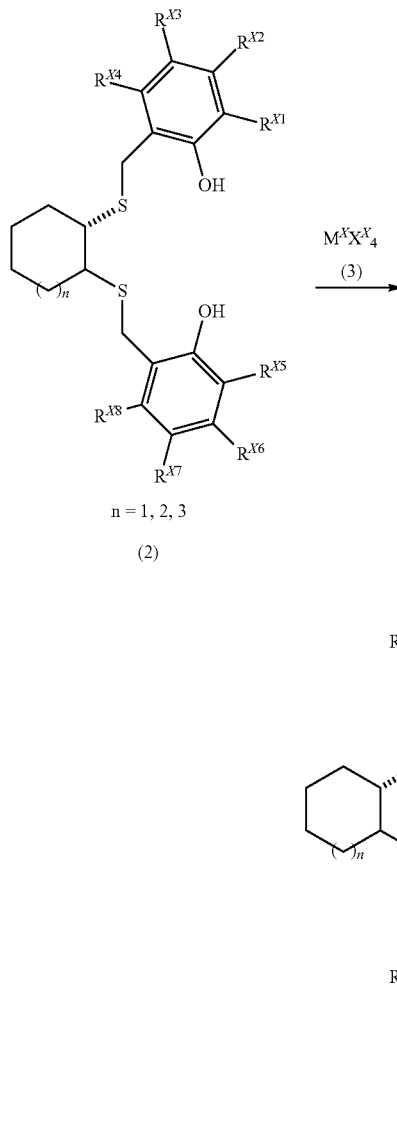

[Chem. 14]

$M^X$ and $X^X$ in the general formula (3) are the same as $M^X$ and $X^X$ in the general formula (1), respectively. Examples of $M^X X^X_4$ include Ti(CH$_2$Ph)$_4$, TiCl$_2$(CH$_2$Ph)$_2$, Ti(CH$_2$SiMe$_3$)$_4$, TiF$_4$, TiCl$_4$, TiBr$_4$, TiI$_4$, Ti(OMe)$_4$, Ti(OEt)$_4$, Ti(O-i-Pr)$_4$, TiCl$_2$(O-i-Pr)$_2$, Ti(O-n-Bu)$_4$, Ti(O-i-Bu)$_4$, Ti(O-t-Bu)$_4$, Ti(OPh)$_4$, Ti(NMe$_2$)$_4$, TiCl$_2$(NMe$_2$)$_2$, Ti(NEt$_2$)$_4$, Zr(CH$_2$Ph)$_4$, ZrCl$_2$(CH$_2$Ph)$_2$, Zr(CH$_2$SiMe$_3$)$_4$, ZrF$_4$, ZrCl$_4$, ZrBr$_4$, ZrI$_4$, Zr(OMe)$_4$, Zr(OEt)$_4$, Zr(O-i-Pr)$_4$, ZrCl$_2$(O-i-Pr)$_2$, Zr(O-n-Bu)$_4$, Zr(O-i-Bu)$_4$, Zr(O-t-Bu)$_4$, Zr(OPh)$_4$, Zr(NMe$_2$)$_4$, ZrCl$_2$(NMe$_2$)$_2$, Zr(NEt$_2$)$_4$, Hf(CH$_2$Ph)$_4$, HfCl$_2$(CH$_2$Ph)$_2$, Hf(CH$_2$SiMe$_3$)$_4$, HfF$_4$, HfCl$_4$, HfBr$_4$, HfI$_4$, Hf(OMe)$_4$, Hf(OEt)$_4$, Hf(O-i-Pr)$_4$, HfCl$_2$(O-i-Pr)$_2$, Hf(O-n-Bu)$_4$, Hf(O-i-Bu)$_4$, Hf(O-t-Bu)$_4$, Hf(OPh)$_4$, Hf(NMe$_2$)$_4$, HfCl$_2$(NMe$_2$)$_2$, and Hf(NEt$_2$)$_4$. $M^X X^X_4$ is preferably Ti(CH$_2$Ph)$_4$, TiCl$_2$(CH$_2$Ph)$_2$, Ti(CH$_2$SiMe$_3$)$_4$, TiCl$_4$, TiBr$_4$, Ti(OMe)$_4$, Ti(OEt)$_4$, Ti(O-i-Pr)$_4$, Ti(O-t-Bu)$_4$, Ti(OPh)$_4$, Ti(NMe$_2$)$_4$, TiCl$_2$(NMe$_2$)$_2$, Ti(NEt$_2$)$_4$, Zr(CH$_2$Ph)$_4$, ZrCl$_2$(CH$_2$Ph)$_2$, Zr(CH$_2$SiMe$_3$)$_4$, ZrCl$_4$, ZrBr$_4$, Zr(OMe)$_4$, Zr(OEt)$_4$, Zr(O-i-Pr)$_4$, Zr(O-i-Bu)$_4$, Zr(O-t-Bu)$_4$, Zr(OPh)$_4$, Zr(NMe$_2$)$_4$, ZrCl$_2$(NMe$_2$)$_2$, Zr(NEt$_2$)$_4$, Hf(CH$_2$Ph)$_4$, HfCl$_2$(CH$_2$Ph)$_2$, Hf(CH$_2$SiMe$_3$)$_4$, HfCl$_4$, HfBr$_4$, Hf(OMe)$_4$, Hf(OEt)$_4$, Hf(O-i-Pr)$_4$, Hf(O-i-Bu)$_4$, Hf(O-t-Bu)$_4$, Hf(OPh)$_4$, Hf(NMe$_2$)$_4$, HfCl$_2$(NMe$_2$)$_2$, or Hf(NEt$_2$)$_4$.

The transition metal compound (A) may be produced by (i) directly reacting the compound (2) and the compound (3) or (ii) reacting the compound (2) with a base and then reacting the resultant with the compound (3). These reactions are generally performed in a solvent. The base to be used is, for example, an organolithium reagent, a Grignard reagent, or a metal hydride. Specific examples of the base encompass n-butyllithium, sec-butyllithium, tert-butyllithium, lithium diisopropylamide, lithium hexamethyldisilazane, potassium hexamethyldisilazane, sodium hydride, and potassium hydride. The base is preferably n-butyllithium, lithium diisopropylamide, potassium hexamethyldisilazane, sodium hydride, or potassium hydride.

The compound obtained by the reaction of the compound (2) with the base, the transition metal compound (A), and the compound (3) are generally unstable with respect to air and moisture. Therefore, it is preferable that the above reactions be carried out under dehydrated and deoxygenated conditions, and more specifically in an atmosphere of dry nitrogen or dry argon.

The amount of the compound (2) used needs only to be not smaller than 1 molar equivalent relative to the compound (3), preferably in a range from 1.0 to 1.5 molar equivalents. In cases where the reaction lefts over the compound (2), the compound (3) may be further added in the reaction.

The reaction of the compounds (2) and (3) is carried out at a temperature generally in a range from −100° C. to 150° C. and preferably in a range from −80° C. to 50° C.

With regard to a length of time the reaction of the compounds (2) and (3) is carried out, the reaction needs only to be carried out until a yield of product reaches the highest, preferably for 5 minutes to 48 hours, and more preferably for 10 minutes to 24 hours.

The reaction of the compounds (2) and the base is carried out at a temperature generally in a range from −100° C. to 150° C. and preferably in a range from −80° C. to 50° C.

With regard to a length of time the reaction of the compound (2) and the base is carried out, the reaction needs only to be carried out until a yield of product reaches the highest, for 5 minutes to 24 hours, preferably for 10 minutes to 12 hours, and more preferably for 30 minutes to 3 hours.

The reaction of (i) the compound formed by the reaction of the compound (2) and the base and (ii) the compound (3) is carried out at a temperature generally in a range from −100° C. to 150° C. and preferably in a range from −80° C. to 50° C.

With regard to a length of time the reaction of (i) the compound formed by the reaction of the compound (2) and the base and (ii) the compound (3) is carried out, the reaction needs only to be carried out until a yield of product reaches the highest, for 5 minutes to 48 hours and preferably for 10 minutes to 24 hours.

The reactions may be carried out with any solvent generally used for reactions similar to the above-described reactions, and examples of the solvent for use in the reactions include a hydrocarbon solvent or an ethers solvent. The solvent is preferably toluene, benzene, o-xylene, m-xylene, p-xylene, hexane, pentane, heptane, cyclohexane, diethyl ether, or tetrahydrofuran, and more preferably diethyl ether, toluene, tetrahydrofuran, hexane, pentane, heptane, or cyclohexane.

The compound (2) can be synthesized in accordance with a method described in Journal of American Chemical Society, 2009, Volume 131, 13566-13567, for example. More specifically, the compound (2) can be produced by scheme 2 shown below. The following will describe the steps of the scheme 2 in detail. Compounds represented by General Formulae (4)-(7) below are hereinafter referred to as "Compounds (4)-(7)".

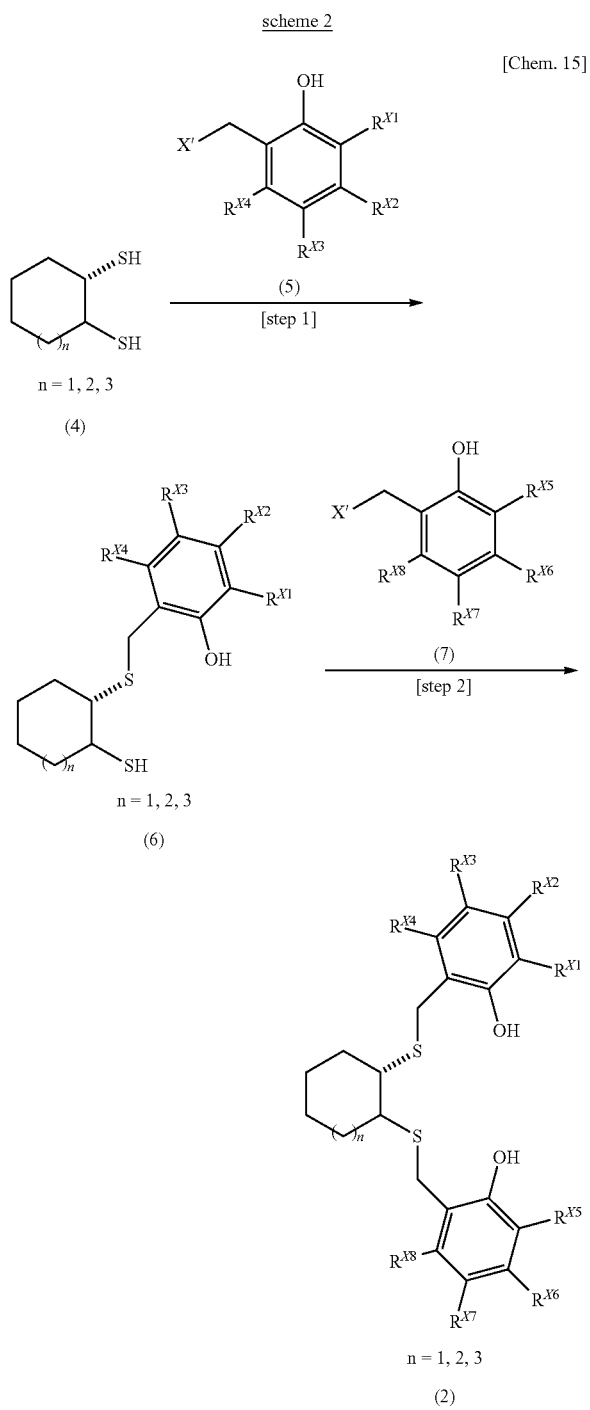

scheme 2

[Chem. 15]

In the scheme 2, $R^{X1}$ to $R^{X8}$ and n in the compounds are the same as $R^{X1}$ to $R^{X8}$ and n in the general formula (1).

X' represents an anionic leaving group and is, for example, a halogen atom, an acetate group, a trifluoroacetate group, a benzoate group, a $CF_3SO_3$ group, a $CH_3SO_3$ group, a 4-$MeC_6H_4SO_3$ group, a $PhSO_3$ group, or the like, and preferably a chlorine atom, a bromine atom, an iodine atom, a $CF_3SO_3$ group, a $CH_3SO_3$ group, a 4-$MeC_6H_4SO_3$ group, or a $PhSO_3$ group.

[Step 1]

A compound (6) can be synthesized by causing a compound (4) to react with a compound (5) of 1.0 to 4.0 equivalents, preferably 1.0 to 1.5 equivalents in the presence of a base.

The base is exemplified by an inorganic base, such as potassium carbonate, calcium carbonate, sodium carbonate, potassium hydrogencarbonate, calcium hydrogencarbonate, and sodium hydrogencarbonate, and an amine base such as triethylamine and triisobutylamine, and preferably an amine base.

The reaction can be carried out in an atmosphere of air, helium, argon, or nitrogen, preferably in an atmosphere of helium, argon, or nitrogen, and more preferably in an atmosphere of nitrogen or argon.

After the completion of the reaction, the compound (6) may be purified. A method for the purification is exemplified by the following method. The reaction solution is mixed with an aqueous solution of ammonium chloride, an aqueous solution of hydrochloric acid, or an aqueous solution of sodium chloride. Subsequently, the mixture solution is mixed with ethyl acetate or diethyl ether and then subjected to an extraction operation so that a surplus base or salt is removed. An additional purification operation such as distillation, recrystallization, or silica gel chromatography allows the compound (6) to have a higher purity.

[Step 2]

The compound (2) can be synthesized by causing the compound (6) to react with 1.0 to 4.0 equivalents, and preferably 1.0 to 1.5 equivalents of a compound (7) in the presence of the base.

The base is exemplified by an inorganic base, such as potassium carbonate, calcium carbonate, sodium carbonate, potassium hydrogencarbonate, calcium hydrogencarbonate, and sodium hydrogencarbonate, and an amine base such as triethylamine and triisobutylamine, and preferably an amine base.

The reaction in the step 2 can be carried out in an atmosphere of air, helium, argon, or nitrogen, preferably in an atmosphere of helium, argon, or nitrogen, and more preferably in an atmosphere of nitrogen or argon.

After the completion of the reaction, the compound (2) may be purified. A method for the purification is exemplified by the following method. The reaction solution is mixed with an aqueous solution of ammonium chloride, an aqueous solution of hydrochloric acid, or an aqueous solution of sodium chloride. Subsequently, the mixture solution is mixed with ethyl acetate or diethyl ether and then subjected to an extraction operation so that a surplus base or salt is removed. An additional purification operation such as distillation, recrystallization, or silica gel chromatography allows the compound (2) to have a higher purity.

The compound (2) can also be obtained by causing the compound (6), which has been produced in a reactor, and the compound (7) to react with each other in the reactor by controlling the reaction condition in the [step 1].

In a case where $R^{X1}$ is the same as $R^{X5}$, $R^{X2}$ is the same as $R^{X6}$, $R^{X3}$ is the same as $R^{X7}$, and $R^{X4}$ is the same as $R^{X8}$, the compound (2) can be synthesized by mixing the compound (5) and the compound (7) together, and in the presence of a base, reacting the compound (4) with the mixture of 2.0 to 8.0 equivalents, and preferably 2.0 to 4.0 equivalents with respect to the compound (4).

Specific examples of the compound (2) include the following compounds.
[Chem. 16]
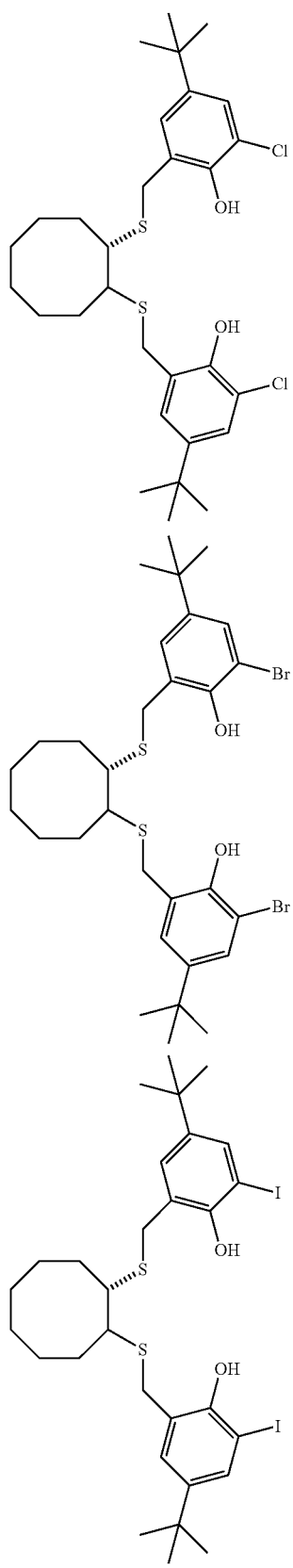
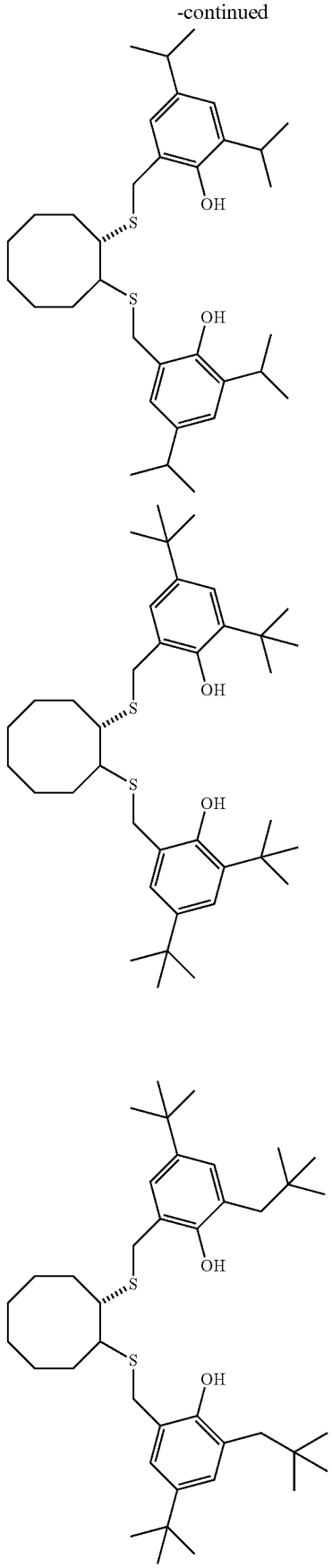

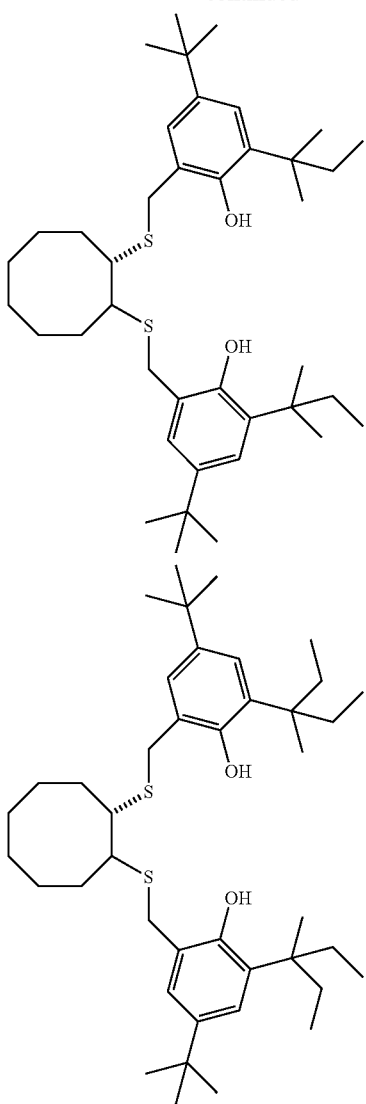
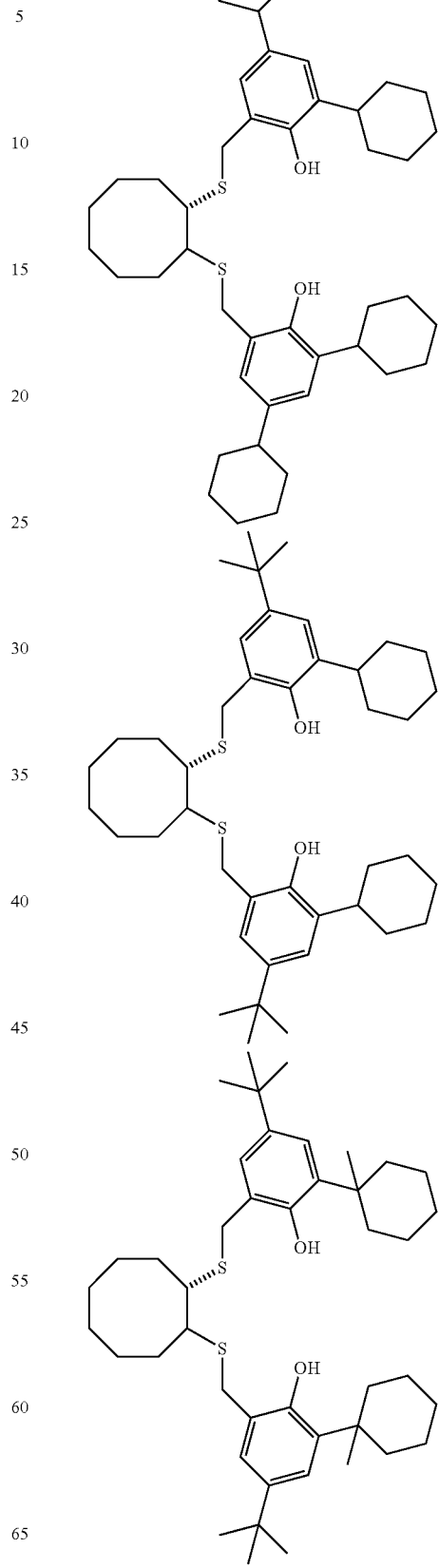

71
-continued
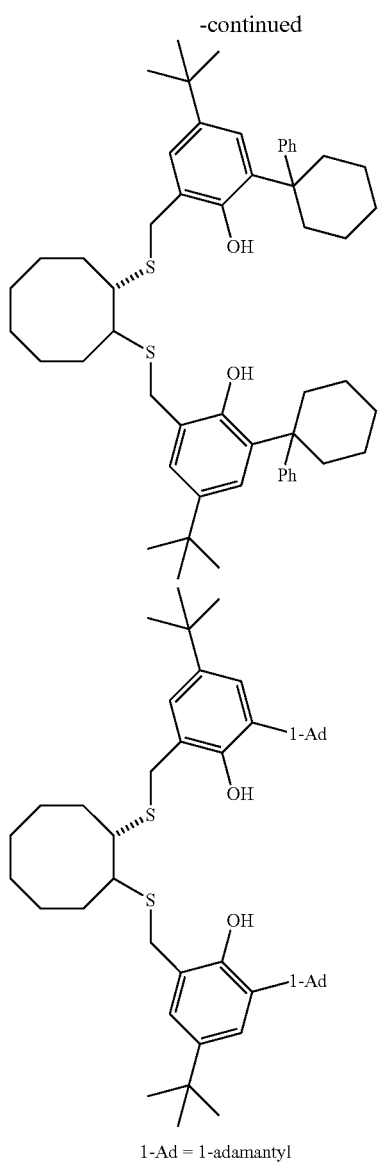
1-Ad = 1-adamantyl
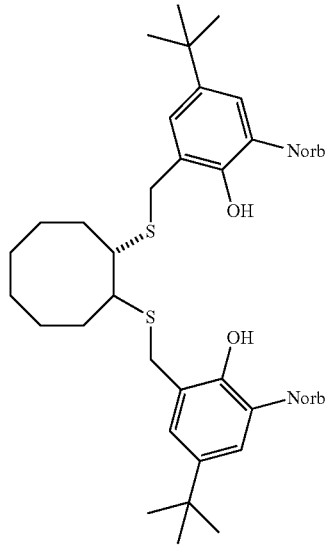
Norb = norbornyl
72
-continued
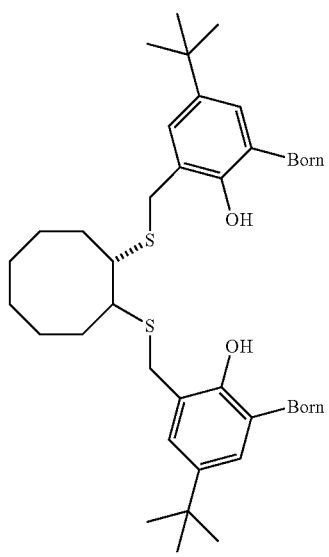
Born = bornyl
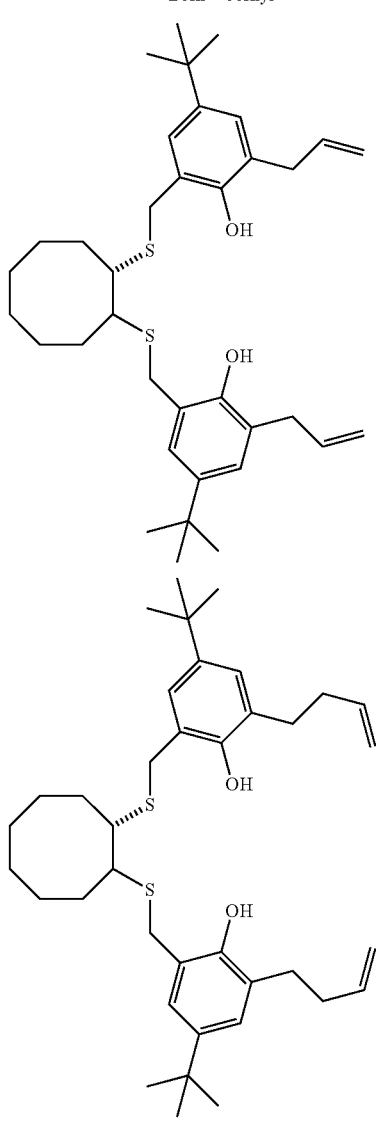

[Chem. 17]
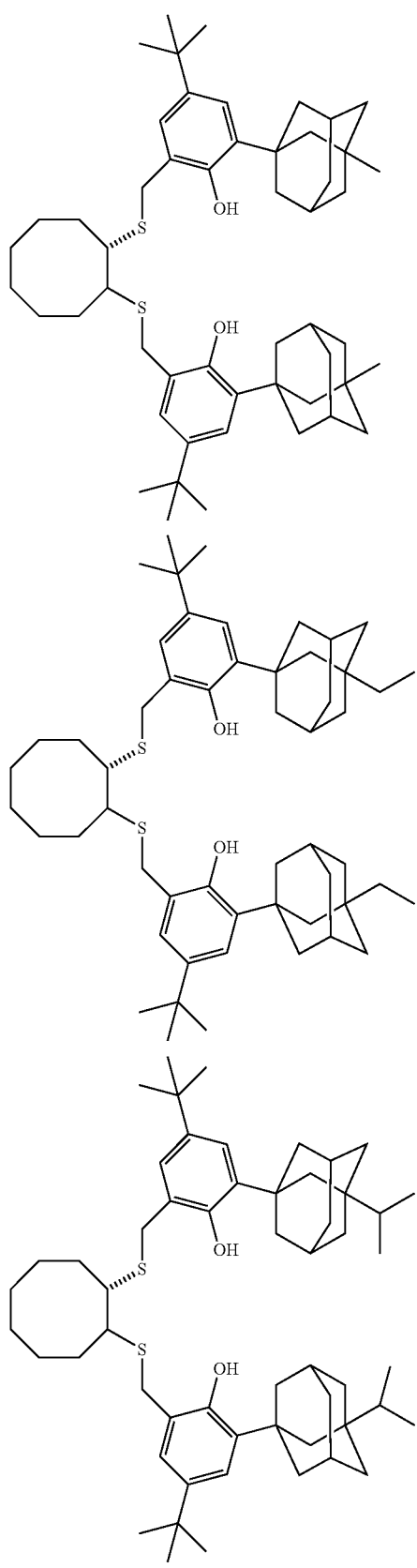 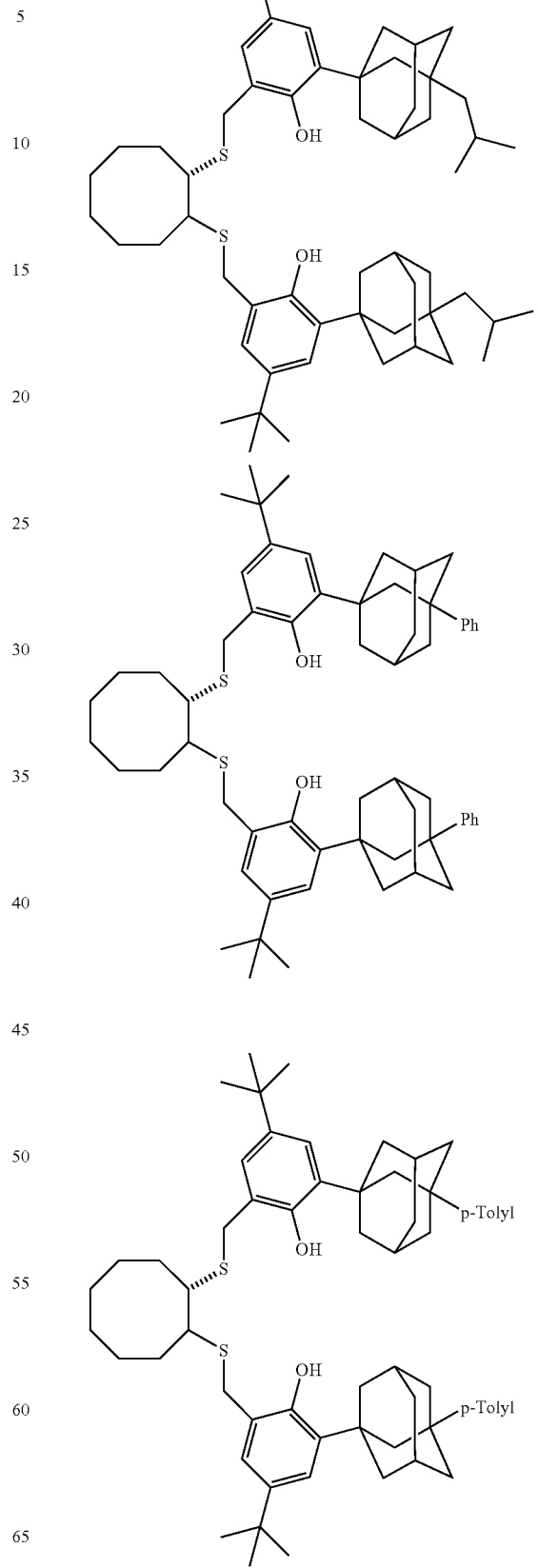

75
-continued
76
-continued
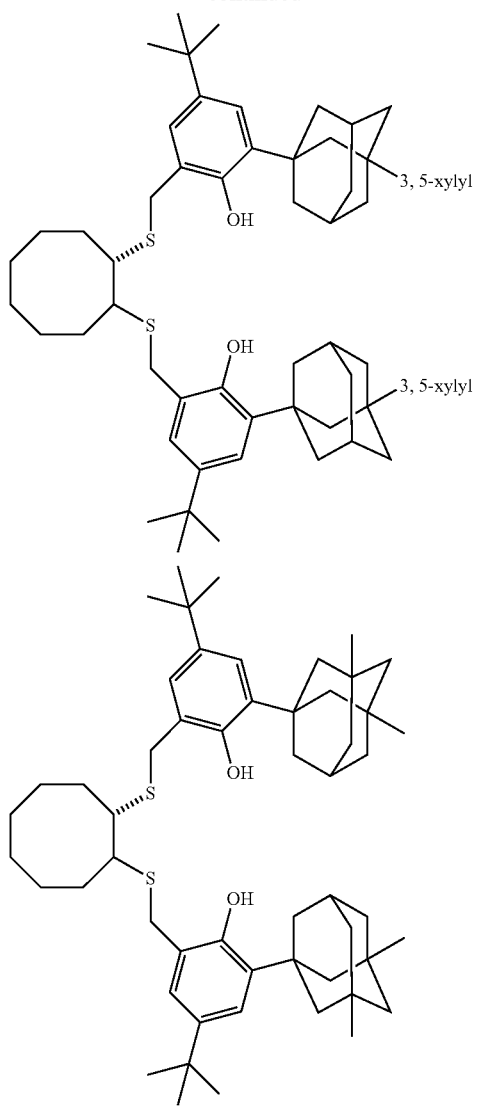
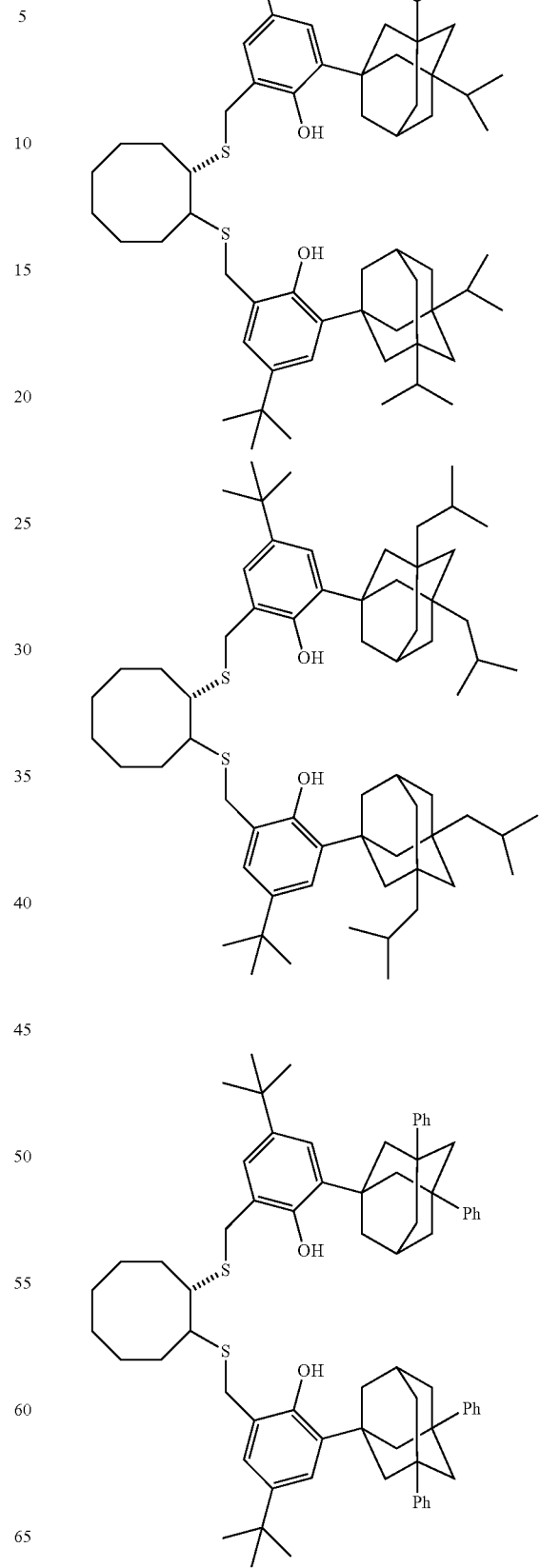

77
-continued
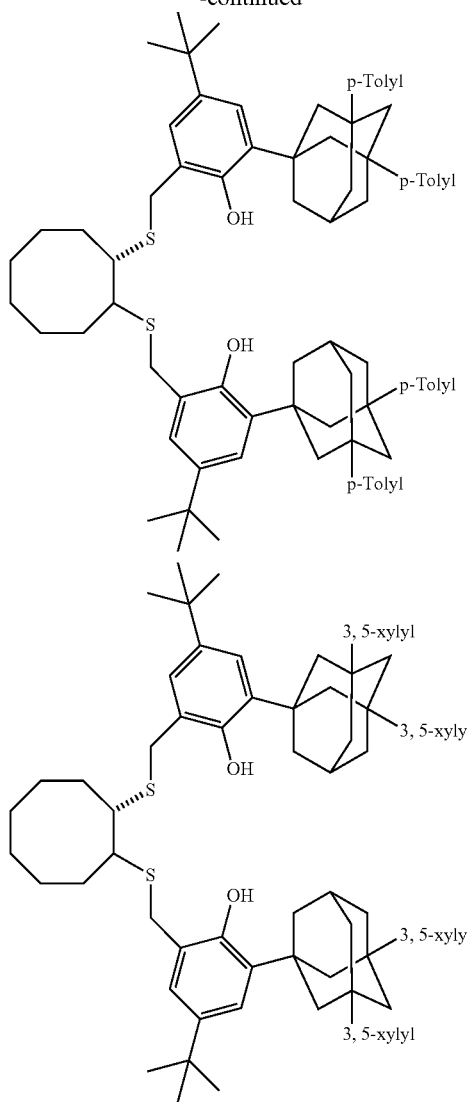
78
-continued
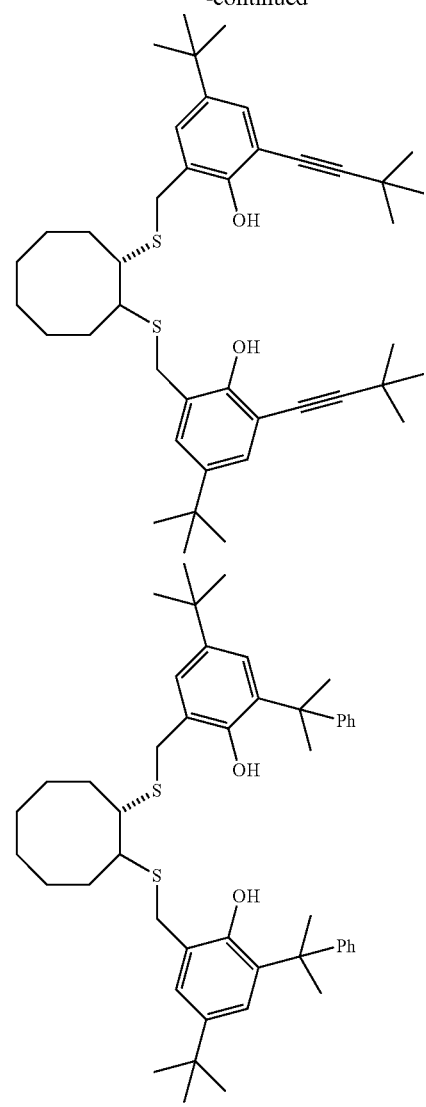
[Chem. 18]
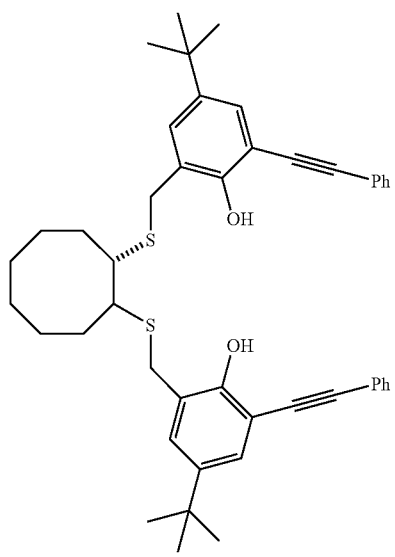
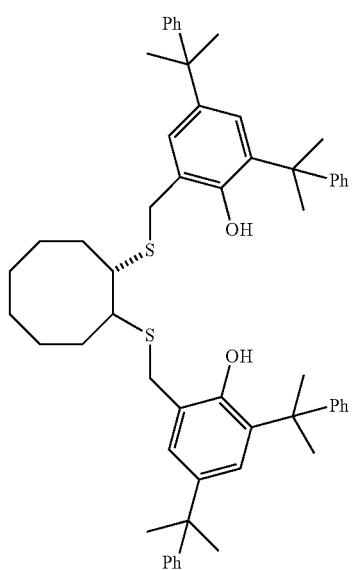

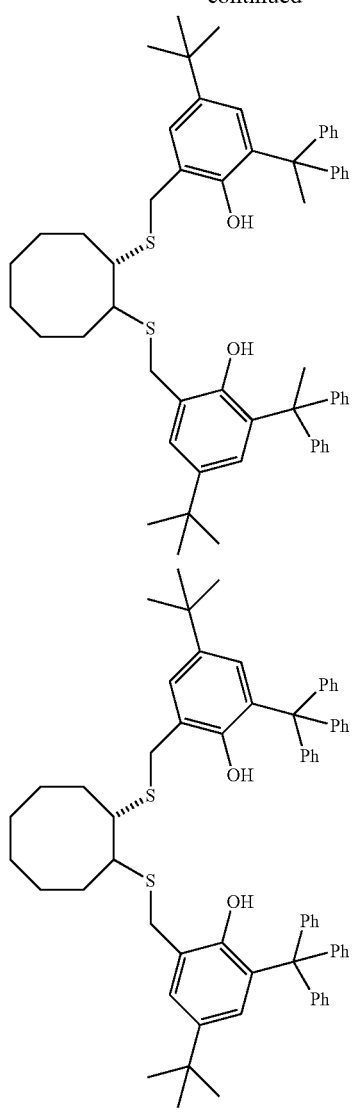
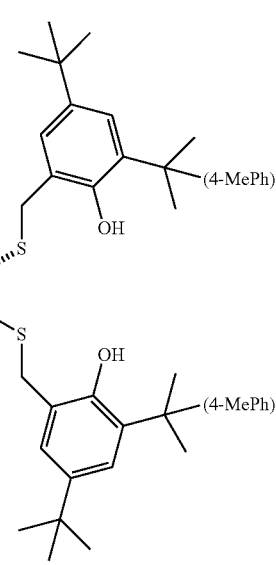
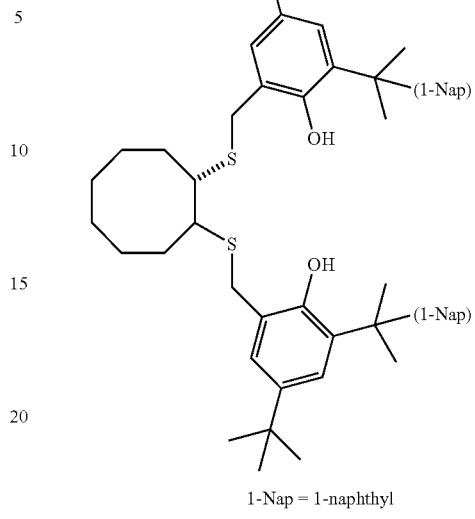
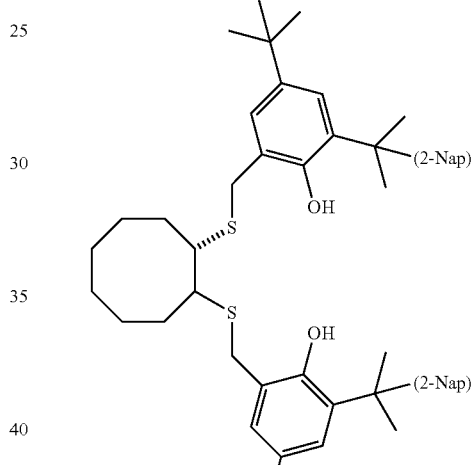
1-Nap = 1-naphthyl
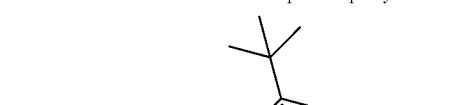
2-Nap = 2-naphthyl
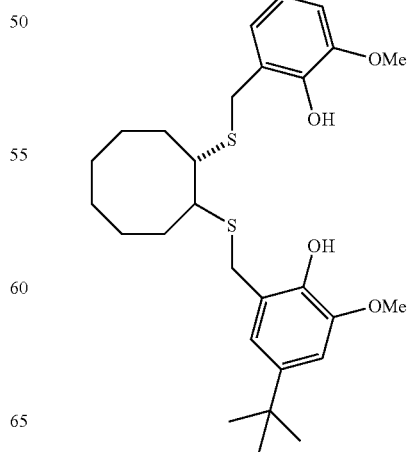

81
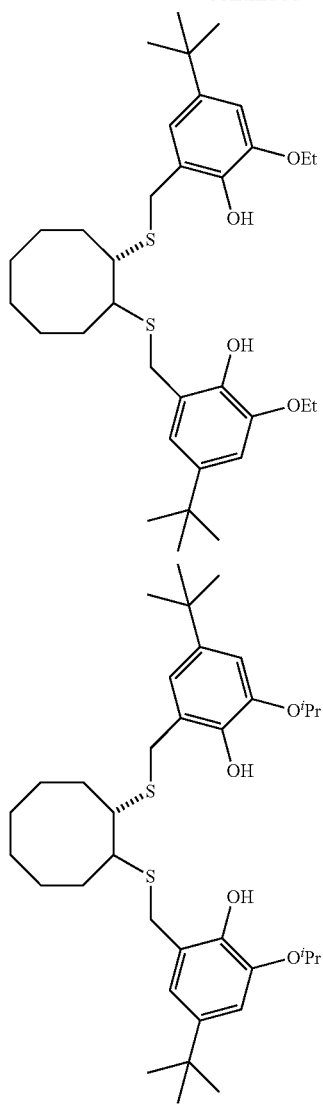
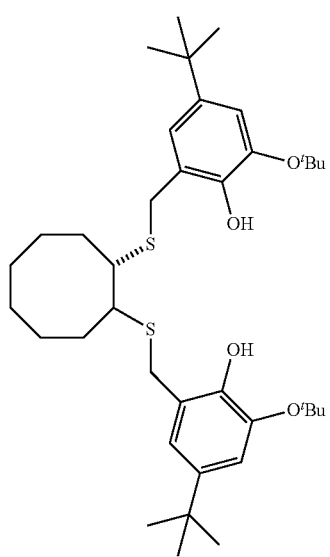
82
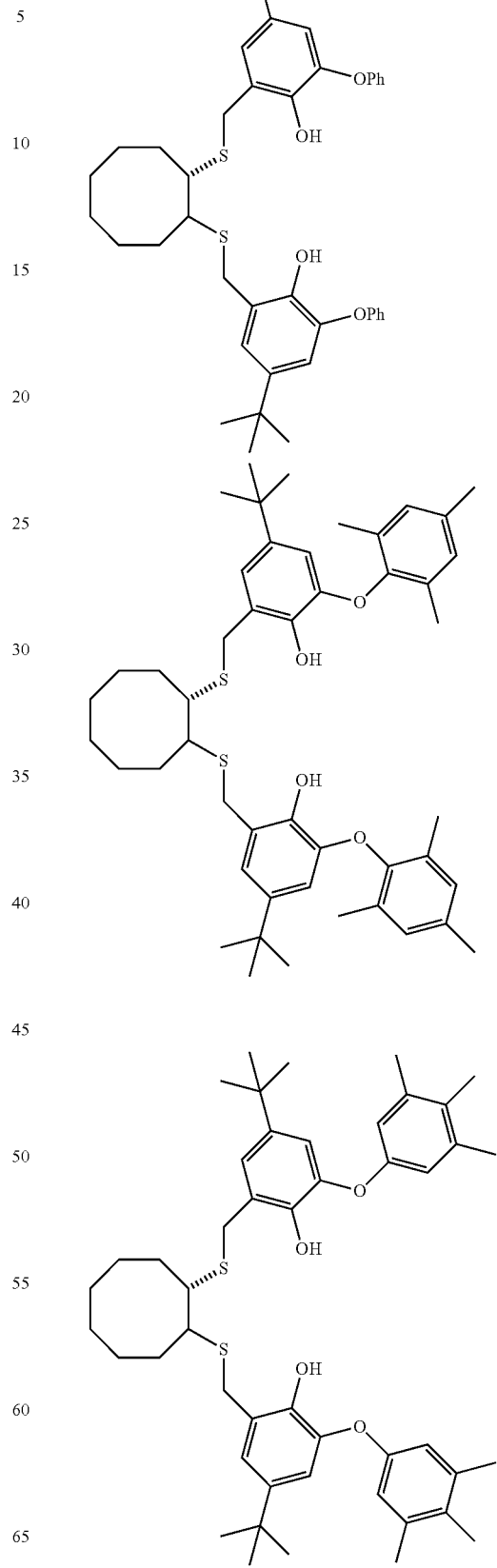
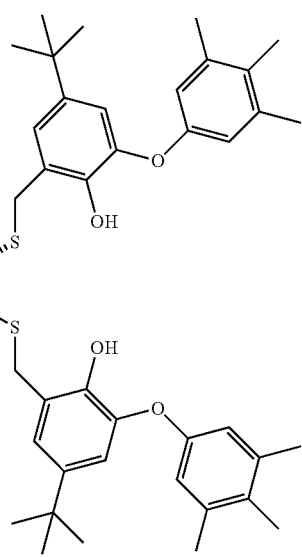

83
-continued
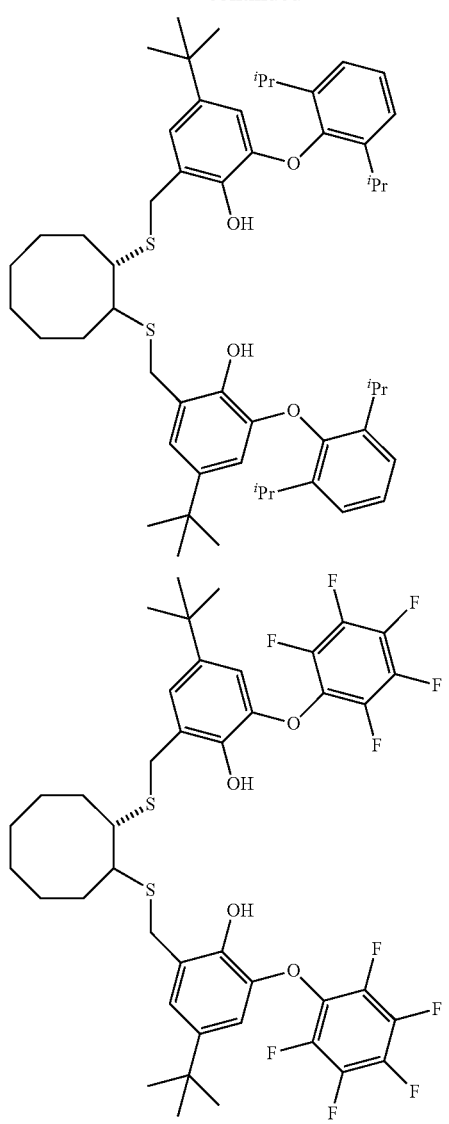
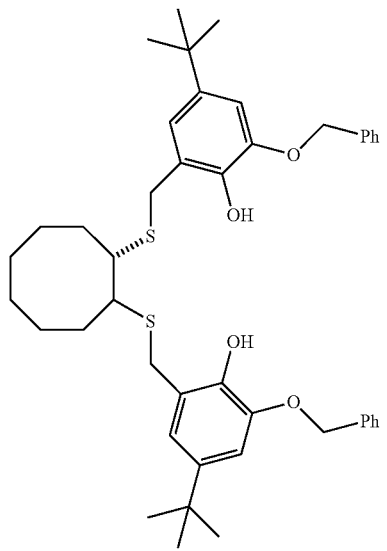
[Chem. 19]
84
-continued
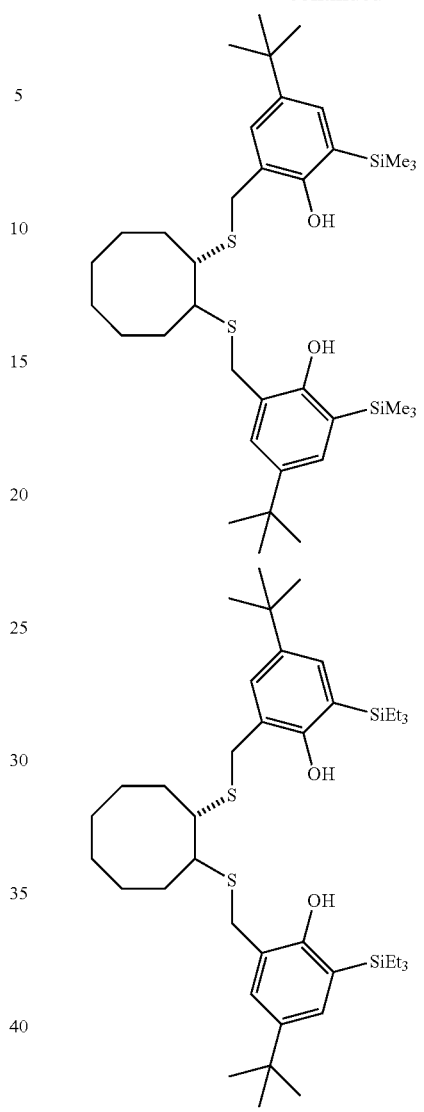
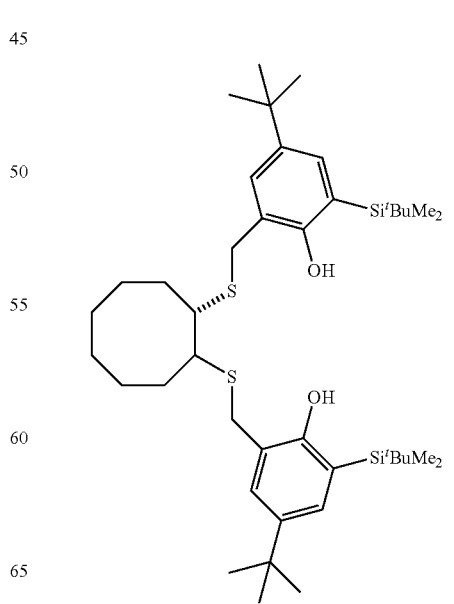

85
-continued
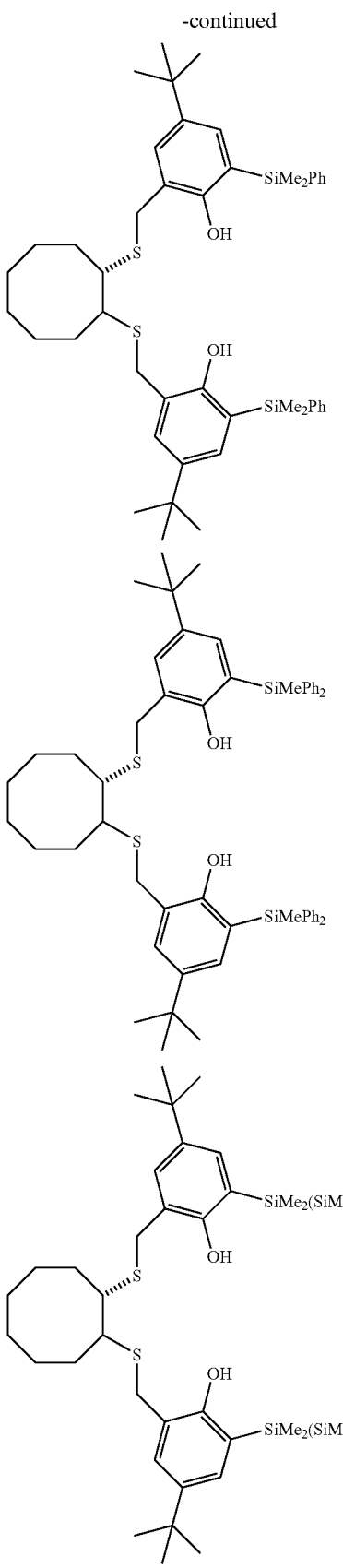
86
-continued
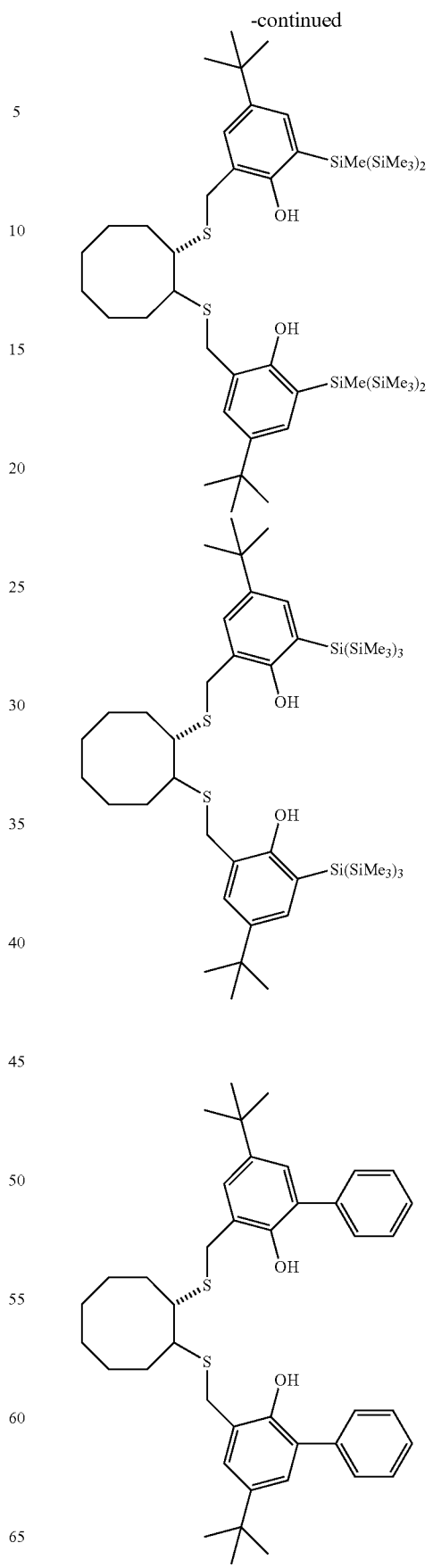
[Chem. 20]

87
-continued
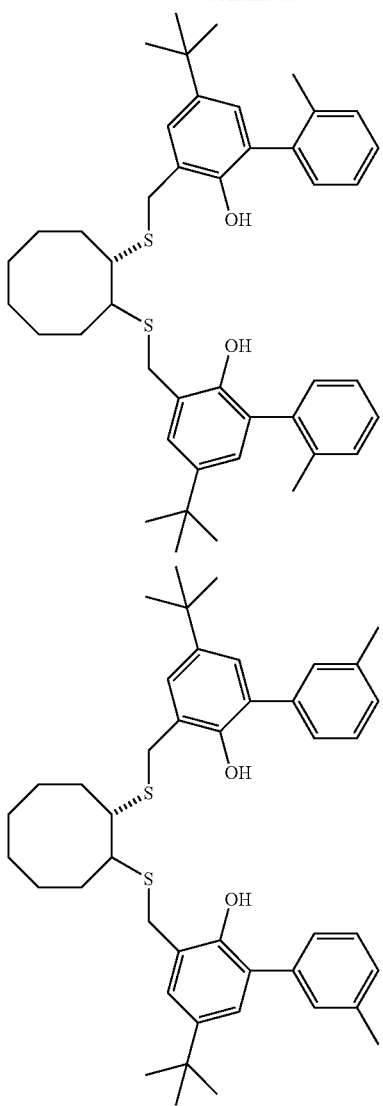
88
-continued
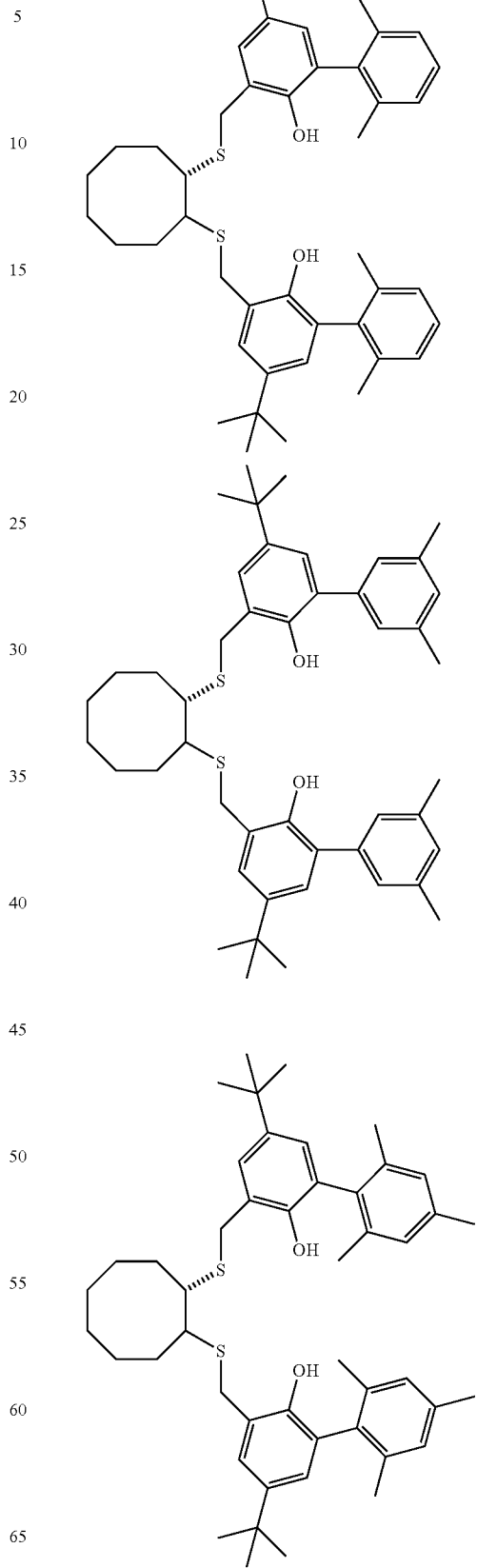

89
-continued
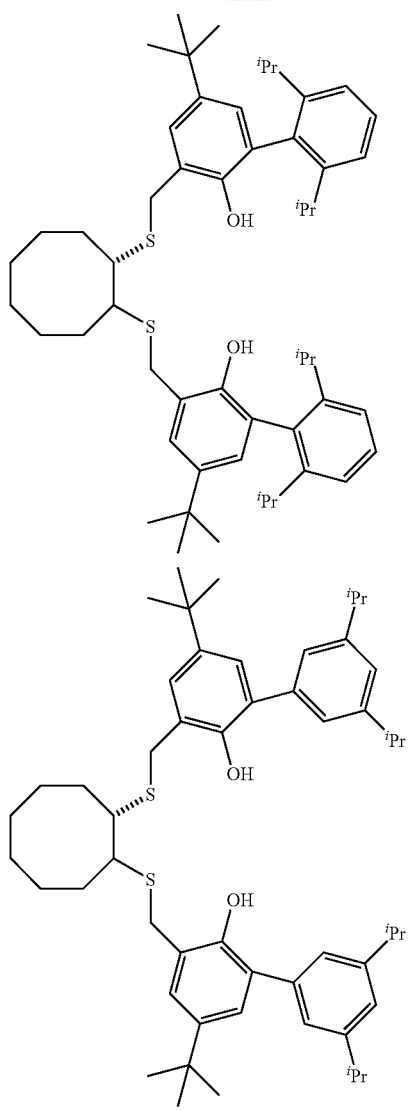
90
-continued
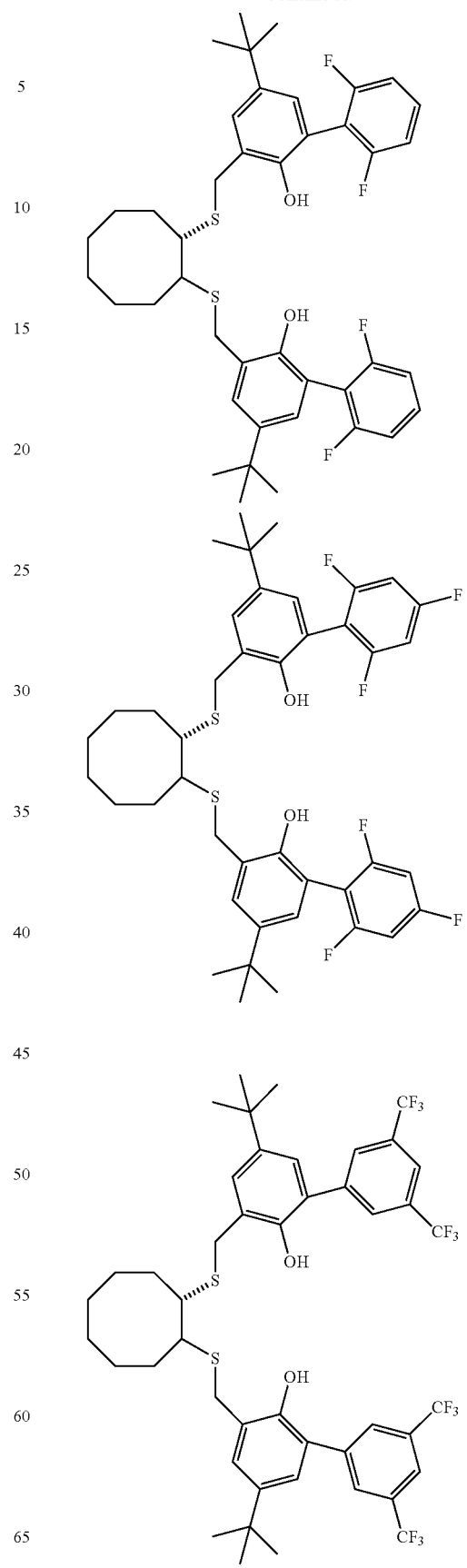

91
-continued
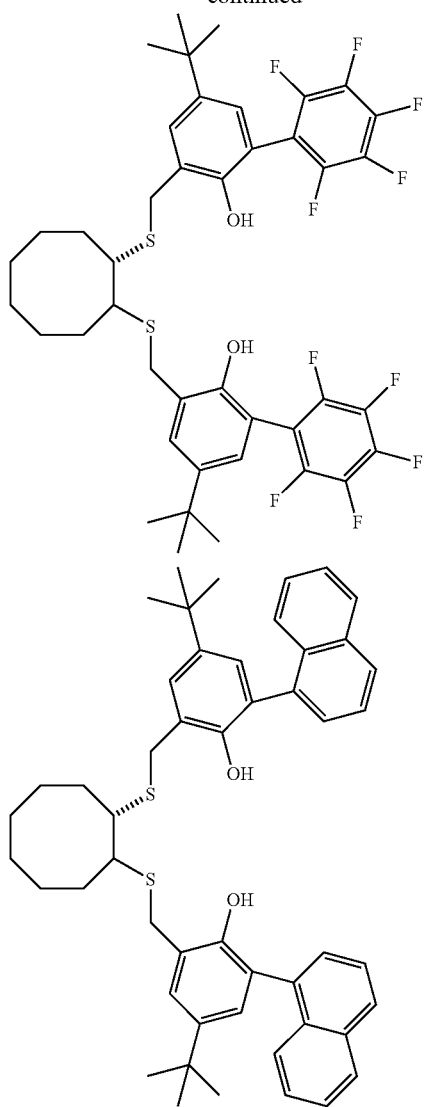
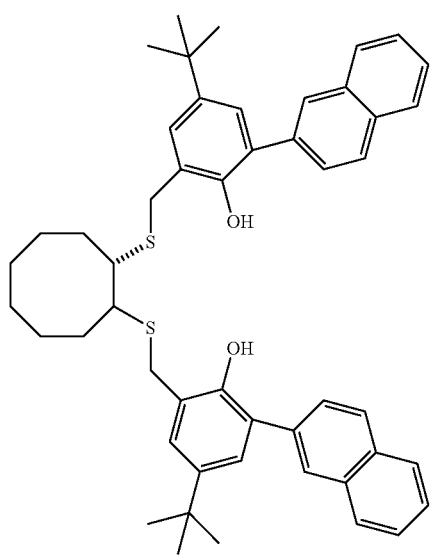
92
-continued
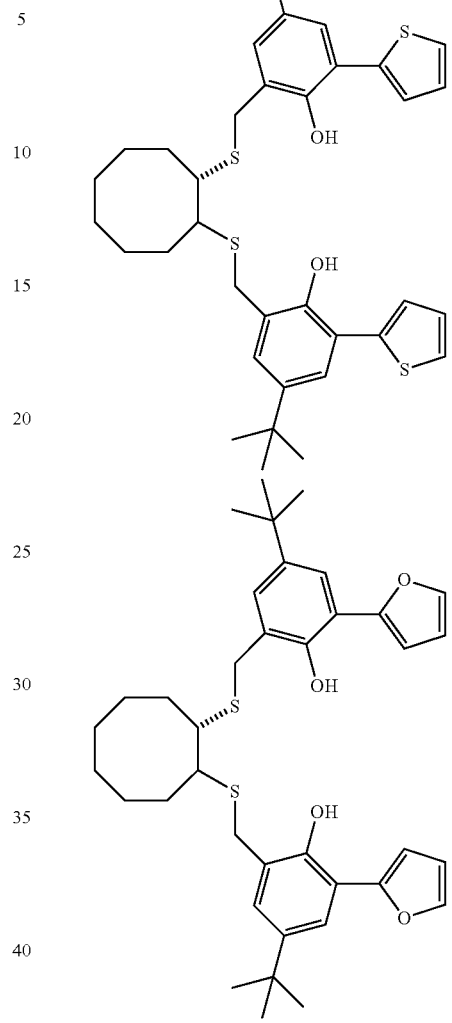
[Chem. 21]
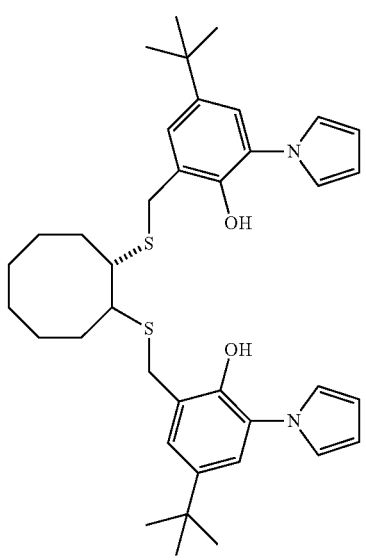

-continued
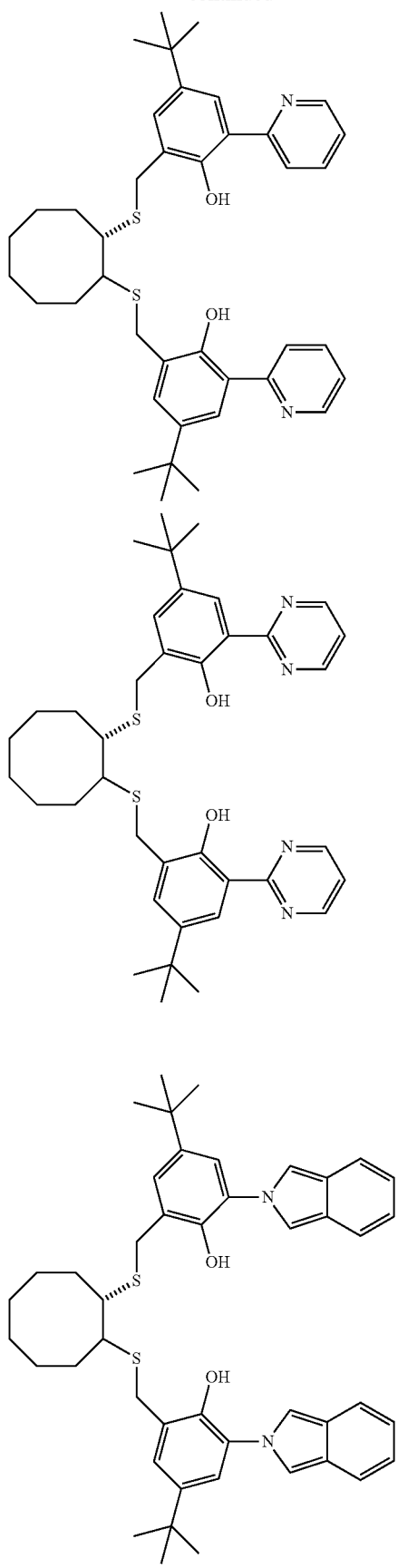
-continued
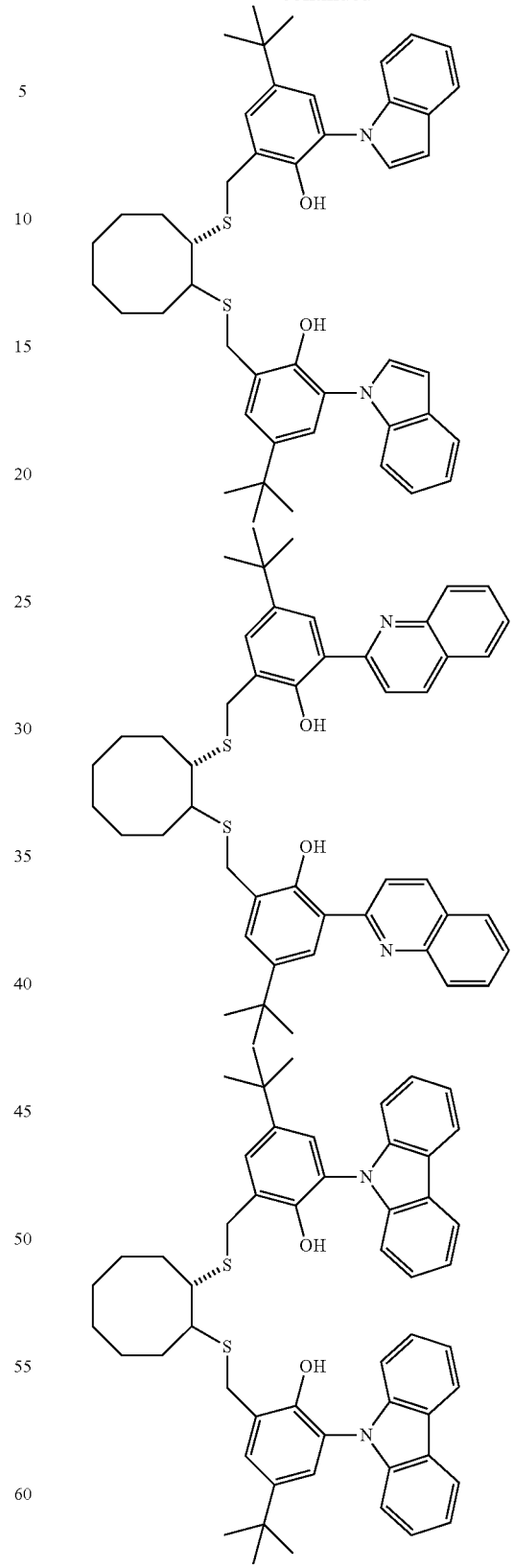
Specific examples of the compound (2) include, in addition to the compounds as shown above, the above compounds modified such that groups respectively corresponding to $R^{X3}$ and $R^{X7}$ in the general formula (2) above are independently a hydrogen atom, a fluorine atom, a chlorine atom, a bromine atom, an iodine atom or a methyl group.

Specific examples of the compound (2) further include the above compounds modified such that the cyclooctane ring crosslinking the sulfur atoms is substituted with a cycloheptane ring or a cyclohexane ring.

Specific examples of the compound (5) and the compound (7) include the following compounds.

[Chem. 22]

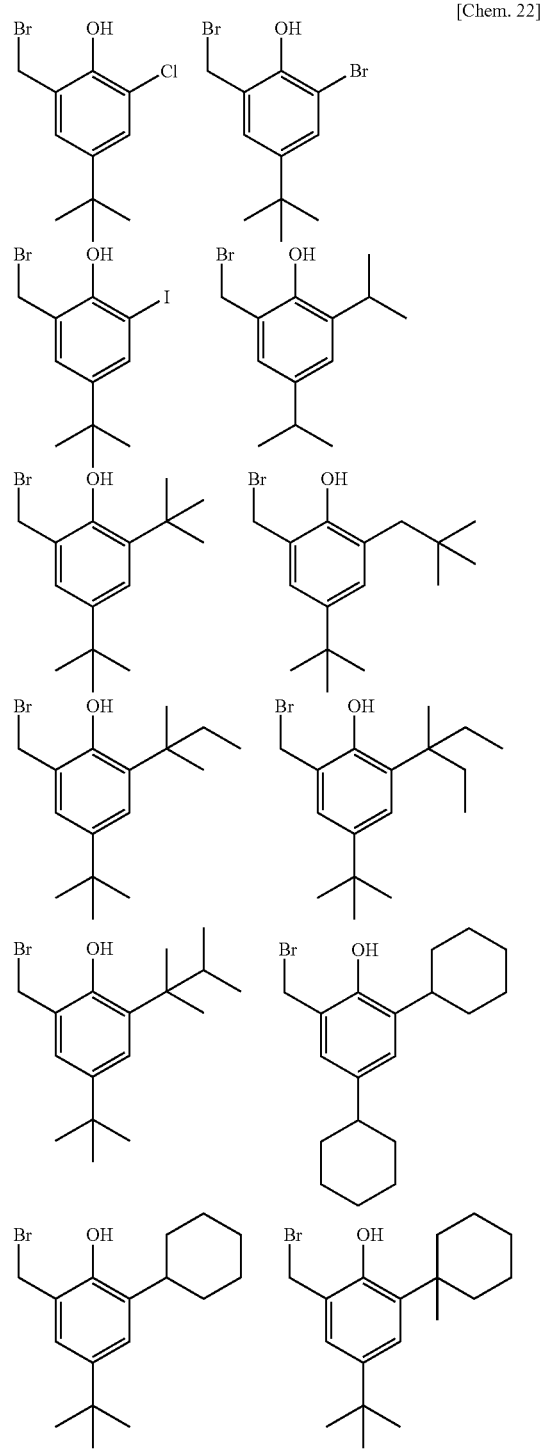

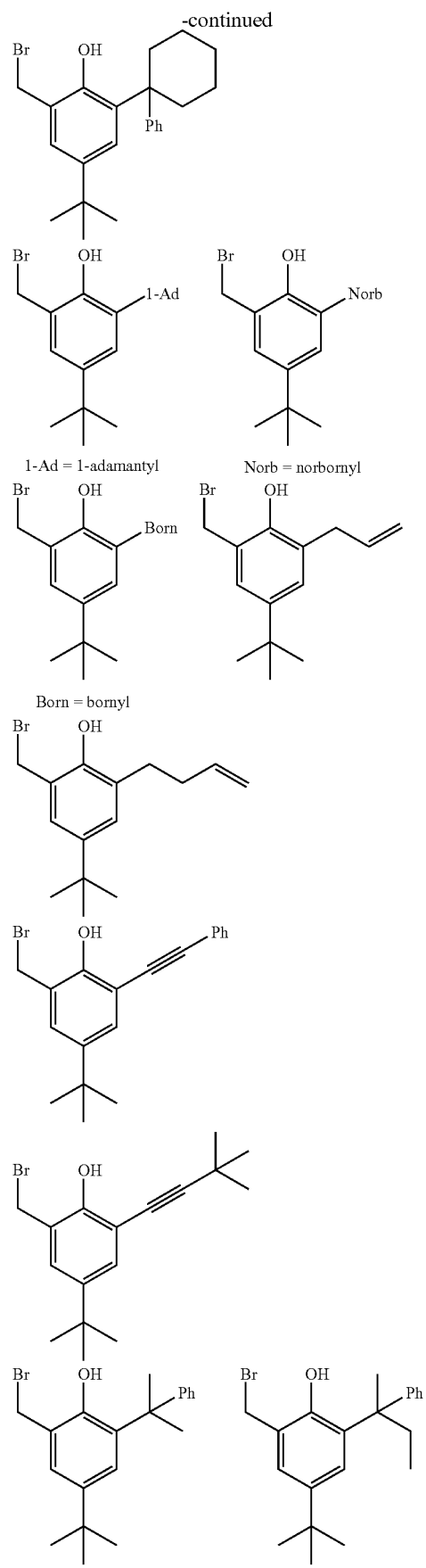

1-Ad = 1-adamantyl    Norb = norbornyl

Born = bornyl

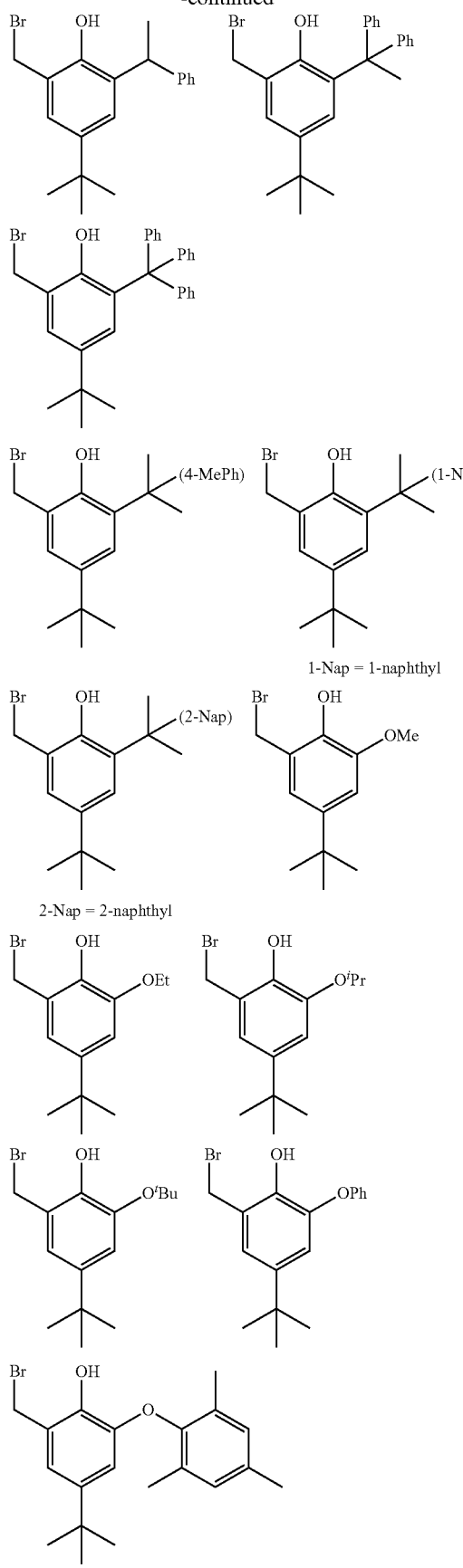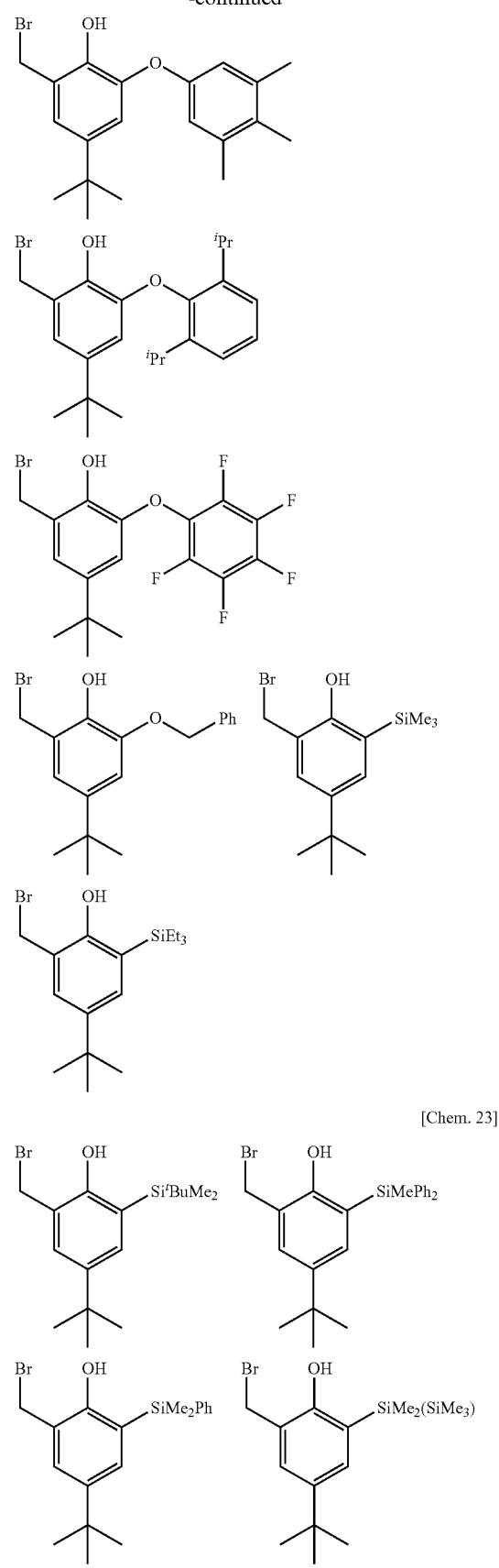

99
-continued
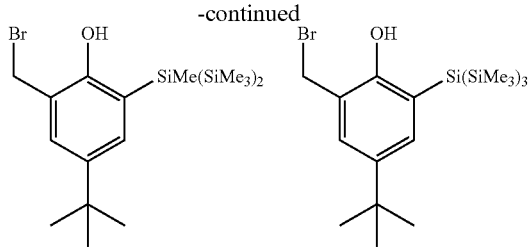
[Chem. 24]
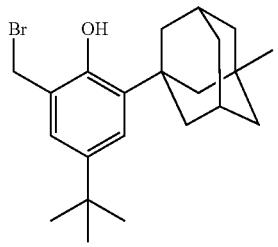
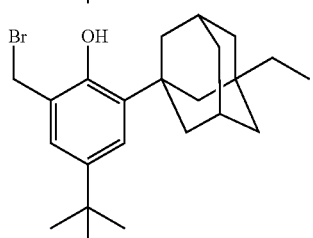
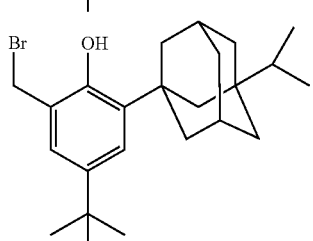
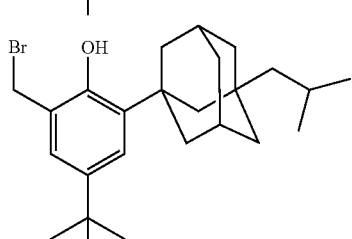
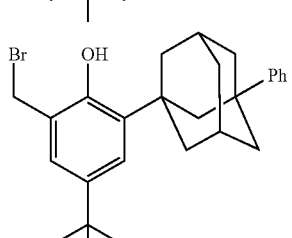
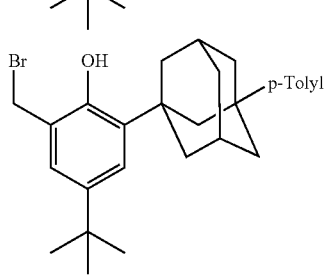
100
-continued
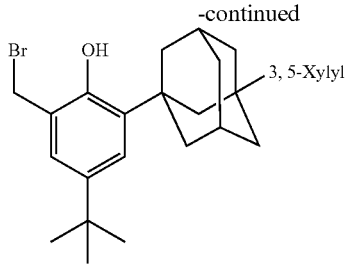
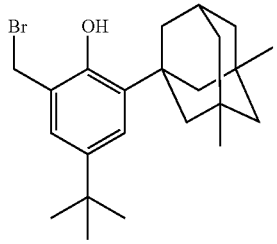
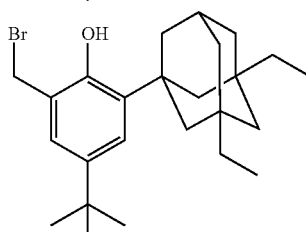
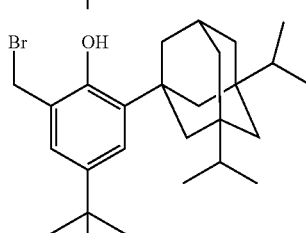
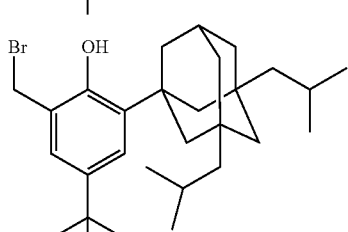
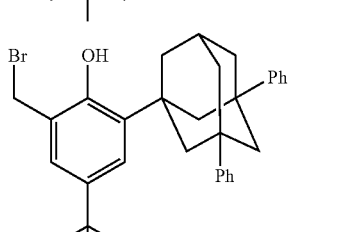
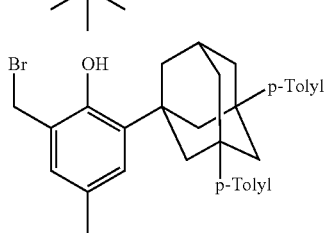

| 101 | 102 |
|---|---|
| -continued | -continued |
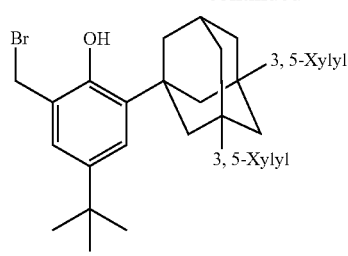
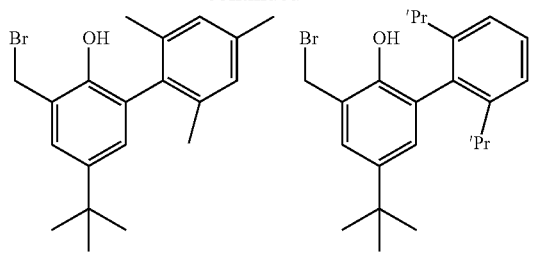
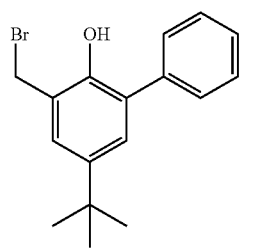
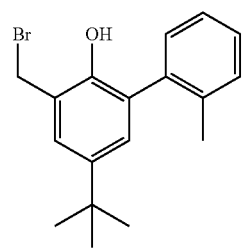
[Chem. 25]
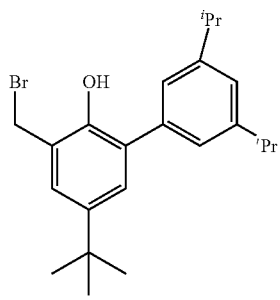
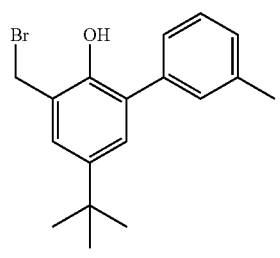
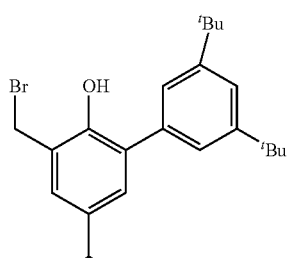
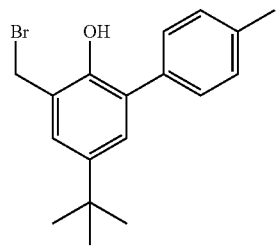
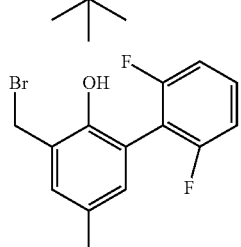
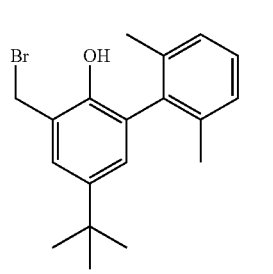
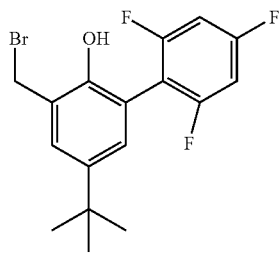
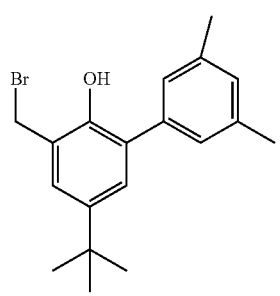
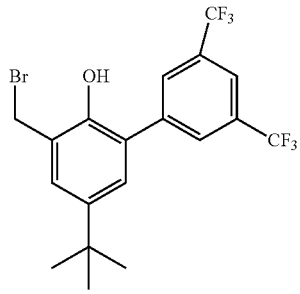

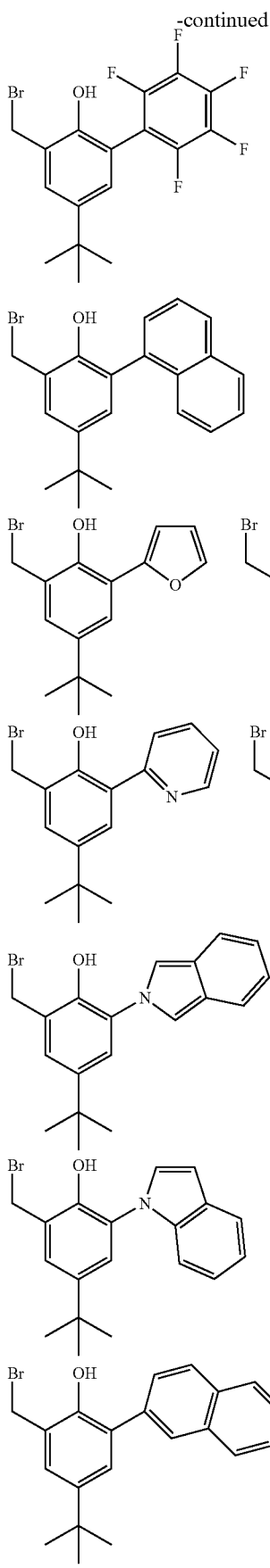
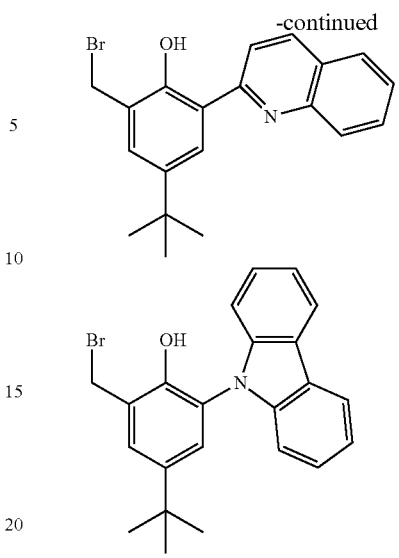

Specific examples of the compound (5) and the compound (7) include, in addition to the compounds as shown above, the above compounds modified such that groups respectively corresponding to $R^{X3}$ and $R^{X7}$ in the general formula (5) or (7) above are independently a hydrogen atom, a fluorine atom, a chlorine atom, a bromine atom, an iodine atom or a methyl group.

Activating Co-Catalyst Agent (B)

Examples of the activating co-catalyst agent (B) used in the present invention include at least one compound selected from among an organoaluminumoxy compound (B-1), an organicboron compound (B-2), a zinc co-catalyst component (B-3), and an ion-exchange layered silicate (B-4).

<Organoaluminumoxy Compound (B-1)>

Examples of the organoaluminumoxy compound (B-1) include one or more compounds selected from the compounds (B-1-1) and (B-1-2) below.

(B-1-1): chain aluminoxane represented by general formula $R^{B1}\{-Al(R^{B1})-O-\}_{B1}AlR^{B1}_2$ (B-1-2): cyclic aluminoxane represented by general formula $\{-Al(R^{B2})-O-\}_{B2}$ $R^{B1}$ and $R^{B2}$ individually represent a hydrocarbyl group having 1 to 20 carbon atoms. $R^{B1}$ groups may be identical with each other or different from each other, and $R^{B2}$ groups may be identical with each other or different from each other. Subscript B1 and B2 individually represent an integer of 2 or more.

Specific examples of $R^{B1}$ and $R^{B2}$ include: straight chain or branched alkyl groups having 1 to 20 carbon atoms, preferably 1 to 10 carbon atoms, such as methyl group, ethyl group, n-propyl group, isopropyl group, n-butyl group, isobutyl group, sec-butyl group, tert-butyl group, n-pentyl group, neopentyl group, and n-hexyl group; cyclic alkyl groups having 3 to 20 carbon atoms, preferably 3 to 10 carbon atoms, such as cyclopropyl group, cyclobutyl group, cyclopentyl group, cyclohexyl group, norbornyl group, and adamantyl group; straight chain or branched alkenyl groups having 2 to 20 carbon atoms, preferably 2 to 10 carbon atoms, such as vinyl group, allyl group, and isopropenyl group; and straight chain or branched alkynyl group having 2 to 20 carbon atoms, preferably 2 to 10 carbon atoms, such as ethynyl group and propargyl group. $R^{B1}$ and $R^{B2}$ are each more preferably methyl group or isobutyl group.

The organoaluminumoxy compound (B-1) can be produced by the following methods for example, and is generally obtained as a solution of hydrocarbyl solvent.

(1) A method in which an organoaluminum compound such as trialkyl aluminum is added to a hydrocarbyl suspension of a compound containing adsorption water or salt containing crystal water, such as magnesium chloride hydrate, copper sulfate hydrate, aluminum sulfate hydrate, nickel sulfate hydrate, and cerium (I) chloride hydrate so as to react adsorption water or crystal water with the organoaluminum compound.

(2) A method in which an organoaluminum compound such as trialkyl aluminum in a solvent such as benzene, toluene, ethyl ether, and tetrahydrofuran is reacted with water, ice, or water vapor.

(3) A method in which an organoaluminum compound such as trialkyl aluminum in a solvent such as decane, benzene, and toluene is reacted with an organotin oxide such as dimethyl tin oxide and dibutyl tin oxide.

The organoaluminumoxy compound (B-1) may contain a little amount of an organoaluminum compound. Aluminoxane may be produced by removing a solvent or an unreacted organoaluminomoxy compound from a solution of the organoaluminumoxy compound (B-1) by distillation, and then dissolved in a solvent again or suspended in a poor solvent.

<Organicboron Compound (B-2)>

Examples of the organicboron compound (B-2) include one or more compounds selected from the compounds (B-2-1), (B-2-2), and (B-2-3) below.

(B-2-1): boron compound represented by general formula $BR^{B3}_3$ (B-2-2): borate compound represented by general formula $Q^{B+}BR^{B4}_4{}^-$ (B-2-3): borate compound represented by general formula $E^{B}H^+BR^{B5}_4{}^-$ $Q^{B+}$ represents inorganic or organic cation. Preferable examples of the inorganic cation include lithium cation, sodium cation, potassium cation, silver cation, ferrocenium cation, and substituted ferrocenium cation. A preferable example of the organic cation is triphenyl methyl cation.

$E^{B}H^+$ represents Brønsted acid. Preferable examples thereof include trialkyl-substituted ammonium, N,N-dialkyl anilinium, dialkyl ammonium, and triaryl phosphonium.

$R^{B3}$, $R^{B4}$, and $R^{B5}$ independently represent a halogen atom, a hydrocarbyl group having 1 to 20 carbon atoms, a halohydrocarbyl group having 1 to 20 carbon atoms, a hydrocarbyl silyl group having 1 to 20 carbon atoms, an alkoxy group having 1 to 20 carbon atoms, or a hydrocarbyl amino group having 2 to 20 carbon atoms, and preferably a halogen atom, a hydrocarbyl group having 1 to 20 carbon atoms, or a halohydrocarbyl group having 1 to 20 carbon atoms. $R^{B3}$ groups may be identical with each other or different from each other, $R^{B4}$ groups may be identical with each other or different from each other, and $R^{B5}$ groups may be identical with each other or different from each other.

$BR^{B4}_4{}^-$ and $BR^{B5}_4{}^-$ indicate borate anion. Examples thereof include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, tetrakis(3,5-bis trifluoromethylphenyl)borate, and phenyltris(pentafluorophenyl)borate.

Examples of the boron compound (B-2-1) represented by general formula $BR^{B3}_3$ include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, tris(3,5-bis trifluoromethylphenyl)borane, and phenylbis(pentafluorophenyl)borane.

Examples of the borate compound (B-2-2) represented by general formula $Q^{B+}BR^{B4}_4{}^-$ include sodium tetrakis(pentafluorophenyl)borate, silver tetrakis(pentafluorophenyl)borate, ferrocenium tetrakis(pentafluorophenyl)borate, 1,1'-bis-trimethylsilyl ferrocenium tetrakis(pentafluorophenyl) borate, triphenylmethyltetrakis(pentafluorophenyl)borate, and triphenylmethyltetrakis(3,5-bis trifluoromethylphenyl) borate.

Examples of the borate compound (B-2-3) represented by general formula $E^{B}H^+BR^{B5}_4{}^-$ include triethyl ammonium tetrakis(pentafluorophenyl)borate, tripropyl ammonium tetrakis(pentafluorophenyl)borate, tri(normal butyl) ammonium tetrakis(pentafluorophenyl)borate, tri(normal butyl) ammonium tetrakis(3,5-bis trifluoromethylphenyl)borate, N,N-bis-trimethyl silylanilinium tetrakis(pentafluorophenyl)borate, N,N-dimethyl anilinium tetrakis(pentafluorophenyl)borate, N,N-diethyl anilinium tetrakis(pentafluorophenyl)borate, N,N-2,4,6-pentamethyl anilinium tetrakis(pentafluorophenyl)borate, N,N-bis-trimethyl silylanilinium tetrakis(3,5-bis trifluoromethylphenyl)borate, diisopropyl ammonium tetrakis(pentafluorophenyl)borate, dicyclohexyl ammonium tetrakis(pentafluorophenyl)borate, triphenyl phosphonium tetrakis(pentafluorophenyl)borate, tri(methylphenyl) phosphonium tetrakis(pentafluorophenyl) borate, and tri(bis-trimethylsilylphenyl) phosphonium tetrakis(pentafluorophenyl)borate.

Two or more organicboron compounds (B-2) as above may be used in combination or the organicboron compound (B-2) may be used in combination with the organoaluminumoxy compound (B-1).

<Zinc Co-Catalyst Component (B-3)>

Examples of the zinc co-catalyst component (B-3) include a zinc co-catalyst component (B-3-1) obtained by contacting compounds (B-3a) and (B-3b) below with each other or a zinc co-catalyst component (B-3-2) obtained by contacting compounds (B-3a) to (B-3c) below with each other.

(B-3a): Compound represented by general formula $ZnR^{B6}_2$ (B-3b): Compound represented by general formula $R^{B7}_{B3-1}T^{B1}H$ (B-3c): Compound represented by general formula $R^{B8}_{B4-1}T^{B2}H_2$ $R^{B6}$ is a hydrogen atom, a halogen atom, a hydrocarbyl group, or a halogenated hydrocarbyl group, and a plurality of $R^{B6}$ may be identical with each other or different from each other. $R^{B7}$ and $R^{B8}$ are independently a hydrocarbyl group, a halogenated hydrocarbyl group, an electron withdrawing group, or a group containing an electron withdrawing group, and a plurality of $R^{B7}$ may be identical with each other or different from each other, and a plurality of $R^{B8}$ may be identical with each other or different from each other. $T^{B1}$ and $T^{B2}$ are independently an atom of Group 15 or 16 of the periodic table of the elements. B3 is an atomic valence of $T^{B1}$, and B4 is an atomic valence of $T^{B2}$.

Examples of the compound (B-3a) include dialkyl zinc such as dimethyl zinc, diethyl zinc, dipropyl zinc, dinormal butyl zinc, diisobutyl zinc, dinormal hexyl zinc, diallyl zinc, and bis(cyclopentadienyl)zinc; diaryl zinc such as diphenyl zinc, dinaphthyl zinc, and bis(pentafluorophenyl)zinc; alkyl zinc halides such as methyl zinc chloride, ethyl zinc chloride, propyl zinc chloride, normal butyl zinc chloride, isobutyl zinc chloride, normal hexyl zinc chloride, methyl zinc bromide, ethyl zinc bromide, propyl zinc bromide, normal butyl zinc bromide, isobutyl zinc bromide, normal hexyl zinc bromide, methyl zinc iodide, ethyl zinc iodide, propyl zinc iodide, normal butyl zinc iodide, isobutyl zinc iodide, and normal hexyl zinc iodide; zinc halides such as zinc fluoride, zinc chloride, zinc bromide, and zinc iodide.

Examples of amines of the compound (B-3b) include di(fluoromethyl)amine, di(chloromethyl)amine, di(bromomethyl)amine, di(iodomethyl)amine, bis(difluoromethyl)amine, bis(dichloromethyl)amine, bis(dibromomethyl)amine, bis(diiodomethyl)amine, bis(trifluoromethyl)amine, bis(trichloromethyl)amine, bis(tribromomethyl)amine, bis(triiodomethyl)amine, bis(2,2,2-trifluoroethyl)amine, bis(2,2,2-trichloroethyl)amine, bis(2,2,2-tribromoethyl)amine, bis(2,2,2-triiodoethyl)amine, bis(2,2,3,3,3-pentafluoropropyl)amine, bis(2,2,3,3,3-pentachloropropyl)amine, bis(2,2,3,3,3-penta bromopropyl)amine, bis(2,2,3,3,3-pentaiodopropyl)amine, bis(2,2,2-trifluoro-1-trifluoromethylethyl)amine, bis(2,2,2-trichloro-1-trichloromethylethyl)amine, bis(2,2,2-tribromo-1-tribromomethylethyl)amine, bis(2,2,2-triiodo-1-triiodomethylethyl)amine, bis(1,1-bis(trifluoromethyl)-2,2,2-trifluoroethyl)amine, bis(1,1-bis(trichloromethyl)-2,2,2-trichloroethyl)amine, bis(1,1-bis(tribromomethyl)-2,2,2-tribromoethyl)amine, bis(1,1-bis(triiodomethyl)-2,2,2-triiodoethyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3,5-dichlorophenyl)amine, bis(2,6-dibromophenyl)amine. bis(3,5-dibromophenyl)amine, bis(2,6-diiodophenyl)amine, bis(3,5-diiodophenyl)amine, bis(2,4,6-trifluorophenyl)amine, bis(2,4,6-trichlorophenyl)amine, bis(2,4,6-tribromophenyl)amine, bis(2,4,6-triiodophenyl)amine, bis(pentafluorophenyl)amine, bis(pentachlorophenyl)amine, bis(pentabromophenyl)amine, bis(pentaiodophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(2-cyanophenyl)amine, (3-cyanophenyl)amine, bis(4-cyanophenyl)amine, bis(2 nitrophenyl)amine, bis(3-nitrophenyl)amine, and bis(4-nitrophenyl)amine. A phosphine compound obtained by substituting nitrogen atoms in the compound with phosphine atoms is also encompassed in the examples of the compound (B-3b). Such a phosphine compound is, for example, a compound obtained by substituting amine in the aforementioned specific examples with phosphine.

Examples of alcohols of the compound (B-3b) include fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2,2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentabromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1-bis(trifluoromethyl)-2,2,2-trifluoroethanol, 1,1-bis(trichloromethyl)-2,2,2-trichloroethanol, 1,1-bis(tribromomethyl)-2,2,2-tribromoethanol, and 1,1-bis(triiodomethyl)-2,2,2-triiodoethanol. Furthermore, a thiol compound obtained by substituting oxygen atoms in the compound with sulfur atoms is also encompassed in the example of the compound (B-3b). Such a thiol compound is, for example, a compound obtained by substituting methanol in the specific example with methane thiol, ethanol in the specific example with ethane thiol, and propanol in the specific example with propane thiol.

Examples of phenols of the compound (B-3b) include 2-fluorophenol, 3-fluorophenol, 4-fluorophenol, 2-chlorophenol, 3-chlorophenol, 4-chlorophenol, 2-bromophenol, 3-bromophenol, 4-bromophenol, 2-iodophenol, 3-iodophenol, 4-iodophenol, 2,6-difluorophenol, 3,5-difluorophenol, 2,6-dichlorophenol, 3,5-dichlorophenol, 2,6-dibromophenol, 3,5-dibromophenol, 2,6-diiodophenol, 3,5-diiodophenol, 2,4,6-trifluorophenol, 3,4,5-trifluorophenol, 2,4,6-trichlorophenol, 2,4,6-tribromophenol, 2,4,6-triiodophenol, pentafluorophenol, pentachlorophenol, pentabromophenol, pentaiodophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 2-cyanophenol, 3-cyanophenol, 4-cyanophenol, 2-nitrophenol, 3-nitrophenol, and 4-nitrophenol. Furthermore, a thiophenol compound obtained by substituting oxygen atoms in the compound with sulfur atoms is also encompassed in the example of the compound (B-3b). Such a thiophenol compound is, for example, a compound obtained by substituting phenol in the specific example with thiophenol.

Examples of carboxylic acids of the compound (B-3b) include 2-fluorobenzoic acid, 3-fluorobenzoic acid, 4-fluorobenzoic acid, 2,3-difluorobenzoic acid, 2,4-difluorobenzoic acid, 2,5-difluorobenzoic acid, 2,6-difluorobenzoic acid, 2,3,4-trifluorobenzoic acid, 2,3,5-trifluorobenzoic acid, 2,3,6-trifluorobenzoic acid, 2,4,5-trifluorobenzoic acid, 2,4,6-trifluorobenzoic acid, 2,3,4,5-tetrafluorobenzoic acid, 2,3,4,6-tetrafluorobenzoic acid, pentafluorobenzoic acid, fluoroacetic acid, difluoroacetic acid, trifluoroacetic acid, pentafluoropropanoic acid, heptafluorobutanoic acid, and 1,1-bis(trifluoromethyl)-2,2,2-trifluoroethanoic acid.

Examples of sulfonic acids of the compound (B-3b) include fluoromethanesulfonic acid, difluoromethanesulfonic acid, trifluoromethanesulfonic acid, pentafluoroethanesulfonic acid, heptafluoropropane sulfonic acid, and 1,1-bis(trifluoromethyl)-2,2,2-trifluoroethanesulfonic acid.

Preferable examples of the compound (B-3b) include: amines such as bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine, and bis(pentafluorophenyl)amine; alcohols such as trifluoromethanol, 2,2,2-trifluoroethanol, 2,2,3,3,3-pentafluoropropanol, 2,2,2-trifluoro-1-trifluoromethylethanol, and 1,1-bis(trifluoromethyl)-2,2,2-trifluoroethanol; phenols such as 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, and 2,4,6-tris(trifluoromethyl)phenol; carboxylic acids such as penta fluorobenzoic acid and trifluoroacetic acid; sulfonic acids such as trifluoromethanesulfonic acid.

The used amounts of the compounds (B-3a) and (B-3b) to be contacted with each other are such that when the used amount of the compound (B-3a) is 1 mol, the used amount of the compound (B-3b) is preferably larger than 0 mol and not larger than 100 mol, more preferably larger than 0 mol and not larger than 20 mol, still more preferably larger than 0 mol and not larger than 10 mol, particularly preferably larger than 0 mol and not larger than 5 mol, and most preferably larger than 0 mol and not larger than 4 mol.

The following description will discuss in more detail a specific example of a method for producing the zinc co-catalyst component (B-3-1) in a case where the compound (B-3a) is diethyl zinc and the compound (B-3b) is halogenated alcohol.

A hexane solution of diethyl zinc is added to a toluene solvent, and the mixture is cooled down to 0° C., and halogenated alcohol in an amount of 2 mol to 4 mol with respect to the diethyl zinc is dropped into the mixture, and then the mixture is stirred at 90° C. to 120° C. for 10 minutes to 24 hours. Under a reduced pressure, a volatile substance is distilled off from the mixture, and then the residue is dried for 1 to 20 hours under a reduced pressure at room temperature. Thus, the compound (B-3-1) can be produced.

Preferable examples of the compound (B-3c) include water, hydrogen sulfide, alkylamine, arylamine, aralkylamine, halogenated alkylamine, halogenated arylamine, and (alkyl halide) arylamine. More preferable examples of the compound (B-3c) include water, hydrogen sulfide, methylamine, ethylamine, n-propylamine, isopropylamine, n-butylamine, sec-butylamine, tert-butylamine, isobutylamine, n-pentylamine, neo pentylamine, amylamine, n-hexylamine, n-octylamine, n-decylamine, n-dodecylamine, n-pentadecylamine, n-eicosylamine, allylamine, cyclopentadienylamine, aniline, 2-tolylamine, 3-tolylamine, 4-tolylamine, 2,3-xylylamine, 2,4-xylylamine, 2,5-xylylamine, 2,6-xylylamine, 3,4-xylylamine, 3,5-xylylamine, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, ethylaniline, n-propylaniline, isopropylaniline, n-butylaniline, sec-butylaniline, tert-butylaniline, n-pentylaniline, neopentylaniline, n-hexylaniline, n-octylaniline, n-decylaniline, n-dodecylaniline, n-tetradecylaniline, naphthylamine, anthracenylamine, benzylamine, (2-methylphenyl)methylamine, (3-methylphenyl)methylamine, (4-methylphenyl)methylamine, (2,3-dimethylphenyl)methylamine, (2,4-dimethylphenyl)methylamine, (2,5-dimethylphenyl)methylamine, (2,6-dimethylphenyl)methylamine, (3,4-dimethylphenyl)methylamine, (3,5-dimethylphenyl)methylamine, (2,3,4-trimethylphenyl)methylamine, (2,3,5-trimethylphenyl)methylamine, (2,3,6-trimethylphenyl)methylamine, (3,4,5-trimethylphenyl)methylamine, (2,4,6-trimethylphenyl)methylamine, (2,3,4,5-tetramethylphenyl)methylamine, (2,3,4,6-tetramethylphenyl)methylamine, (2,3,5,6-tetramethylphenyl)methylamine, (pentamethylphenyl)methylamine, (ethylphenyl)methylamine, (n-propylphenyl)methylamine, (isopropylphenyl)methylamine, (n-butyl phenyl)methylamine, (sec-butylphenyl)methylamine, (tert-butylphenyl)methylamine, (n-pentylphenyl)methylamine, (neopentylphenyl)methylamine, (n-hexyl phenyl)methylamine, (n-octyl phenyl)methylamine, (n-decyl phenyl)methylamine, (n-tetradecylphenyl)methylamine, naphthylmethylamine, anthracenylmethylamine, fluoromethylamine, chloromethylamine, bromomethylamine, iodomethylamine, difluoromethylamine, dichloromethylamine, dibromomethylamine, diiodomethylamine, trifluoromethylamine, trichloromethylamine, tribromomethylamine, triiodomethylamine, 2,2,2-trifluoroethylamine, 2,2,2-trichloroethylamine, 2,2,2-tribromoethylamine, 2,2,2-triiodoethylamine, 2,2,3,3,3-pentafluoro propylamine, 2,2,3,3,3-pentachloro propylamine, 2,2,3,3,3-pentabromopropylamine, 2,2,3,3,3-pentaiodopropylamine, 2,2,2-trifluoro-1-trifluoromethylethylamine, 2,2,2-trichloro-1-trichloromethylethylamine, 2,2,2-tribromo-1-tribromomethylethylamine, 2,2,2-triiodo-1-triiodomethylethylamine, 1,1-bis(trifluoromethyl)-2,2,2-trifluoroethylamine, 1,1-bis(trichloromethyl)-2,2,2-trichloroethylamine, 1,1-bis(tribromomethyl)-2,2,2-tribromoethylamine, 1,1-bis(triiodomethyl)-2,2,2-triiodoethylamine, 2-fluoroaniline, 3-fluoroaniline, 4-fluoroaniline, 2-chloroaniline, 3-chloroaniline, 4-chloroaniline, 2-bromoaniline, 3-bromoaniline, 4-bromoaniline, 2-iodoaniline, 3-iodoaniline, 4-iodoaniline, 2,6-difluoroaniline, 3,5-difluoroaniline, 2,6-dichloroaniline, 3,5-dichloroaniline, 2,6-dibromoaniline, 3,5-dibromoaniline, 2,6-diiodoaniline, 3,5-diiodoaniline, 2,4,6-trifluoroaniline, 2,4,6-trichloroaniline, 2,4,6-tribromoaniline, 2,4,6-triiodoaniline, pentafluoroaniline, pentachloroaniline, pentabromoaniline, pentaiodoaniline, 2-(trifluoromethyl)aniline, 3-(trifluoromethyl)aniline, 4-(trifluoromethyl)aniline, 2,6-di(trifluoromethyl)aniline, 3,5-di(trifluoromethyl)aniline, and 2,4,6-tri(trifluoromethyl)aniline.

The compound (B-3-2) can be obtained by contacting the compounds (B-3a), (B-3b), and (B-3c) with each other. The order of contacting the compounds (B-3a), (B-3b), and (B-3c) with each other is not particularly limited. For example, the order may be (1) to (3) below.

(1) A method of contacting (B-3a) with (B-3b) and then contacting the resultant with (B-3c)

(2) A method of contacting (B-3a) with (B-3c) and then contacting the resultant with (B-3b)

(3) A method of contacting (B-3b) with (B-3c) and then contacting the resultant with (B-3a)

The order of contacting the compounds is preferably (1) or (2), and more preferably (1). That is, the compound (B-3-2) is preferably a compound obtained by contacting the resultant of contact between (B-3a) and (B-3b) with (B-3c), or a compound obtained by contacting the resultant of contact between (B-3a) and (B-3c) with (B-3b), and more preferably a compound obtained by contacting the resultant of contact between (B-3a) and (B-3b) with (B-3c).

Used amounts of individual compounds are not particularly limited. Assume that a molar ratio of used amounts of individual compounds is (B-3a):(B-3b):(B-3c)=1:y:z. In this case, it is preferable that y and z meet formulae [B1] to [B3] below.

$$|2-y-2z| \leq 1 \qquad [B1]$$

$$0 < y < 2 \qquad [B2]$$

$$0 < z \qquad [B3]$$

y in the formulae [B1] and [B2] is preferably in a range of 0.20 to 1.80, and more preferably in a range of 0.25 to 1.50, and most preferably in a range of 0.50 to 1.00.

<Ion-Exchange Layered Silicate (B-4)>

Ion-exchange layered silicate used in the present invention (hereinafter merely referred to as "silicate") is a silicate compound having a crystal structure in which planes formed by ionic bond etc. are laminated in parallel with each other by a bonding force and containing exchangeable ions. In nature, most of silicate is produced mainly as a main component of a clay mineral, and therefore often contains a foreign substance other than the ion-exchange layered silicate (e.g. quartz, cristobalite). The silicate used in the present invention may contain such a foreign substance. Specific examples of the silicate include the following layered silicates described in, for example, Reference Document: "Clay Mineralogy" (SHIROZU Haruo, Asakura Shoten, 1995).

That is, specific examples of the silicate include: smectite group such as montmorillonite, sauconite, beidellite, nontronite, saponite, hectorite, and stevensite; vermiculite group such as vermiculite; mica group such as mica, illite, sericite, and glauconite; attapulgite; sepiolite; palygorskite; bentonite; pyrophyllite; talc; and chlorites.

The silicate used as a raw material in the present invention is preferably silicate whose main component is silicate having a 2:1 structure, more preferably smectite, and particularly preferably montmorillonite. The interlayer cation is preferably that of silicate, which interlayer cation contains alkaline metal or alkaline earth metal as a main component, in consideration of the fact that such silicate can be obtained relatively easily and at a relatively low cost as an industrial raw material.

Although the silicate used in the present invention can be used without any treatment, the silicate is preferably subjected to a chemical treatment. The chemical treatment may be any of a surface treatment which removes impurities on the surface or a treatment which influences the structure of clay. Specific examples of the chemical treatment used in the present invention include (1) an acid treatment, (2) a saline treatment, (3) an alkaline treatment, and (4) an organic treatment.

(1) Acid Treatment

The acid treatment removes impurities on the surface of silicate, and can elute a part of or all of cations of Al, Fe, Mg. etc. in a crystalline structure.

The acid used in the acid treatment is preferably chloric acid, sulfuric acid, nitric acid, phosphoric acid, acetic acid, or oxalic acid. Two or more acids may be used in the treatment. The silicate is treated with acid generally under such conditions that an acid concentration ranges from 0.1 to 50 wt %, a treatment temperature ranges from a room temperature to a boiling point, and a treatment time ranges from 5 minutes to 24 hours. The acid is generally used in an aqueous solution.

(2) Saline Treatment

In the present invention, it is preferable to ion-exchange 40% or more, preferably 60% or more of cations of an exchangeable metal (I) contained in the silicate before being subjected to the saline treatment, with cations dissociated from salts mentioned below.

The salt used in such a saline treatment intended for ion-exchange is a compound containing cations including at least one atom selected from the group consisting of Group 1-14 atoms and at least one anion selected from the group consisting of halogen atoms, inorganic acid and organic acid. The salt used in the saline treatment is more preferably a compound containing cations including at least one atom selected from the group consisting of Group 2-14 atoms and at least one anion selected from the group consisting of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)$, OH, $O_2Cl_2$, $OCl_3$, OOCH, $OOCCH_2CH_3$, $C_2H_4O_4$, and $C_5HSO_7$.

Specific examples of the salt include: LiF, LiCl, LiBr, LiI, $Li_2SO_4$, $Li(CH_3COO)$, $LiCO_3$, $Li(C_6HSO_7)$, $LiCHO_2$, $LiC_2O_4$, $LiClO_4$, $Li_3PO_4$, $CaCl_2$, $CaSO_4$, $CaC_2O_4$, $Ca(NO_3)_2$, $Ca_3(C_6HSO_7)_2$, $MgCl_2$, $MgBr_2$, $MgSO_4$, $Mg(PO_4)_2$, $Mg(ClO_4)_2$, $MgC_2O_4$, $Mg(NO_3)_2$, $Mg(OOCCH_3)_2$, and $MgC_4H_4O_4$; $Ti(OOCCH_3)_4$, $Ti(CO_3)_2$, $Ti(NO_3)_4$, $Ti(SO_4)_2$, $TiF_4$, $TiCl_4$, $Zr(OOCCH_3)_4$, $Zr(CO_3)_2$, $Zr(NO_3)_4$, $Zr(SO_4)_2$, $ZrF_4$, $ZrCl_4$, $ZrOCl_2$, $ZrO(NO_3)_2$, $ZrO(ClO_4)_2$, $ZrO(SO_4)$, $HF(OOCCH_3)_4$, $HF(CO_3)_2$, $HF(NO_3)_4$, $HF(SO_4)_2$, $HFOCl_2$, $HFF_4$, $HFCl_4$, $V(CH_3COCHCOCH_3)_3$, $VOSO_4$, VOCl3, $VCl_3$, $VCl_4$, and $VBr_3$; $Cr(CH_3COCHCOCH_3)_3$, $Cr(OOCCH_3)_2OH$, $Cr(NO_3)_3$, $Cr(ClO_4)_3$, $CrPO_4$, $Cr_2(SO_4)_3$, $CrO_2Cl_2$, $CrF_3$, $CrCl_3$, $CrBr_3$, $CrI_3$, $Mn(OOCCH_3)_2$, $Mn(CH_3COCHCOCH_3)_2$, $MnCO_3$, $Mn(NO_3)_2$, MnO, $Mn(ClO_4)_2$, $MnF_2$, $MnCl_2$, $Fe(OOCCH_3)_2$, $Fe(CH_3COCHCOCH_3)_3$, $FeCO_3$, $Fe(NO_3)_3$, $Fe(ClO_4)_3$, $FePO_4$, $FeSO_4$, $Fe_2(SO_4)_3$, $FeF_3$, $FeCl_3$, and $FeC_6H_5O_7$; $Co(OOCCH_3)_2$, $Co(CH_3COCHCOCH_3)_3$, $CoCO_3$, $Co(NO_3)_2$, $CoC_2O_4$, $Co(ClO_4)_2$, $Co_3(PO_4)_2$, $CoSO_4$, $CoF_2$, $CoCl_2$, $NiCO_3$, $Ni(NO_3)_2$, $NiC_2O_4$, $Ni(ClO_4)_2$, $NiSO_4$, $NiCl_2$, and $NiBr_2$; $Zn(OOCCH_3)_2$, $Zn(CH_3COCHCOCH_3)_2$, $ZnCO_3$, $Zn(NO_3)_2$, $Zn(ClO_4)_2$, $Zn_3(PO_4)_2$, $ZnSO_4$, $ZnF_2$, $ZnCl_2$, $AlF_3$, $AlCl_3$, $AlBr_3$, $AlI_3$, $Al_2(SO_4)_3$, $Al_2(C_2O_4)_3$, $Al(CH_3COCHCOCH_3)_3$, $Al(NO_3)_3$, $AlPO_4$, $GeCl_4$, $GeBr_4$, and $GeI_4$.

(3) Alkaline Treatment

Examples of the treating agent used in the alkaline treatment include LiOH, NaOH, KOH, $Mg(OH)_2$, $Ca(OH)_2$, $Sr(OH)_2$, and $Ba(OH)_2$.

(4) Organic Treatment

Examples of an organic matter used in the organic treatment include trimethyl ammonium, triethyl ammonium, N,N-dimethyl anilinium, and triphenyl phosphonium.

Examples of anions constituting the organic treating agent include anions shown as anions constituting an agent for saline treatment, hexafluoro phosphate, tetrafluoro borate, and tetraphenyl borate.

Generally, these silicates contain adsorption water and interlayer water. In the present invention, it is preferable to use these silicates after removing these adsorption water and interlayer water.

Adsorption water and interlayer water of the silicate can be removed by heating the silicate. In this process, it is necessary to select heating conditions so that interlayer water does not remain and a structure of the silicate is not destructed. A heating time is 0.5 hour or longer, and preferably 1 hour or longer. It is preferable to heat the silicate so that moisture content of the silicate is 3 wt % or less, and preferably 1 wt % or less, when moisture content of silicate obtained by dehydrating the silicate for 2 hours at a temperature of 200° C. and a pressure of 1 mmHg is defined as 0 wt %.

As has been described, in the present invention, what is particularly preferable as the ion-exchange layered silicate (B-4) is a silicate with a moisture content of 3 wt % or less, obtained by being subjected to the saline treatment and/or acid treatment.

It is preferable to treat the silicate with a later-mentioned metal compound (C) before the silicate is used as a catalyst or a raw material for a catalyst. The used amount of the organic metal compound (C) with respect to g of the silicate is generally 20 mmol or less, and preferably 0.5 mmol or more and 10 mmol or less. A treatment temperature is generally 0° C. or more and 70° C. or less, and a treatment time is 10 minutes or more and 3 hours or less. It is preferable to wash the silicate after treating the silicate. A solvent used for the washing is a hydrocarbon solvent, similarly with a case of later-mentioned preliminary polymerization or slurry polymerization.

The ion-exchange layered silicate (B-4) is preferably made of spherical particles whose average particle size is 5 μm or more. The ion-exchange layered silicate (B-4) may be a natural silicate or a commercially available silicate as it is if particles of the silicate are spherical. Alternatively, the ion-exchange layered silicate (B-4) may be a silicate whose particle shape and particle size are controlled by granulation, size classification, fractionation etc.

Examples of a method for the granulation include stirring granulation and spray granulation.

An organic matter, an inorganic solvent, an inorganic salt, and binders may be used in the granulation.

It is desirable that the spherical particles obtained as above have compressive breaking strength of 0.2 MPa or more, and particularly preferably 0.5 MPa or more, in consideration of preventing crushing or generation of fine powder in the polymerization step. Use of particles having such strength effectively exerts an effect of improving polymer particle properties particularly in the case of the preliminary polymerization.

In the present invention, the organoaluminumoxy compound (B-1), the organicboron compound (B-2), the zinc co-catalyst component (B-3), and the ion-exchange layered silicate (B-4) may be used alone or two or more thereof may be used in combination.

Organometallic Compound (C)

The organometallic compound (C) used in the present invention is not limited in particular, provided that it is a compound that contains an element of any of Groups 2, 12, and 13 of the periodic table of the elements (excluding an activating co-catalyst agent (B)), but the organometallic compound (C) is one or more compounds selected from the group of compounds represented by the following formula.

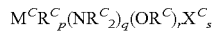

$M^C R^C{}_p(NR^C{}_2)_q(OR^C)_r X^C{}_s$ $M^C$ represents an atom of any of Groups 2, 12, and 13 of the periodic table of the elements. Examples of $M^C$ encompass a beryllium atom, a magnesium atom, a calcium atom, a strontium atom, a barium atom, a zinc atom, a cadmium atom, a mercury atom, a boron atom, an aluminum atom, a gallium atom, an indium atom, and a thallium atom. $M^C$ is preferably a magnesium atom, a calcium atom, an aluminum atom, a zinc atom, or a gallium atom, more preferably an aluminum atom or a zinc atom.

$R^C$ represents a hydrogen atom or a hydrocarbyl group having 1 to 20 carbon atoms. Examples of $R^C$ encompass an alkyl group, an aralkyl group, an aryl group, and an alkenyl group, and these optionally have a halogen atom, a hydrocarbyloxy group, an amino group, a nitro group, a sulfonyl group, or a silyl group as a substituent. Moreover, a plurality of $R^C$s may be the same as each other or may be different from each other.

Examples of the alkyl group encompass linear alkyl groups such as a methyl group, an ethyl group, an n-propyl group, an n-butyl group, an n-pentyl group, an n-hexyl group, an n-heptyl group, and an n-octyl group; branched alkyl groups such as an isopropyl group, an isobutyl group, a tert-butyl group, an isopentyl group, a neopentyl group, an isoamyl group, and a 2-ethylhexyl group; and cyclicalkyl groups such as a cyclopropyl group, a cyclobutyl group, a cyclopentyl group, a cyclohexyl group, a cycloheptyl group, and a cyclooctyl group. The alkyl group is preferably a linear or branched alkyl group having 1 to 20 carbon atoms.

Examples of the aralkyl group encompass a benzyl group and a phenethyl group. The aralkyl group is preferably an aralkyl group having 7 to 20 carbon atoms.

Examples of the aryl group encompass a phenyl group, a naphthyl group, and a tolyl group. The aryl group is preferably an aryl group having 6 to 20 carbon atoms.

Examples of the alkenyl group encompass linear alkenyl groups such as a vinyl group, an allyl group, a 3-butenyl group, and 5-hexenyl group; branched alkenyl groups such as an isobutenyl group and a 4-methyl-3-pentenyl group; and cyclic alkenyl groups such as a 2-cyclohexenyl group and a 3-cyclohexenyl group. The alkenyl group is preferably a linear or branched alkenyl group having 2 to 20 carbon atoms.

$X^C$ represents a halogen atom. Examples of $X^C$ encompass a chlorine atom, a bromine atom, an iodine atom, and a fluorine atom. $X^C$ is preferably a chlorine atom. A plurality of $X^C$s may be the same as each other or may be different from each other.

In the formula, p, q, r, and s are each an integer of any of 0 to 3. In a case where $M^C$ is an atom of Group 2 or 12 of the periodic table of the elements, p+q+r+s=2. Meanwhile, in a case where $M^C$ is an atom of Group 13 of the periodic table of the elements, p+q+r+s=3.

Examples of an organoaluminum compound used as the organometallic compound (C) in the present invention encompass tri-n-alkylaluminum such as trimethylaluminum, triethylaluminum, tri-n-propylaluminum, tri-n-butylaluminum, tri-n-pentylaluminum, tri-n-hexylaluminum, tri-n-octylaluminum, and tri-n-decyl aluminum; tri-branched chain alkylaluminum such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, and tri-2-ethylhexylaluminum; tricycloalkylaluminum such as tricyclohexylaluminum and tricyclooctylaluminum; triarylaluminum such as triphenylaluminum; di-n-alkylaluminum halides such as diethylaluminum bromide, di-n-propylaluminum bromide, di-n-butylaluminum bromide, di-n-pentylaluminum bromide, di-n-hexylaluminum bromide, diethylaluminum chloride, di-n-propylaluminum chloride, di-n-butylaluminum chloride, di-n-pentylaluminum chloride, and di-n-hexylaluminum chloride; di-branched chain alkylaluminum halides such as diisopropylaluminum bromide, diisobutylaluminum bromide, di-sec-butylaluminum bromide, di-tert-butylaluminum bromide, di-2-methylbutylaluminum bromide, di-3-methylbutylaluminum bromide, di-2-methylpentylaluminum bromide, di-3-methylpentylaluminum bromide, di-4-methylpentylaluminum bromide, di-2-methylhexylaluminum bromide, di-3-methylhexylaluminum bromide, di-2-ethylhexylaluminum bromide, diisopropylaluminum chloride, diisobutylaluminum chloride, di-sec-butylaluminum chloride, di-tert-butylaluminum chloride, di-2-methylbutylaluminum chloride, di-3-methylbutylaluminum chloride, di-2-methylpentylaluminum chloride, di-3-methylpentylaluminum chloride, di-4-methylpentylaluminum chloride, di-2-methylhexylaluminum chloride, di-3-methylhexylaluminum chloride, and di-2-ethylhexylaluminum chloride; and diarylaluminum halides such as diphenylaluminum bromide, dimethylphenylaluminum bromide, diethylphenylaluminum bromide, dibromophenylaluminum bromide, dichlorophenylaluminum bromide, difluorophenylaluminum bromide, dicyanophenylaluminum bromide, diphenylaluminum chloride, dimethylphenylaluminum chloride, diethylphenylaluminum chloride, dibromophenylaluminum chloride, dichlorophenylaluminum chloride, difluorophenylaluminum chloride, and dicyanophenylaluminum chloride. The organoaluminum compound is preferably an organoaluminum compound having 3 to 24 carbon atoms, more preferably tri-n-alkylaluminum, tri-branched chain alkylaluminum, or triarylaluminum each having 3 to 24 carbon atoms, further more preferably trimethylaluminum, triethylaluminum, triisobutylaluminum, or trioctylaluminum.

Examples of the organozinc compound used as the organometallic compound (C) in the present invention encompass di-n-alkylzinc such as dimethylzinc, diethylzinc, di-n-propylzinc, di-n-butyl zinc, di-n-pentylzinc, di-n-hexylzinc, di-n-octylzinc, and di-n-decylzinc; di-branched chain dialkylzinc such as diisopropylzinc, diisobutylzinc, di-sec-butylzinc, di-tert-butylzinc, di-2-methylbutylzinc, di-3-methylbutylzinc, di-2-methylpentylzinc, di-3-methylpentylzinc, di-4-methylpentylzinc, di-2-methylhexylzinc, di-3-methylhexylzinc, and di-2-ethylhexylzinc; dicycloalkylzinc such as dicyclohexylzinc and dicyclooctylzinc; diarylzinc such as diphenylzinc; n-alkylzinc halides such as ethylzinc bromide, n-propylzinc bromide, n-butylzinc bromide, n-pentylzinc bromide, n-hexylzinc bromide, ethylzinc chloride, n-propylzinc chloride, n-butylzinc chloride, n-pentylzinc chloride, and n-hexylzinc chloride; branched chain alkylzinc halides such as isopropylzinc bromide, isobutylzinc bromide, sec-butylzinc bromide, tert-butylzinc bromide, 2-methylbutylzinc bromide, 3-methylbutylzinc bromide, 2-methylpentylzinc bromide, 3-methylpentylzinc bromide, 4-methylpentylzinc bromide, 2-methylhexylzinc bromide, 3-methylhexylzinc bromide, 2-ethylhexyl zinc bromide, isopropylzinc chloride, isobutylzinc chloride, sec-butylzinc chloride, tert-butylzinc chloride, 2-methylbutylzinc chloride, 3-methylbutylzinc chloride, 2-methylpentylzinc chloride, 3-methylpentylzinc chloride, 4-methylpentylzinc chloride, 2-methylhexylzinc chloride, 3-methylhexylzinc chloride, and 2-ethylhexylzinc chloride; and arylzinc halides such as phenylzinc bromide, methylphenylzinc bromide, ethylphenylzinc bromide, bromophenylzinc bromide, chlorophenylzinc bromide, fluorophenylzinc bromide, cyanophenylzinc bromide, phenylzinc chloride, methylphenylzinc chloride, ethylphenylzinc chloride, bromophenylzinc chloride, chlorophenylzinc chloride, fluorophenylzinc chloride, and cyanophenylzinc chloride. The organozinc compound is preferably an organozinc compound having 2 to 16 carbon atoms, more preferably di-n-alkylzinc, di-branched chain alkylzinc, or diarylzinc each having 2 to 16 carbon atoms, further more preferably dimethyl zinc, diethyl zinc, diisobutylzinc, or dioctylzinc.

Organic Compound (D)

In the present invention, the organic compound (D) is used, as needed, for improving polymerization performance and physical properties of a generated polymer. Examples of the organic compound (D) encompass alcohols, phenols, carboxylic acids, amines, phosphorus compounds, and sulfonic acids and salts thereof.

Alcohols and phenols are represented by the general formula $R^{D1}OH$ where $R^{D1}$ represents a hydrocarbyl group having 1 to 20 carbon atoms or a halohydrocarbyl group having 1 to 20 carbon atoms, and is preferably a halohydrocarbyl group having 1 to 10 carbon atoms.

Carboxylic acids are represented by the general formula $R^{D2}COOH$ where $R^{D2}$ represents a hydrocarbyl group having 1 to 20 carbon atoms or a halohydrocarbyl group having 1 to 20 carbon atoms, and is preferably a halohydrocarbyl group having 1 to 10 carbon atoms.

Amines are represented by the general formula $NR^{D3}_3$ where $R^{D3}$ represents a hydrogen atom, a hydrocarbyl group having 1 to 20 carbon atoms or a halohydrocarbyl group having 1 to 20 carbon atoms, and at least one $R^{D3}$ is a hydrocarbyl group or a halohydrocarbyl group, and is preferably a halohydrocarbyl group having 1 to 10 carbon atoms.

Examples of phosphorus compounds encompass phosphines represented by the general formula $PR^{D4}_3$, phosphites represented by the general formula $P(OR^{D4})_3$, phosphine oxides represented by the general formula $O=PR^{D4}_3$, and phosphates represented by the general formula $O=P(OR^{D4})_3$ where $R^{D4}$ represents a hydrogen atom, a hydrocarbyl group having 1 to 20 carbon atoms or a halohydrocarbyl group having 1 to 20 carbon atoms, and at least one $R^{D4}$ is a hydrocarbyl group or a halohydrocarbyl group, and is preferably a halohydrocarbyl group having 1 to 10 carbon atoms.

Sulfonic acids and salts thereof are represented by the general formula $R^{D5}SO_3H$ and $(R^{D6}SO_3)_t M^D_u$, respectively, where MD is an element of any of Groups 1 to 14 of the periodic table of the elements.

In the general formula, $R^{D5}$ and $R^{D6}$ are each a hydrocarbyl group having 1 to 20 carbon atoms or a halohydrocarbyl group having 1 to 20 carbon atoms.

In the general formula, t and u are each an integer of any of 1 to 4, and satisfy t=u×v provided that v is valence of MD.

Formation of Polymerization Catalyst (X)

A method for forming a polymerization catalyst (X) is not limited in particular, but can be, for example, a method of bringing a transition metal compound (A), an activating co-catalyst agent (B), and optionally an organometallic compound (C) into contact with each other. This contact is made under the presence or absence of a solvent. These components may be contacted and mixed with each other and then added to a polymerization tank. Alternatively, these components may be separately added to a polymerization tank in any order so as to be contacted with each other in the polymerization tank. Alternatively, these components may be added to a polymerization tank in such a manner that any two of these components which two have been contacted and mixed with each other and the other one are separately added to the polymerization tank.

In formation of the polymerization catalyst (X), a method of adding the components, and an order in which the components are added, and added amounts of the components can be any ones. Examples of such a method encompass the following methods:

(1) Method of adding, to a polymerization tank, the transition metal compound (A) and the activating co-catalyst agent (B) that have been contacted and mixed with each other (2) Method of adding, to a polymerization tank, the transition metal compound (A) and the activating co-catalyst agent (B) in any order.

In each of the methods (1) and (2), one or more compounds selected from the organometallic compound (C) can be added, as needed, to the polymerization tank in any order for the purpose being used as a scavenger of a minute amount of water, oxygen, and other components that are catalyst poison in the polymerization tank or as an alkylating agent of the transition metal compound (A). The organometallic compound (C) is an optional component in formation of the polymerization catalyst (X), but is an essential component in the production method of the present invention.

The transition metal compound (A) is used in an amount of generally $10^{-12}$ to $10^{-2}$ mol, preferably $10^{-10}$ to $10^{-3}$ mol per liter of a reaction volume.

In a case where the organoaluminumoxy compound (B-1) is used as the activating co-catalyst agent (B), the organoaluminumoxy compound (B-1) is used in such an amount that a molar ratio [Al/(A)] of an aluminum atom in the organoaluminumoxy compound (B-1) to the transition metal compound (A) is generally 10 to 500,000, preferably 20 to 100,000. In a case where the organoboron compound (B-2) is used, the organoboron compound (B-2) is used in such an amount that a molar ratio [B/(A)] of a boron atom in the organoboron compound (B-2) to the transition metal compound (A) is generally 1 to 1,000, preferably 1 to 100. In a case where the zinc co-catalyst component (B-3) is used, the zinc co-catalyst component (B-3) is used in such an amount that a molar ratio [Zn/(A)] of a zinc atom in the zinc co-catalyst component (B-3) to the transition metal compound (A) is generally 1 to 1,000,000, preferably 10 to 500,000, more preferably 100 to 100,000. In a case where the ion-exchange layered silicate (B-4) is used, the ion-exchange layered silicate (B-4) is used in such an amount that weight g [(B-4) g/(A) mmol] of the ion-exchange layered silicate (B-4) per 1 mmol of the transition metal compound (A) is generally 0.1 to 1,000, preferably 1 to 1,000.

Of the methods (1) and (2), a preferable one is the method (2) of adding, to the polymerization tank, the components in any order.

In the method of the present invention for producing an olefin block polymer, a plurality of polymerization catalysts (X) may be used which are different in at least one of the components constituting each of the polymerization catalysts (X), i.e., the transition metal compound (A), the activating co-catalyst agent (B), and the organometallic compound (C).

Olefin

Olefin used in the present invention is preferably an olefin having 2 to 20 carbon atoms, and can be, for example, ethylene, α-olefin, cyclic olefin, an alkenyl alicyclic compound, or polar olefin.

Examples of α-olefin encompass propylene, 1-butene, 1-pentene, 4-methyl-1-pentene, 5-methyl-1-hexene, 1-hexene, 1-heptene, 1-octene, 1-nonene, and 1-decene.

Examples of cyclic olefin encompass cyclobutene, cyclopentene, cyclohexene, cycloheptene, cyclooctene, cyclononene, cyclodecene, norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene, and 8-cyanotetracyclododecene.

Examples of the alkenyl alicyclic compound encompass vinylcyclohexane.

Examples of polar olefin encompass α,β-unsaturated carboxylic acids such as acrylic acid, methacrylic acid, fumaric acid, maleic anhydride, itaconic acid, itaconic acid anhydride, and bicyclo(2,2,1)-5-heptene-2,3-dicarboxylic acid, and metal salts thereof such as sodium, potassium, lithium, zinc, magnesium, and calcium salts thereof; α,β-unsaturated carboxylic acid ester such as methyl acrylate, ethyl acrylate, n-propyl acrylate, isopropyl acrylate, t-butyl acrylate, 2-ethylhexyl acrylate, methyl methacrylate, ethyl methacrylate, n-propyl methacrylate, isopropyl methacrylate, n-butyl methacrylate, and isobutyl methacrylate; unsaturated dicarboxylic acid such as maleic acid and itaconic acid; vinyl ester such as vinyl acetate, vinyl propionate, vinyl caproate, vinyl caprate, vinyl laurate, vinyl stearate, vinyl trifluoroacetate; and unsaturated-carboxylic-acid glycidyl ester such as glycidyl acrylate, glycidyl methacrylate, and itaconic acid mon-glycidyl ester.

The olefin is preferably ethylene, an α-olefin having 3 to 20 carbon atoms, a cyclic olefin having 3 to 20 carbon atoms, or an alkenyl alicyclic compound having 5 to 20 carbon atoms, more preferably ethylene or an α-olefin having 3 to 20 carbon atoms, further more preferably ethylene or an α-olefin having 3 to 10 carbon atoms, most preferably ethylene or propylene.

The olefin may be used alone or in combination of two or more thereof. In a case where two or more olefins are used, the two or more olefins may be added simultaneously or may be added sequentially. Moreover, a combination and a used proportion of the two or more olefins are not limited in particular.

Olefin Polymerization Condition

In the present invention, a method for polymerizing olefin may be a liquid-phase polymerization method such as a solvent polymerization method or a suspension polymerization method or may be a gas-phase polymerization method.

Specific examples of an inactive hydrocarbyl medium used in the liquid-phase polymerization method encompass aliphatic hydrocarbyl such as propane, butane, pentane, hexane, heptane, octane, decane, dodecane and kerosene; alicyclic hydrocarbyl such as cyclopentane, cyclohexane, and methylcyclopentane; aromatic hydrocarbyl such as benzene, toluene, and xylene; halohydrocarbyl such as ethylene chloride, chlorobenzene, and dichloromethane; and mixtures of these. Olefin itself may also be used as a solvent.

The method of the present invention for producing an olefin block polymer is not limited provided that olefin is polymerized with the use of the polymerization catalyst (X) and the organometallic compound (C), but can be, for example, any of the following methods.

Single-Stage Polymerization Method (1)

One method is a method for producing an olefin block polymer by carrying out single-stage polymerization including just one polymerization step with the use of two or more polymerization catalysts (X), one or more organometallic compounds (C), one or more olefin, and as needed the organic compound (D).

In the single-stage polymerization method (1), the two or more polymerization catalysts (X) are preferably formed almost simultaneously according to the above method for forming a polymerization catalyst.

In the single-stage polymerization method (1), olefin is preferably added to the polymerization tank before the polymerization catalysts (X) are formed in the polymerization tank or before the polymerization catalysts (X) that have been formed outside the polymerization tank is added to the polymerization tank. The olefin may be successively added to the polymerization tank so that (i) in a case where one olefin is used, an olefin concentration in the polymerization tank may be kept constant during the polymerization and (ii) in a case where two or more olefins are used, olefin concentrations and a composition ratio of the two or more olefins may be kept constant during the polymerization.

Multi-Stage Polymerization Method (2)

Another method is a method for producing an olefin block polymer by carrying out multi-stage polymerization including two or more polymerization steps with the use of two or more polymerization catalysts (X), one or more organometallic compounds (C), one or more olefins, and as needed the organic compound (D), the two or more polymerization steps being same in olefin composition, two adjacent polymerization steps differing in the polymerization catalyst (X) to be used, and in each of the polymerization steps, the olefins are polymerized in the presence of a polymer obtained in the last preceding polymerization step.

The multi-stage polymerization method (2) includes at least the step <step 2A> of polymerizing olefin in the presence of a polymerization catalyst (X-A), and the step <step 2B> of polymerizing, subsequently to the <step 2A>, olefin same in composition as that used in the <step 2A> in the presence of a polymerization catalyst (X-B) different from that used in the <step 2A>. Note that the polymerization catalysts (X-A) and (X-B) are both encompassed in the polymerization catalyst (X).

In the multi-stage polymerization method (2), any two adjacent polymerization steps are (i) the <step 2A> in which a polymerization catalyst (X-A) is formed in the polymerization tank or a polymerization catalyst (X-A) that has been formed outside the polymerization tank is added to the polymerization tank and (ii) the <step 2B> in which a polymerization catalyst (X-B) different from that used in the <step 2A> is formed in the polymerization tank or a polymerization catalyst (X-B) that has been formed outside the polymerization tank and different from that used in the <step 2A> is added.

In the multi-stage polymerization method (2), the olefin to be used in the <step 2A> is preferably added to the polymerization tank before the polymerization catalyst (X-A) is formed in the polymerization tank or before the polymerization catalyst (X-A) that has been formed outside the polymerization tank is added to the polymerization tank, and the olefin to be used in the <step 2B> is preferably added to the polymerization tank before the polymerization catalyst (X-B) is formed in the polymerization tank or before the polymerization catalyst (X-B) that has been formed outside the polymerization tank is added to the polymerization tank. The olefin may be successively added to the polymerization tank so that (i) in a case where one olefin is used, an olefin concentration in the polymerization tank may be kept constant during the polymerization and (ii) in a case where two or more olefins are used, olefin concentrations and a composition ratio of the two or more olefins may be kept constant during the polymerization.

The multi-stage polymerization method (2) may further include a step of polymerizing olefin same in composition as those used in the <step 2A> or the <step 2B> in the presence of a polymerization catalyst (X) different from those used in the <step 2A> or the <step 2B>. The multi-stage polymerization method (2) has preferably 2 to 5 polymerization steps, more preferably 2 or 3 polymerization steps, most preferably 2 polymerization steps.

In each polymerization step, olefin is polymerized in the presence of a polymer obtained by the last preceding polymerization step. In each of the second and subsequent polymerization steps, olefin is polymerized in the presence of a polymer obtained by the last preceding polymerization step.

Multi-Stage Polymerization Method (3)

Still another method is a method for producing an olefin block polymer by carrying out multi-stage polymerization including two or more polymerization steps with the use of one or more polymerization catalysts (X), one or more organometallic compounds (C), one or more olefins, and as needed the organic compound (D), wherein any two adjacent polymerization steps differ in olefin composition, and in each of the polymerization steps, the olefins are polymerized in the presence of a polymer obtained by the last preceding polymerization step.

The multi-stage polymerization method (3) includes at least the step <step 3A> of polymerizing olefin [A] in the presence of one or more polymerization catalysts (X), and the step <step 3B> of polymerizing, subsequently to the <step 3A>, olefin [B] different in composition from that used in the <step 3A> in the presence of a polymerization catalyst (X) same as or different from that used in the <step 3A>.

In the multi-stage polymerization method (3), any two adjacent polymerization steps are (i) the <step 3A> in which one or more polymerization catalysts (X) are formed in the polymerization tank or one or more polymerization catalysts (X) that has been formed outside the polymerization tank are added to the polymerization tank and (ii) the <step 3B> in which a polymerization catalyst (X) same as or different from that used in the <step 3A> is formed in the polymerization tank or a polymerization catalyst (X) that has been formed outside the polymerization tank and same as or different from that used in the <step 3A> is added.

In the multi-stage polymerization method (3), the olefin [A] to be used in the <step 3A> is preferably added to the polymerization tank before the polymerization catalyst (X) is formed in the polymerization tank or before the polymerization catalyst (X) that has been formed outside the polymerization tank is added to the polymerization tank, and the olefin [B] to be used in the <step 3B> is preferably added to the polymerization tank before the polymerization catalyst (X) is formed in the polymerization tank or before the polymerization catalyst (X) that has been formed outside the polymerization tank is added to the polymerization tank. The olefin may be successively added to the polymerization tank so that (i) in a case where one olefin is used, an olefin concentration in the polymerization tank may be kept constant during the polymerization and (ii) in a case where two or more olefins are used, olefin concentrations and a composition ratio of the two or more olefins may be kept constant during the polymerization.

The multi-stage polymerization method (3) may further include a step of polymerizing olefin different in composition from those used in the <step 3A> or the <step 3B> in the presence of a polymerization catalyst (X) same as or different from those used in the <step 3A> or the <step 3B>. The multi-stage polymerization method (3) has preferably 2 to 5 polymerization steps, more preferably 2 or 3 polymerization steps, most preferably 2 polymerization steps.

In each of the polymerization steps, olefin is polymerized in the presence of a polymer obtained by the last preceding polymerization step. In each of the second and subsequent polymerization steps, olefin is polymerized in the presence of a polymer obtained by the last preceding polymerization step.

In any of the single-stage polymerization method (1), the multi-stage polymerization method (2), and the multi-stage polymerization method (3), the organometallic compound (C) can be added to the polymerization tank at any point of time in reaction operation, but is preferably added to the polymerization tank before start of the polymerization, i.e., before formation of the polymerization catalyst (X). A preferable method for adding the organometallic compound (C) is, for example, a method of adding the organometallic compound (C) to the polymerization tank by a specific method under stirring. In this case, the organometallic compound (C) may be directly added to the polymerization tank or may be dissolved in an organic solvent such as n-hexane and then added to the polymerization tank. Further, the organometallic compound (C) may be, as needed, divided into parts, which are separately added.

The organometallic compound (C) is used in such an amount that a molar ratio [(C)/(A)] of the organometallic compound (C) to the transition metal compound (A) is generally 1 to 100000, preferably 10 to 10000, more preferably 20 to 5000.

In a case where the organic compound (D) is used, the organic compound (D) can be added, alone or after being brought into contact with and mixed with the organometallic compound (C), to the polymerization tank at any point of time in reaction operation, but is preferably added to the polymerization tank before start of the polymerization, i.e., before formation of the polymerization catalyst (X). A preferable method for adding the organic compound (D) is, for example, a method of adding the organic compound (D) to the polymerization tank by a specific method under stirring. In this case, the organic compound (D) may be directly added to the polymerization tank or may be dissolved in an organic solvent such as n-hexane and then added to the polymerization tank. Further, the organic compound (D) may be, as needed, divided into parts, which are separately added.

In a case where the organic compound (D) is used, the organic compound (D) is used in an amount such that a molar ratio [(D)/(C)] of the organic compound (D) to the organometallic compound (C) is generally 0.001 to 10, preferably 0.005 to 2.

In each of the polymerization methods (1) to (3) in the present invention, the polymerization catalyst (X) and olefin are preferably selected so that two or more segments differing in chemical or physical property may be formed.

In the polymerization methods (1) and (2), for example, it is preferred to select two or more polymerization catalysts (X) differing in polymerization performance such as stereo-regularity, branch structure introduction ratio, and copolymerization property and to further select the composition of olefin so that two or more segments differing in chemical or physical property may be formed by the polymerization catalysts (X). In the polymerization method (3), it is preferred to select one or more polymerization catalysts (X) and to select the composition of olefin so that two or more segments differing in chemical or physical property may be formed by the polymerization catalysts (X).

Each of the single-stage polymerization (1), the multi-stage polymerization (2), and the multi-stage polymerization (3) may be continuous polymerization or may be batch polymerization, but is preferably batch polymerization. The multi-stage polymerizations (2) and (3) may be carried out such that each polymerization step is carried out in the same reaction vessel or the same reaction zone in the presence of a polymer produced by the last preceding polymerization step or may be carried out such that each polymerization step is carried out in a different reaction vessel or a different reaction zone to which a polymer produced by the last preceding polymerization step has been transferred. Preferably, the multi-stage polymerizations (2) and (3) are carried out such that each polymerization step is carried out in the same reaction vessel or the same reaction zone in the presence of a polymer produced by the last preceding polymerization step.

Among the single-stage polymerization method (1), the multi-stage polymerization method (2), and the multi-stage polymerization method (3), the method of the present invention for producing an olefin block polymer is preferably the multi-stage polymerization method (2) or the multi-stage polymerization method (3), more preferably the multi-stage polymerization method (3).

The multi-stage polymerization method (3) is preferably two-stage polymerization in which the former stage and the latter stage are different from each other in olefin composition, more preferably two-stage polymerization including copolymerization of two or more olefins and homopolymerization of one olefin (there is no restriction on how the copolymerization and the homopolymerization are associated with the former stage and the latter stage), further more preferably two-stage polymerization made up of ethylene/propylene copolymerization and propylene homopolymerization (there is no restriction on how the copolymerization and the homopolymerization are associated with the former stage and the latter stage).

The following describes, in more details, two-stage polymerization including the <step 2A> (former stage) and the <step 2B> (latter stage) of the multi-stage polymerization method (2).

<Step 2A>

In the <step 2A>, olefin is polymerized in the presence of the polymerization catalyst (X-A).

In a case where the organometallic compound (C) is used in the <step 2A>, the organometallic compound (C) is used in such an amount that a molar ratio [(C)/(A)] of the organometallic compound (C) to the transition metal compound (A) is generally 1 to 100000, preferably 10 to 10000, more preferably 20 to 5000. In a case where the organic compound (D) is further used, the organic compound (D) is used in such an amount that a molar ratio [(D)/(C)] of the organic compound (D) to the organometallic compound (C) is generally 0.001 to 10, preferably 0.005 to 2.

The olefin to be polymerized in the <step 2A> is one or more olefins selected from olefins having 2 to 20 carbon atoms. The member(s) of olefin to be used or an amount ratio in a case where two or more olefins are used are not limited in particular. The olefin to be used is preferably one or more olefins selected from among ethylene, α-olefins having 3 to 20 carbon atoms, cyclic olefins having 3 to 20 carbon atoms, and alkenyl alicyclic compounds having 5 to 20 carbon atoms, more preferably one or more olefins selected from among ethylene and α-olefins having 3 to 20 carbon atoms, further more preferably one or more olefins selected from among ethylene and α-olefins having 3 to 10 carbon atoms, most preferably one or more olefins selected from ethylene and propylene.

In the olefin polymerization in the <step 2A>, a polymerization reaction temperature is generally −40° C. to 200° C., preferably 0° C. to 150° C., further more preferably 40° C. to 130° C., a reaction pressure is generally ordinary pressure to 10 MPa, preferably ordinary pressure to 5 MPa, and a reaction time is generally 5 minutes to 48 hours, preferably 5 minutes to 12 hours.

<Step 2B>

In the <step 2B> following the <step 2A>, olefin same in composition as that used in the <step 2A> is polymerized in the presence of the polymerization catalyst (X-B) different from that used in the <step 2A>.

In a case where the organometallic compound (C) is used in the <step 2B>, the organometallic compound (C) is used in such an amount that a molar ratio [(C)/(A)] of the organometallic compound (C) to the transition metal compound (A) is generally 1 to 100000, preferably 10 to 10000, more preferably 20 to 5000. In a case where the organic compound (D) is further used, the organic compound (D) is used in such an amount that a molar ratio [(D)/(C)] of the organic compound (D) to the organometallic compound (C) is generally 0.001 to 10, preferably 0.005 to 2.

The olefin to be polymerized in the <step 2B> is identical in composition to that used in the <step 2A>.

In the olefin polymerization in the <step 2B>, a polymerization reaction temperature is generally −40° C. to 200° C., preferably 0° C. to 150° C., further more preferably 40° C. to 130° C., a reaction pressure is generally ordinary pressure to 10 MPa, preferably ordinary pressure to 5 MPa, and a reaction time is generally 5 minutes to 48 hours, preferably 5 minutes to 12 hours.

The following describes, in more details, two-stage polymerization including the <step 3A> (former stage) and the <step 3B> (latter stage) of the multi-stage polymerization method (3).

<Step 3A>

In the <step 3A>, olefin [A] is polymerized in the presence of one or more polymerization catalysts (X).

In a case where the organometallic compound (C) is used in the <step 3A>, the organometallic compound (C) is used in such an amount that a molar ratio [(C)/(A)] of the organometallic compound (C) to the transition metal compound (A) is generally 1 to 100000, preferably 10 to 10000, more preferably 20 to 5000. In a case where the organic compound (D) is further used, the organic compound (D) is used in such an amount that a molar ratio [(D)/(C)] of the organic compound (D) to the organometallic compound (C) is generally 0.001 to 10, preferably 0.005 to 2.

The olefin to be polymerized in the <step 3A> is one or more olefins selected from olefins having 2 to 20 carbon atoms. The member(s) of olefin to be used or an amount ratio in a case where two or more olefins are used are not limited in particular. The olefin to be used is preferably one or more olefins selected from among ethylene, α-olefins having 3 to 20 carbon atoms, cyclic olefins having 3 to 20 carbon atoms, and alkenyl alicyclic compounds having 5 to 20 carbon atoms, more preferably one or more olefins selected from among ethylene and α-olefins having 3 to 20 carbon atoms, further more preferably one or more olefins selected from among ethylene and α-olefins having 3 to 10 carbon atoms, most preferably one or more olefins selected from ethylene and propylene.

In the olefin polymerization in the <step 3A>, a polymerization reaction temperature is generally −40° C. to 200° C., preferably 0° C. to 150° C., further more preferably 40° C. to 130° C., a reaction pressure is generally ordinary pressure to 10 MPa, preferably ordinary pressure to 5 MPa, and a reaction time is generally 5 minutes to 48 hours, preferably 5 minutes to 12 hours.

<Step 3B>

In the <step 3B> following the <step 3A>, olefin [B] different in composition from that used in the <step 3A> is polymerized in the presence of a polymerization catalyst (X) same or different from that used in the <step 3A>.

In a case where the organometallic compound (C) is used in the <step 3B>, the organometallic compound (C) is used in such an amount that a molar ratio [(C)/(A)] of the organometallic compound (C) to the transition metal compound (A) is generally 1 to 100000, preferably 10 to 10000, more preferably 20 to 5000. In a case where the organic compound (D) is further used, the organic compound (D) is used in such an amount that a molar ratio [(D)/(C)] of the organic compound (D) to the organometallic compound (C) is generally 0.001 to 10, preferably 0.005 to 2.

The olefin to be polymerized in the <step 3B> is one or more olefins selected from olefins having 2 to 20 carbon atoms. The member(s) of olefin to be used or an amount ratio in a case where two or more olefins are used are not limited in particular, as long as the <step 3A> and the <step 3B> differ in composition of the olefin used. The olefin to be used is preferably one or more olefins selected from among ethylene, α-olefins having 3 to 20 carbon atoms, cyclic olefins having 3 to 20 carbon atoms, and alkenyl alicyclic compounds having 5 to 20 carbon atoms, more preferably one or more olefins selected from among ethylene and α-olefins having 3 to 20 carbon atoms, further more preferably one or more olefins selected from among ethylene and α-olefins having 3 to 10 carbon atoms, most preferably one or more olefins selected from ethylene and propylene.

In the olefin polymerization in the <step 3B>, a polymerization reaction temperature is generally −40° C. to 200° C., preferably 0° C. to 150° C., further more preferably 40° C. to 130° C., a reaction pressure is generally ordinary pressure to 10 MPa, preferably ordinary pressure to 5 MPa, and a reaction time is generally 5 minutes to 48 hours, preferably 5 minutes to 12 hours.

In the two-stage polymerization including the <step 3A> and the <step 3B>, it is more preferable that copolymerization of two or more olefins be carried out in one of the <step 3A> and the <step 3B> and homopolymerization of one olefin be carried out in the other one of the <step 3A> and the <step 3B>. It is further more preferable that ethylene/propylene copolymerization be carried out in one of the <step 3A> and the <step 3B> and homopolymerization of propylene be carried out in the other one of the <step 3A> and the <step 3B>.

By stopping polymerization reaction after completion of all the polymerization steps, an olefin block polymer is obtained.

A method of stopping polymerization reaction is (1) a method of adding a specific substance for reducing activity of the polymerization catalyst (X), (2) heating treatment, or (3) removal of olefin, and is preferably the method (1).

Olefin Block Polymer

An olefin block polymer produced by the method of the present invention is an olefin block polymer including (A) one or more polymer segments formed by polymerizing one or more olefins selected from olefins having 2 to 20 carbon atoms with the use of the polymerization catalyst (X) and (B) one or more polymer segments formed by polymerizing one or more olefins selected from olefins having 2 to 20 carbon atoms with the use of the polymerization catalyst (X), the one or more polymer segments (B) being different in chemical or physical property from the one or more polymer segments (A).

The olefin block polymer may further include, in addition to the one or more polymer segments (A) and the one or more polymer segments (B), one or more polymer segments (C) different in chemical or physical property from both of the polymer segment (A) and the polymer segment (B).

The total number of polymer segments in the olefin block polymer is 2 or more. The average number of polymer segments in the olefin block polymer obtained by the single-stage polymerization method (1) is preferably 3 or more, more preferably 5 or more, further more preferably 7 or more, most preferably 10 or more. The number of polymer segments in the olefin block polymer obtained by the multi-stage polymerization method (2) or (3) coincides with or smaller than the number of polymerization steps included in multi-stage polymerization that is carried out, but is preferably 2 to 5, more preferably 2 to 4, further more preferably 2 or 3, most preferably 2.

Each of the polymer segments may be a homopolymer segment obtained from one olefin selected from olefins having 2 to 20 carbon atoms or may be a copolymer segment obtained from two or more olefins selected from olefins having 2 to 20 carbon atoms.

In a case where each of the polymer segments is a copolymer segment obtained from two or more olefins, the copolymer segment may be a random copolymer segment in which an olefin composition has a constant ratio, a tapered polymer segment in which an olefin composition successively changes, or an alternating copolymer segment in which two olefins are polymerized alternately.

A homopolymer segment serving as each of the polymer segments (A), (B), and (C) is preferably a homopolymer segment of ethylene, α-olefin having 3 to 20 carbon atoms, cyclic olefin having 3 to 20 carbon atoms, or alkenyl alicyclic compound having 5 to 20 carbon atoms, more preferably a homopolymer segment of ethylene or α-olefin having 3 to 20 carbon atoms, further more preferably a homopolymer segment of ethylene or α-olefin having 3 to 10 carbon atoms, most preferably a homopolymer segment of ethylene or propylene.

The homopolymer segment of ethylene may be a straight-chain polyethylene segment, a short-chain branched polyethylene segment, a long-chain branched polyethylene segment, or a hyper branched polyethylene segment, but is preferably a straight-chain polyethylene segment or a hyper branched polyethylene segment.

The homopolymer segment of propylene may be an isotactic polypropylene segment, an atactic polypropylene segment, or a syndiotactic polypropylene segment, but is preferably an isotactic polypropylene segment or an atactic polypropylene segment.

Meanwhile, examples of a preferable copolymer segment encompass a copolymer segment of ethylene with α-olefin having 3 to 20 carbon atoms, specifically a copolymer segment of ethylene with propylene, 1-butene, 1-pentene, 1-hexene, 1-octene, 1-decene or the like; a copolymer segment of propylene with α-olefin having 4 to carbon atoms, specifically a copolymer segment of propylene with 1-butene, 1-pentene, 1-hexene, 1-octene, 1-decene or the like; a copolymer segment of ethylene or propylene with cyclic olefin having 5 to 20 carbon atoms, specifically a copolymer segment with tetracyclododecene, norbornene, methyl norbornene or the like; and a copolymer segment of ethylene or propylene with an alkenyl alicyclic compound having 8 to 20 carbon atoms, specifically a copolymer segment with vinylcyclohexane or the like.

Among these polymer segments, a polyethylene segment, a polypropylene segment, a polybutene segment, a polyhexene segment, a polyoctene segment, an ethylene/propylene copolymer segment, an ethylene/butene copolymer segment, an ethylene/hexene copolymer segment, an ethylene/octene copolymer segment, a propylene/butene copolymer segment, a propylene/hexene copolymer segment, and a propylene/octene copolymer segment are more preferable, and a polyethylene segment, a polypropylene segment, and an ethylene/propylene copolymer segment are further more preferable.

The olefin block polymer produced by the method of the present invention is preferably a block polymer having a straight-chain polyethylene segment and a branched polyethylene segment, a block polymer having a polyethylene segment and a polypropylene segment, a block polymer having a polyethylene segment and a polybutene segment, a block polymer having a polyethylene segment and a polyhexene segment, a block polymer having a polyethylene segment and a polyoctene segment, a block polymer having an isotactic polypropylene segment and a syndiotactic polypropylene segment, a block polymer having an isotactic polypropylene segment and an atactic polypropylene segment, a block polymer having an atactic polypropylene segment and a syndiotactic polypropylene segment, a block polymer having a polypropylene segment and a polybutene segment, a block polymer having a polypropylene segment and a polyhexene segment, a block polymer having a polypropylene segment and a polyoctene segment, a block polymer having a polyethylene segment and an ethylene/propylene copolymer segment, a block polymer having a polyethylene segment and an ethylene/butene copolymer segment, a block polymer having a polyethylene segment and an ethylene/hexene copolymer segment, a block polymer having a polyethylene segment and an ethylene/octene copolymer segment, a block polymer having a polypropylene segment and an ethylene/propylene copolymer segment, a block polymer having a polypropylene segment and a propylene/butene copolymer segment, a block polymer having a polypropylene segment and a propylene/hexene copolymer segment, or a block polymer having a polypropylene segment and a propylene/octene copolymer segment; more preferably a block polymer having a polyethylene segment and a polypropylene segment, a block polymer having a polyethylene segment and an ethylene/propylene copolymer segment, or a block polymer having a polypropylene segment and an ethylene/propylene copolymer segment; further more preferably a block polymer having a polyethylene segment and an ethylene/propylene copolymer segment or a block polymer having a polypropylene segment and an ethylene/propylene copolymer segment.

Olefin Block Copolymer Composition

An olefin block copolymer composition obtained in accordance with the production method of the present invention includes, in addition to an olefin block polymer formed by chemical binding between the polymer segment (A) and the polymer segment (B), a polymer (A) which is not bound to a polymer segment (B) and has a structure equivalent to that of the polymer segment (A) and/or a polymer (B) which is not bound to a polymer segment (A) and has a structure equivalent to that of the polymer segment (B).

The olefin block polymer formed by chemical binding between the polymer segment (A) and the polymer segment (B) is generally different, in extracted component amount or residual component amount in solvent extraction, from a simple blended polymer of the polymer (A) and the polymer (B). By utilizing this property, a generation amount of the olefin block polymer in the olefin block copolymer composition can be evaluated.

For example, generally, isotactic polypropylene (hereinafter referred to as $^i$PP) remains as a room temperature xylene insoluble (hereinafter referred to as CXIS) component, and an ethylene/propylene random copolymer (hereinafter referred to as EP) is extracted as a room temperature xylene soluble (hereinafter referred to as CXS) component. However, in a case of a block polymer (hereinafter referred to as $^i$PP-b-EP) in which an $^i$PP segment and an EP segment are bonded chemically, $^i$PP-b-EP exists in a residual component as a CXIS component, due to the property of the $^i$PP segment. Accordingly, a generation amount of $^i$PP-b-EP in an ethylene/propylene copolymer composition including $^i$PP, EP, and $^i$PP-b-EP can be evaluated by measuring an EP content in a CXIS component (hereinafter referred to as $EP_{CXIS}$) of the ethylene/propylene copolymer composition.

The following describes a method for calculating $EP_{CXIS}$. An EP content in a CXS component (hereinafter referred to as $EP_{CXS}$) satisfies $EP_{CXS} \approx 100$ since approximately all the CXS component is an EP component. Accordingly, (an ethylene content in the CXS component (hereinafter referred to as $C_{2'CXS}$)) (an ethylene content in the EP component (hereinafter referred to as $C_{2'EP}$)). Further, since the EP composition in the CXS component and the EP composition in the CXIS component are approximately equal to each other, (the ethylene content in the CXIS component (hereinafter referred to as $C_{2'CXIS}$))/$C_{2'CXS} \times 100 = EP_{CXIS}$.

$$EP_{CXS} = 100 \quad \text{[Math 1]}$$

$$C'_{2EP} = C'_{2CXS}$$

$$EP_{CXIS} = \frac{C'_{2CXIS}}{C'_{2EP}} \times 100 = \frac{C'_{2CXIS}}{C'_{2CXS}} \times 100$$

A value of $EP_{CXIS}$ of the ethylene/propylene copolymer composition of the present invention is preferably 3.0 wt % or more, more preferably 5.0 wt % or more, further more preferably 10.0 wt % or more, still more preferably 15.0 wt % or more, most preferably 20.0 wt % or more.

Further, according to the ethylene/propylene copolymer composition of the present invention, there is high similarity in composition distribution between an EP component existing in a CXS component and an EP component existing in a CXIS component. In contrast to this, according to a polymer which is produced with the use of a conventional Ziegler-Natta solid catalyst and has an $^i$PP segment and an EP segment, there is a large difference in composition distribution between an EP component existing in a CXS component and an EP component existing in a CXIS component.

The following describes a method for calculating ΔEP representative of similarity in composition distribution between an EP component existing in a CXS component and an EP component existing in a CXIS component. In order to compare a composition distribution of the EP component existing in the CXS component and a composition distribution of the EP component existing in the CXIS component, a ratio of each triad to all the triads, which is obtained from $^{13}$CNMR, is calculated for both of these components. Generally, ratios of 6 triads, i.e., PPP, PPE, EPE, PEP, PEE and EEE are used. However, in order to eliminate contribution by an $^i$PP segment, this method uses $PPE^{EP}$, $EPE^{EP}$, $PEP^{EP}$, $PEE^{EP}$, and $EEE^{EP}$, which are ratios of 5 triads (i.e., PPE, EPE, PEP, PEE, and EEE) to all the triads excluding PPP. Further, absolute values of differences in ratios of the respective triads between the CXIS component and the CXS component are obtained as $\Delta PPE^{EP}$, $\Delta EPE^{EP}$, $\Delta PEP^{EP}$, $\Delta PEE^{EP}$, and $\Delta EEE^{EP}$, respectively, and an arithmetic mean of these absolute values is obtained as ΔEP.

$$PPE^{EP} = \frac{PPE}{PPE+EPE+PEP+PEE+EEE} \quad \text{[Math 2]}$$

$$\Delta PPE^{EP} = |PPE^{EP}_{CXIS} - PPE^{EP}_{CXS}|$$

$$EPE^{EP} = \frac{EPE}{PPE+EPE+PEP+PEE+EEE}$$

$$\Delta EPE^{EP} = |EPE^{EP}_{CXIS} - EPE^{EP}_{CXS}|$$

$$PEP^{EP} = \frac{PEP}{PPE+EPE+PEP+PEE+EEE}$$

$$\Delta PEP^{EP} = |PEP^{EP}_{CXIS} - PEP^{EP}_{CXS}|$$

$$PEE^{EP} = \frac{PEE}{PPE+EPE+PEP+PEE+EEE}$$

$$\Delta PEE^{EP} = |PEE^{EP}_{CXIS} - PEE^{EP}_{CXS}|$$

$$EEE^{EP} = \frac{EEE}{PPE+EPE+PEP+PEE+EEE}$$

$$\Delta EEE^{EP} = |EEE^{EP}_{CXIS} - EEE^{EP}_{CXS}|$$

$$\Delta EP = \frac{\Delta PPE^{EP} + \Delta EPE^{EP} + \Delta PEP^{EP} + \Delta PEE^{EP} + \Delta EEE^{EP}}{5} \times 100$$

A value of ΔEP of the ethylene/propylene copolymer composition of the present invention is preferably 20% or less, more preferably 15% or less, further more preferably 10% or less, still more preferably 5% or less, most preferably 3% or less.

A value of $C_{2'CXIS}$ of the ethylene/propylene copolymer composition of the present invention is preferably 1.0 wt % or more, more preferably 2.5 wt % or more, further more preferably 5.0 wt % or more, still more preferably 7.5 wt % or more, most preferably 10.0 wt % or more.

A value of weight percent of a CXIS component of the ethylene/propylene copolymer composition of the present invention to the composition is preferably 10.0 wt % or more, more preferably 20.0 wt % or more, further more preferably 30.0 wt % or more, still more preferably 40.0 wt % or more, most preferably 50.0 wt % or more.

A value of a glass transition point $T_g$ of the CXIS component of the ethylene/propylene copolymer composition of the present invention is preferably −30° C. or lower, more preferably −35° C. or lower, further more preferably −40° C. or lower, still more preferably −45° C. or lower, most preferably −50° C. or lower.

A value of a weight-average molecular weight $M_w$ of the ethylene/propylene copolymer composition of the present invention is preferably not less than 10,000 to not more than 1,000,000, more preferably not less than 50,000 to not more than 500,000, further more preferably not less than 50,000 to not more than 300,000, most preferably not less than 100,000 to not more than 200,000.

A value of a molecular weight distribution $M_w/M_n$ of the ethylene/propylene copolymer composition of the present invention is preferably not less than 1.7 to not more than 15.0, more preferably not less than 2.0 to not more than 15.0, further more preferably not less than 2.5 to not more than 15.0, still more preferably not less than 3.0 to not more than 15.0, most preferably not less than 3.5 to not more than 15.0. Note that $M_n$ represents a number average molecular weight of the ethylene/propylene copolymer composition of the present invention.

A value of a melting point $T_m$ of the ethylene/propylene copolymer composition of the present invention is preferably 135° C. or higher, more preferably 140° C. or higher, further more preferably 145° C. or higher, still more preferably 150° C. or higher, most preferably 155° C. or higher.

A value of a glass transition point $T_g$ of the ethylene/propylene copolymer composition of the present invention is preferably −30° C. or lower, more preferably 35° C. or lower, further more preferably −40° C. or lower, still more preferably −45° C. or lower, most preferably −50° C. or lower.

A preferable mode of the ethylene/propylene copolymer composition of the present invention satisfies all of the following requirements (1) through (5):

(1) $EP_{CXIS} \geq 3.0$ wt %;
(2) $\Delta EP \leq 20\%$;
(3) $15.0 \geq M_w/M_n \geq 1.7$;
(4) ($T_m$ assigned to a PP segment)$\geq 135°$ C.; and
(5) ($T_g$ assigned to an EP segment)$\leq -30°$ C.

A more preferable mode of the ethylene/propylene copolymer composition of the present invention is one in which $T_g$ assigned to an EP segment in a CXIS component after CXIS/CXS solvent fractionation is observed.

A still more preferable mode of the ethylene/propylene copolymer composition of the present invention is one which satisfies ($T_g$ assigned to an EP segment in a CXIS component after CXIS/CXS solvent fractionation)≤−30° C.

EXAMPLES

The present invention is described below with Examples and Comparative Examples, but is not limited to these Examples.

(1) Synthesis of Transition Metal Compound (A)

Reference Example 1

Synthesis of trans-1,2-bis(5-tert-butyl-3-cumyl-2-hydroxybenzylsulfanyl)cyclooctane (i) Synthesis of 4-tert-butyl-2-cumylphenol In a 200-mL two-neck flask in which air had been replaced by nitrogen, 12.7 g (84.6 mmol) of 4-tert-butylphenol, 5.5 mL (42 mmol) of α-methyl styrene, and 100 mL of cyclohexane were added, and heated to a temperature of 50° C. To a resultant mixture, 73 mg (0.42 mmol) of p-toluenesulfonic acid was added, and stirred for 4 hours. A reaction solution thus obtained was cooled to room temperature. Then, to the reaction solution, water and dichloromethane were added. After an organic layer was dried over anhydrous magnesium sulfate, a volatile component was distilled off under reduced pressure. Colorless oil thus obtained was purified by silica-gel column chromatography (with a developing solvent consisting of dichloromethane and heptane in a ratio of 1:3). As a result, 8.06 g (yield: 71%) of 4-tert-butyl-2-cumylphenol was obtained as colorless oil.

$^1$H-NMR (400 MHz, δ, ppm, CDCl$_3$)
1.35 (s, 9H), 1.69 (s, 6H), 4.17 (s, 1H), 6.68 (d, J=8 Hz, 1H), 7.19 (dd, J=2 Hz, 8 Hz, 1H), 7.2-7.3 (5H), 7.48 (d, J=2 Hz, 1H).
$^{13}$C{$^1$H}-NMR (100.4 MHz, δ, ppm, CDCl$_3$)
29.6, 31.6, 34.3, 41.8, 117.1, 123.1, 124.7, 126.0, 126.9, 129.1, 134.5, 143.1, 148.5, 151.4

(ii) Synthesis of 4-tert-butyl-6-cumyl-2-hydroxymethylphenol

In a 200-mL two-neck flask in which air had been replaced by nitrogen, 7.25 g (23.3 mmol, purity 86.3%) of 4-tert-butyl-2-cumylphenol, 4.44 g (46.6 mmol) of magnesium chloride, 3.50 g (117 mmol) of paraformaldehyde, and 145 mL of tetrahydrofuran were added. To a resultant mixture, 6.5 mL (47 mmol) of triethylamine was added, and heated to reflux for 3 hours. After a reaction solution thus obtained was cooled to room temperature, an insoluble component was filtered out. A volatile component was distilled off from a resultant filtrate under reduced pressure, and then ethyl acetate and water were added to a residue thus obtained. An organic layer was washed with 1 M HCl, a saturated sodium bicarbonate solution, and saturated saline in this order, and was dried over anhydrous magnesium sulfate. A solvent was distilled off under reduced pressure. As a result, 8.05 g of a mixture containing 5-tert-butyl-3-cumylsalicylaldehyde (purity 79.9%, yield: 93%) was obtained.

$^1$H-NMR (400 MHz, δ, ppm, CDCl$_3$)
1.42 (s, 9H), 1.74 (s, 6H), 7.1-7.4 (5H), 7.39 (d, J=2 Hz, 1H), 7.74 (d, J=2 Hz, 1H), 9.81 (s, 1H), 11.2 (s, 1H)

In a 100-mL flask in which air had been replaced by nitrogen, 8.05 g of the above mixture, 40 mL of tetrahydrofuran, and 40 mL of methanol were added, and ice-chilled. To a resultant solution, 340 mg (8.97 mmol) of sodium boron hydride was slowly added. The solution was heated to room temperature and then was stirred for 7 hours. A volatile component was distilled off from a resultant reaction solution under reduced pressure, and then water and ethyl acetate were added. An organic layer was washed with 1 M HCl, a saturated sodium bicarbonate solution, and saturated saline in this order, and was dried over anhydrous magnesium sulfate. Colorless oil thus obtained was purified by silica-gel column chromatography (with a developing solvent consisting of ethyl acetate and hexane in a ratio ranging from 1:15 to 1:5). As a result, 4.88 g (yield: 75%) of 4-tert-butyl-6-cumyl-2-hydroxymethylphenol was obtained as colorless oil.

$^1$H-NMR (400 MHz, δ, ppm, CDCl$_3$)
1.34 (s, 9H), 1.70 (s, 6H), 2.16 (t, J=6 Hz, 1H), 4.65 (d, J=6 Hz, 2H), 5.56 (s, 1H), 7.09 (d, J=2 Hz, 1H), 7.2-7.4 (5H), 7.45 (d, J=2 Hz, 1H).

(iii) Synthesis of 5-tert-butyl-3-cumyl-2-hydroxybenzyl bromide

In a 50-mL Schlenk flask, 4.88 g (16.4 mmol) of 4-tert-butyl-6-cumyl-2-hydroxymethyphenol and 24 mL of dichloromethane were added. To a resultant mixture, 8.2 mL (8.2 mmol) of phosphorus tribromide (1.0 M dichloromethane solution) was added, and stirred at room temperature for 1.5 hours. A reaction solution thus obtained was mixed with water. An organic layer was washed with water twice, and further washed with saturated saline. After the organic layer was dried over anhydrous magnesium sulfate, a volatile component was distilled off under reduced pressure. As a result, 5.76 g (yield: 98%) of 5-tert-butyl-3-cumyl-2-hydroxybenzyl bromide was obtained as colorless oil.

$^1$H-NMR (400 MHz, δ, ppm, CDCl$_3$)
1.35 (s, 9H), 1.69 (s, 6H), 4.47 (s, 2H), 7.24 (d, J=2 Hz, 1H), 7.2-7.4 (5H), 7.48 (d, J=2 Hz, 1H).

(iv) Synthesis of trans-1,2-bis(5-tert-butyl-3-cumyl-2-hydroxybenzylsulfanyl)cyclooctane In a 100-mL two-neck flask in which air had been replaced by nitrogen, 2.85 g (7.89 mmol) of 5-tert-butyl-3-cumyl-2-hydroxybenzyl, 7.6 mL (3.8 mmol) of trans-cyclooctane-1,2-dithiol (0.5 M tetrahydrofuran solution), and 21 mL of tetrahydrofuran were added, and ice-chilled. To a resultant solution, 1.1 mL (7.9 mmol) of triethylamine was added, stirred for 1 hour at a temperature of 0° C., and then stirred for 2 hours at room temperature. A volatile component was distilled off from a resultant reaction solution under reduced pressure, and then ethyl acetate and an aqueous solution of ammonium chloride were added. An organic layer was washed with water and saturated saline in this order, and then was dried over anhydrous magnesium sulfate. After a solvent was distilled off under reduced pressure, a residue was purified by silica-gel column chromatography (with a developing solvent consisting of dichloromethane and hexane in a ratio of 1:1). As a result, 2.26 g of 2:1 mixture of trans-1,2-bis(5-tert-butyl-3-cumyl-2-hydroxybenzylsulfanyl)cyclooctane and trans-1-(5-tert-butyl-3-cumyl-2-hydroxybenzylsulfanyl)-2-sulfanylcyclooctane was obtained. The mixture was dissolved in 4 mL of tetrahydrofuran, and then 0.42 g (1.2 mmol) of 5-tert-butyl-3-cumyl-2-hydroxybenzyl bromide and 0.2 mL (1.4 mmol) of triethylamine were added at room temperature. After 2 hours of stirring, a volatile component was distilled off under reduced pressure. To a reaction mixture thus obtained, ethyl acetate and an aqueous solution of ammonium chloride were added. The organic layer was further washed with water and saturated saline in this order. After the organic layer was dried over anhydrous magnesium sulfate, a solvent was distilled off under reduced pressure. Oil thus obtained was purified by silica-gel column chromatography (with a developing solvent consisting of dichloromethane and hexane in a ratio of 1:1). As a result, 2.30 g (yield: 89%) of trans-1,2-bis(5-tert-butyl-3-cumyl-2-hydroxybenzylsulfanyl)cyclooctane was obtained as a white solid.

$^1$H-NMR (400 MHz, δ, ppm, CDCl$_3$)

1.35 (s, 18H), 1.68 (s, 6H), 1.69 (s, 6H), 1.13-1.79 (m, 12H), 2.55 (m, 2H), 3.64 (d, J=14 Hz, 2H), 3.68 (d, J=14 Hz, 2H), 5.77 (s, 2H), 7.03 (d, J=2 Hz, 2H), 7.13-7.26 (10H), 7.39 (d, J=2 Hz, 2H).

$^{13}$C{$_1$H}-NMR (100.4 MHz, δ, ppm, CDCl$_3$)

25.8, 25.9, 29.4, 30.0, 31.0, 31.6, 34.0, 34.3, 42.1, 49.9, 123.1, 123.4, 125.67, 125.74, 126.0, 128.2, 136.1, 142.1, 150.2, 150.8.

Reference Example 2

Synthesis of [Cyclooctanediyl-trans-1,2-bis(5-tert-butyl-3-cumyl-2-oxoylbenzylsulfanyl)]dibenzylhafnium (Transition Metal Compound (A-1))

In a glove box under nitrogen atmosphere, to a toluene (5 mL) solution of 200 mg (0.27 mmol) of trans-1,2-bis(5-tert-butyl-3-cumyl-2-hydroxybenzylsulfanyl)cyclooctane, a toluene (5 mL) solution of 147 mg (0.27 mmol) of tetrabenzylhafnium was dropped in a 50-mL Schlenk tube at room temperature. An hour later, a reaction solution thus obtained was filtered, and then a volatile component was distilled off from a resultant filtrate under reduced pressure. A residue thus obtained was washed with pentane, and dried under reduced pressure. As a result, 215 mg (yield: 72%) of [cyclooctanediyl-trans-1,2-bis(5-tert-butyl-3-cumyl-2-oxoylbenzylsulfanyl)]dibenzylhafnium was obtained as white powder.

$^1$H-NMR (400 MHz, δ, ppm, toluene-d$_8$)

0.86-1.4 (m, 12H), 1.20 (s, 18H), 1.44 (d, J=12 Hz, 2H), 1.85 (d, J=12 Hz, 2H), 1.92 (s, 6H), 1.94 (s, 6H), 2.21 (m, 2H), 3.04 (d, J=14 Hz, 2H), 3.13 (d, J=14 Hz, 2H), 6.62 (d, J=8 Hz, 2H), 6.74 (t, J=8 Hz, 2H), 6.89 (d, J=8 Hz, 4H), 7.05-7.16 (4H), 7.25 (t, J=8 Hz, 4H), 7.40 (d, J=8 Hz, 4H), 7.52 (d, J=2 Hz, 2H).

Reference Example 3

Synthesis of trans-1,2-bis[3-(1-adamantyl)-5-methyl-2-hydroxybenzylsulfanyl]cyclooctane (i) Synthesis of
6-(1-adamantyl)-2-hydroxymethyl-p-cresol In a 1-L four-neck flask in which air had been replaced by nitrogen, 20.9 g (86.1 mmol) of 2-(1-adamantyl)-p-cresol, 16.4 g (172 mmol) of magnesium chloride, 13.0 g (433 mmol) of paraformaldehyde, and 400 mL of tetrahydrofuran were added. To a resultant mixture, 24 mL (172 mmol) of triethylamine was added, and heated to reflux for 2.5 hours. After a reaction solution thus obtained was cooled to room temperature, an insoluble component was filtered out. A volatile component was distilled off from a resultant filtrate under reduced pressure. Then, to a residue thus obtained, ethyl acetate was added, and washed with 1M HCl and saturated saline in this order. After an organic layer was dried over anhydrous magnesium sulfate, a solvent was distilled off under reduced pressure. As a result, 19.2 g of a mixture containing 2-(1-adamantyl)-5-methylsalicylaldehyde was obtained.

$^1$H-NMR (400 MHz, δ, ppm, CDCl$_3$)

1.78-2.25 (15H), 2.32 (s, 3H), 6.98 (d, J=2 Hz, 1H), 7.27 (d, J=2 Hz, 1H), 9.82 (s, 1H), 11.64 (s, 1H).

In a 500-mL four-neck flask in which air had been replaced by nitrogen, 19.2 g of the above mixture, 135 mL of tetrahydrofuran, and 80 mL of methanol were added, and ice-chilled. To a resultant solution, 1.60 g (42.5 mmol) of sodium borohydride was slowly added, heated to room temperature, and then stirred for 14.5 hours. A volatile component was distilled off under reduced pressure. Then, to a residue thus obtained, ethyl acetate was added, and was washed with 1 M HCl and saturated saline in this order. After the organic layer was dried over anhydrous magnesium sulfate, a solvent was distilled off under reduced pressure. A residue thus obtained was purified by silica-gel column chromatography (with a developing solvent consisting of chloroform and hexane in a ratio ranging from 1:3 to 1:0). As a result, 8.80 g (yield: 38%) of 6-(1-adamantyl)-2-hydroxymethyl-p-cresol was obtained as a white solid.

$^1$H-NMR (400 MHz, δ, ppm, CDCl$_3$)

1.78 (m, 6H), 2.01 (br, 1H), 2.07 (m, 3H), 2.15 (m, 6H), 2.25 (s, 3H), 4.81 (d, J=4 Hz, 2H), 6.70 (d, J=2 Hz, 1H), 6.99 (d, J=2 Hz, 1H), 7.50 (s, 1H).

(ii) Synthesis of
3-(1-adamantyl)-5-methyl-2-hydroxybenzyl
Bromide

In a 200-mL four-neck flask in which air had been replaced by nitrogen, 8.80 g (32.3 mmol) of 6-(1-adamantyl)-2-hydroxymethyl-p-cresol and 132 mL of dichloromethane were added. To a resultant mixture, 15 mL (18.5 mmol) of phosphorus tribromide (1.23 M dichloromethane solution) was added, and stirred for 3.5 hours at room temperature. To a reaction solution thus obtained, iced water was added. An organic layer was washed with water and saturated saline. After the organic layer was dried over anhydrous magnesium sulfate, a volatile component was distilled off under reduced pressure. As a result, 11.1 g (crude yield: 103%) of 3-(1-adamantyl)-5-methyl-2-hydroxybenzyl was obtained as a slightly yellow solid.

$^1$H-NMR (400 MHz, δ, ppm, CDCl$_3$)

1.78 (m, 6H), 2.09 (m, 3H), 2.12 (m, 6H), 2.26 (s, 3H), 4.54 (s, 2H), 6.92 (d, J=2H, 1H), 7.04 (d, J=2 Hz, 1H).

(iii) Synthesis of trans-1,2-bis[3-(1-adamantyl)-5-methyl-2-hydroxybenzylsulfanyl]cyclooctane In a 200-mL four-neck flask in which air had been replaced by nitrogen, 7.04 g (21.0 mmol) of 3-(1-adamantyl)-5-methyl-2-hydroxybenzyl bromide, 1.83 g (10.4 mmol) of trans-cyclooctane-1,2-dithiol, and 100 mL of tetrahydrofuran were added. To a resultant mixture, 4.3 mL (31 mmol) of triethylamine was added, and stirred for 21.5 hours at room temperature. A reaction solution thus obtained was filtered, and a volatile component was distilled off from a resultant filtrate under reduced pressure. To a residue thus obtained, ethyl acetate and an aqueous solution of ammonium chloride were added. An organic layer was washed with an aqueous solution of ammonium chloride and saturated saline, and then was dried over anhydrous magnesium sulfate. After a solvent was distilled off under reduced pressure, a residue was purified by silica-gel column chromatography (with a developing solvent consisting of ethyl acetate and hexane in a ratio of 20:1). As a result, 6.61 g of 6:1 mixture of trans-1,2-bis[3-(1-adamantyl)-5-methyl-2-hydroxybenzylsulfanyl]cyclooctane and trans-1-[3-(1-adamantyl)-5-methyl-2-hydroxybenzylsulfanyl]-2-sulfanylcyclooctane was obtained. In 100 mL of tetrahydrofuran, the above mixture and 1.36 g (3.98 mmol) of 3-(1-adamantyl)-5-methyl-2-hydroxybenzyl bromide were dissolved, and ice-chilled. To a resultant solution, 0.74 mL (5.31 mmol) of triethylamine was added, and stirred for 15.5 hours. A reaction solution thus obtained was filtered, and a volatile component was distilled off from a resultant filtrate under reduced pressure. To a residue thus obtained, ethyl acetate and an aqueous solution of ammonium chloride were added. The organic layer was further washed with an aqueous solution of ammonium chloride and saturated saline in this order. After the organic layer was dried over anhydrous magnesium sulfate, a solvent was distilled off under reduced pressure. A residue thus obtained was purified by silica-gel column chromatography (with a developing solvent consisting of ethyl acetate and hexane in a ratio of 20:1), and a solid thus obtained was further repulp-washed with hexane at room temperature. As a result, 6.08 g (yield: 85%) of trans-1,2-bis[3-(1-adamantyl)-5-methyl-2-hydroxybenzylsulfanyl]cyclooctane was obtained as a white solid.

$^1$H-NMR (400 MHz, δ, ppm, CDCl$_3$)
1.2-2.0 (m, 12H), 1.77 (m, 12H), 2.05 (m, 6H), 2.13 (12H), 2.24 (s, 6H), 2.67 (m, 2H), 3.73 (d, J=13 Hz, 2H), 3.82 (d, J=13 Hz, 2H), 6.71 (d, J=2 Hz, 2H), 6.83 (s, 2H), 6.97 (d, J=2 Hz, 2H).

Reference Example 4

Synthesis of {Cyclooctanediyl-trans-1,2-bis[(3-(1-adamantyl)-5-methyl-2-oxoylbenzylsulfanyl]}dibenzylzirconium (Transition Metal Compound (A-2))

In a glove box under nitrogen atmosphere, to a toluene (6 mL) solution of 200 mg (0.29 mmol) of trans-1,2-bis[3-(1-adamantyl)-5-methyl-2-hydroxybenzylsulfanyl]cyclooctane, a toluene (6 mL) solution of 133 mg (0.29 mmol) of tetrabenzylzirconium was dropped in a 50-mL Schlenk tube at room temperature. 1.5 hours later, a reaction solution thus obtained was filtered, and a volatile component was distilled off from a resultant filtrate under reduced pressure. A residue thus obtained was washed with pentane, and dried under reduced pressure. As a result, 238 mg (yield: 85%) of {cyclooctanediyl-trans-1,2-bis[3-(1-adamantyl)-5-methyl-2-oxoylbenzylsulfanyl]}dibenzylzirconium was obtained as yellow powder.

$^1$H-NMR (400 MHz, δ, ppm, toluene-d$_8$)
0.7-1.4 (m, 12H), 1.85 (m, 6H), 2.1-2.2 (16H), 2.17 (s, 6H), 2.42 (m, 12H), 2.75 (d, J=10 Hz, 2H), 3.12 (d, J=14 Hz, 2H), 3.65 (d, J=14 Hz, 2H), 6.27 (d, J=2 Hz, 2H), 6.87 (t, J=6 Hz, 2H), 7.1-7.2 (10H).

Reference Example 5

Synthesis of {Cyclooctanediyl-trans-1,2-bis[(3-(1-adamantyl)-5-methyl-2-oxoylbenzylsulfanyl]}dibenzylhafnium (Transition Metal Compound (A-3))

In a glove box under nitrogen atmosphere, to a toluene (6 mL) solution of 200 mg (0.29 mmol) of trans-1,2-bis(3-(1-adamantyl)-5-methyl-2-hydroxybenzylsulfanyl)cyclooctane, a toluene (6 mL) solution of 159 mg (0.29 mmol) of tetrabenzylhafnium was dropped in a 50-mL Schlenk tube at room temperature. 1.5 hours later, a reaction solution thus obtained was filtered, and a volatile component was distilled off from a resultant filtrate under reduced pressure. A residue thus obtained was washed with pentane, and dried under reduced pressure. As a result, 249 mg (yield: 82%) of {cyclooctanediyl-trans-1,2-bis[3-(1-adamantyl)-5-methyl-2-oxoylbenzylsulfanyl]}dibenzylhafnium was obtained as white powder.

$^1$H-NMR (400 MHz, δ, ppm, toluene-d$_8$)
0.6-1.4 (m, 12H), 1.84 (m, 6H), 2.1-2.2 (16H), 2.17 (s, 6H), 2.41 (m, 12H), 2.66 (d, J=12 Hz, 2H), 2.83 (d, J=12 Hz, 2H), 3.11 (d, J=14 Hz, 2H), 3.51 (d, J=14 Hz, 2H), 6.27 (s, 2H), 6.78 (t, J=7 Hz, 2H), 7.1-7.2 (10H).

Reference Example 6

Synthesis of trans-1,2-bis[5-tert-butyl-3-(3,5-dimethyl-1-adamantyl)-2-hydroxybenzylsulfanyl]cyclooctane (i) Synthesis of 4-tert-butyl-2-(3,5-dimethyl-1-adamantyl)phenol In a 50-mL Schlenk flask in which air had been replaced by nitrogen, 3.3 g (22 mmol) of 4-tert-butylphenol, 4.0 g (22 mmol) of 3,5-dimethyl-1-adamantanol, and 20 mL of dichloromethane were added, and cooled to a temperature of 0° C. in an ice bath. To a resultant mixture, 1.2 mL (22 mmol) of sulfuric acid was added, and stirred for 1 hour at room temperature. A reaction solution thus obtained was poured into a sodium hydrogen carbonate solution. After an organic layer was dried over anhydrous magnesium sulfate, a solvent was distilled off under reduced pressure. A white solid thus obtained was purified by silica-gel column chromatography (with a developing solvent consisting of ethyl acetate and hexane in a ratio of 1:10). As a result, 4.0 g (yield: 59%) of 4-tert-butyl-2-(3,5-dimethyl-1-adamantyl)phenol was obtained as a white solid.

$^1$H-NMR (400 MHz, δ, ppm, CDCl$_3$)
0.874 (s, 6H), 1.20 (s, 2H), 1.29 (s, 9H), 1.35-1.45 (m, 4H), 1.70-1.78 (m, 4H), 1.95 (m, 2H), 2.17 (m, 1H), 4.56 (s, 1H), 6.56 (d, J=8 Hz, 1H), 7.06 (dd, J=2 Hz, 8 Hz, 1H), 7.2-7.3 (5H), 7.24 (d, J=2 Hz, 1H).

(ii) Synthesis of 4-tert-butyl-6-(3,5-dimethyl-1-adamantyl)-2-hydroxymethylphenol In a 100-mL two-neck flask in which air had been replaced by nitrogen, 4.0 g (13 mmol) of 4-tert-butyl-2-(3,5-dimethyl-1-adamantyl)phenol, 4.8 g (50 mmol) of magnesium chloride, 2.1 g (70 mmol) of paraformaldehyde, and 50 mL of tetrahydrofuran were added. To a resultant mixture, 6.7 mL (48 mmol) of triethylamine was added, and heated to reflux for 3 hours. After a reaction solution thus obtained was cooled to room temperature, an insoluble component was filtered out. After a volatile component was distilled off from a resultant filtrate under reduced pressure, a residue thus obtained was mixed with ethyl acetate and water. An organic layer was washed with 1 M HCl, a saturated sodium bicarbonate solution, and saturated saline in this order, and was dried over anhydrous magnesium sulfate. A solvent was distilled off under reduced pressure. As a result, 4.2 g (yield: 96%) of mixture containing 5-tert-butyl-3-(3,5-dimethyl-1-adamantyl)salicylaldehyde was obtained.

$^1$H-NMR (400 MHz, δ, ppm, CDCl$_3$)
0.874 (s, 614), 1.2-2.2 (m, 22H), 7.32 (d, J=2 Hz, 1H), 7.53 (d, J=2 Hz, 1H), 9.85 (s, 1H), 11.7 (s, 1H).

In a 100-mL flask in which air had been replaced by nitrogen, 4.2 g of the above mixture, 20 mL of tetrahydrofuran, and 20 mL of methanol were added, and ice-chilled. To a resultant mixture, 490 mg (13 mmol) of sodium borohydride was slowly added, heated to room temperature, and then stirred for 1 hour. After a volatile component was distilled off from a resultant reaction solution under reduced pressure, the reaction solution was mixed with water and ethyl acetate. The organic layer was washed with 1 M HCl, a saturated sodium bicarbonate solution, and saturated saline in this order, and was dried over anhydrous magnesium sulfate. After a solvent was distilled off under reduced pressure, colorless oil thus obtained was purified by silica-gel column chromatography (with a developing solvent consisting of ethyl acetate and hexane in a ratio ranging from 1:10 to 1:5). As a result, 3.4 g (yield: 81%) of 4-tert-butyl-6-(3,5-dimethyl-1-adamantyl)-2-hydroxymethylphenol was obtained as a white solid.

$^1$H-NMR (400 MHz, δ, ppm, CDCl$_3$)

0.875 (s, 6H), 1.2 to 2.2 (m, 23H), 4.85 (d, J=5 Hz, 2H), 6.88 (d, J=2 Hz, 1H), 7.22 (d, J=2 Hz, 1H), 7.55 (s, 1H).

(iii) Synthesis of 5-tert-butyl-3-(3,5-dimethyl-1-adamantyl)-2-hydroxybenzyl bromide In a 200-mL flask in which air had been replaced by nitrogen, 3.4 g (9.9 mmol) of 4-tert-butyl-6-(3,5-dimethyl-1-adamantyl)-2-hydroxymethylphenol and 20 mL of dichloromethane were added. To a resultant mixture, 6.6 mL (6.6 mmol) of phosphorus tribromide (1.0 M dichloromethane solution) was added, and stirred for 1 hour at room temperature. A reaction solution thus obtained was mixed with water, and an organic layer was washed with water twice and further with saturated saline. After the organic layer was dried over anhydrous magnesium sulfate, a volatile component was distilled off under reduced pressure. As a result, 3.95 g (yield: 98%) of 5-tert-butyl-3-(3,5-dimethyl-1-adamantyl)-2-hydroxybenzyl bromide was obtained as a white solid.

$^1$H-NMR (400 MHz, δ, ppm, CDCl$_3$)

0.882 (s, 6H), 1.22 (s, 2H), 1.28 (s, 9H), 1.35 to 1.45 (m, 4H), 1.70-1.78 (m, 4H), 1.96 (m, 2H), 2.19 (m, 1H), 4.57 (s, 1H), 7.08 (d, J=2 Hz, 1H), 7.27 (d, J=2 Hz, 1H).

(iv) Synthesis of trans-1,2-bis[5-tert-butyl-3-(3,5-dimethyl-1-adamantyl)-2-hydroxybenzylsulfanyl]cyclooctane In a 50-mL Schlenk flask in which air had been replaced by nitrogen, 1.0 g (2.5 mmol) of 5-tert-butyl-3-(3,5-dimethyl-1-adamantyl)-2-hydroxybenzyl bromide, 0.18 g (1.0 mmol) of trans-cyclooctane-1,2-dithiol, and 7 mL of tetrahydrofuran were added, and ice-chilled. To a resultant mixture, 0.7 mL of triethylamine (5.0 mmol) was added, stirred for 1 hour at a temperature of 0° C., and then stirred for 2 hours at room temperature. To the mixture, 0.05 g (0.013 mmol) of 5-tert-butyl-3-(3,5-dimethyl-1-adamantyl)-2-hydroxybenzyl bromide was further added, and stirred for 1 hour at room temperature. After a volatile component was distilled off from a resultant reaction solution under reduced pressure, the reaction solution was mixed with ethyl acetate and an aqueous solution of ammonium chloride. The organic layer was washed with water and saturated saline in this order, and then was dried over anhydrous magnesium sulfate. After a solvent was distilled off under reduced pressure, a residue was purified by silica-gel column chromatography (with a developing solvent consisting of ethyl acetate and hexane in a ratio of 1:10). As a result, 1.0 g (yield: >99%) of trans-1,2-bis[5-tert-butyl-3-(3,5-dimethyl-1-adamantyl)-2-hydroxybenzylsulfanyl]cyclooctane was obtained as a white solid.

$^1$H-NMR (400 MHz, δ, ppm, CDCl$_3$)

0.88 (s, 12H), 1.2-2.2 (m, 56H), 2.59 (m, 2H), 3.77 (d, J=14 Hz, 2H), 3.87 (d, J=14 Hz, 2H), 6.89 (d, J=2 Hz, 2H), 7.19 (d, J=2 Hz, 2H).

Reference Example 7

Synthesis of {Cyclooctanediyl-trans-1,2-bis[5-tert-butyl-3-(3,5-dimethyl-1-adamantyl)-2-oxoylbenzylsulfanyl]}dichlorohafnium (Transition Metal Compound (A-4))

In a glove box under nitrogen atmosphere, to a toluene (1 mL) solution of 83 mg (0.10 mmol) of trans-1,2-bis[5-tert-butyl-3-(3,5-dimethyl-1-adamantyl)-2-hydroxybenzylsulfanyl]cyclooctane, a toluene (1 mL) solution of 51 mg (0.10 mmol) of dichloro{1,1'-oxybis[ethane][bis(phenylmethyl)hafnium]} was dropped in a 50-mL Schlenk tube at room temperature. 1.5 hours later, a volatile component was distilled off under reduced pressure. A residue thus obtained was washed with pentane, and dried under reduced pressure. As a result, 55 mg (yield: 51%) of {cyclooctanediyl-trans-1,2-bis[5-tert-butyl-3-(3,5-dimethyl-1-adamantyl)-2-oxoylbenzylsulfanyl]}dichlorohafnium was obtained as white powder.

$^1$H-NMR (400 MHz, δ, ppm, CDCl$_3$)

0.901 (s, 12H), 1.0-2.4 (m, 56H), 2.58 (brs, 2H), 3.88 (d, J=14 Hz, 2H), 4.54 (d, J=14 Hz, 2H), 6.85 (d, J=2 Hz, 2H), 7.37 (d, J=2 Hz, 2H).

Reference Example 8

Synthesis of trans-1,2-bis[2-hydroxy-3-triisopropylsilyl-5-methylbenzylsulfanyl]cyclooctane (i) Synthesis of 3-triisopropylsilyl-5-methyl-2-hydroxybenzylalcohol In 20 mL of diethyl ether, 1.38 g (4.71 mmol) of 2-hydroxy-5-methyl-3-triisopropylsilylbenzaldehyde (known as described in a document) was dissolved, and cooled to a temperature of 0° C. To a resultant solution, 232.3 mg (6.12 mmol) of lithium aluminum hydride was added, and stirred for 21 hours at a temperature of 0° C. To the solution, dilute hydrochloric acid and diethyl ether were added. Then, an ether layer was washed with water and dried over anhydrous sodium sulfate. After that, a solvent was distilled off under reduced pressure. As a result, a title compound (1.41 g, containing a small amount of a solvent) was quantitatively obtained as colorless crystal.

$^1$H NMR (500 MHz, δ, ppm, CDCl$_3$)

1.09 (d, J=8 Hz, 18H), 1.50 (sept, J=8 Hz, 3H), 2.02 (br s, 1H), 2.26 (s, 3H), 4.81 (d, J=5 Hz, 1H), 6.84 (d, J=2 Hz, 1H), 7.14 (d, J=2 Hz, 1H), 7.34 (s, 1H).

$^{13}$C NMR (125.7 MHz, δ, ppm, CDCl$_3$)

11.9, 19.1, 20.8, 65.5, 122.3, 123.4, 128.2, 129.7, 137.6, 159.7.

(ii) Synthesis of trans-1,2-bis(2-hydroxy-3-triisopropylsilyl-5-methylbenzylsulfanyl)cyclooctane Under argon atmosphere, in 10 mL of tetrahydrofuran, 1.01 g (3.42 mmol) of 3-triisopropylsilyl-5-methyl-2-hydroxybenzylalcohol was dissolved, and cooled to a temperature of 0° C. To a resultant solution, 0.8 mL (5.74 mmol) of triethylamine was added, and then 0.26 mL (3.35 mmol) of methanesulfonyl chloride was added. Then, the solution was stirred for 21 hours at a temperature of 25° C. Under argon atmosphere, to the solution, a solution obtained by dissolving 201.7 mg (1.14 mmol) of trans-cyclooctane-1,2-dithiol (known as described in a document) in 10 mL of tetrahydrofuran was transferred via transfer tube, and was stirred for 20 hours under heat-reflux. The resultant solution was mixed with a saturated ammonium chloride aqueous solution and diethyl ether. Then, an ether layer was washed with water, and was dried over anhydrous sodium sulfate. After that, a solvent was distilled off under reduced pressure. A residue thus obtained was purified by silica-gel column chromatography (developing solvent: dichloromethane). As a result, a title compound (1.01 g, slightly containing a solvent) was quantitatively obtained as slightly yellow oil.

$^1$H NMR (500 MHz, δ, ppm, CDCl$_3$)

1.12 (d, J=8 Hz, 36H), 1.16-2.00 (m, 12H), 1.51 (sept, J=Hz, 6H), 2.28 (s, 6H), 2.75 (br s, 2H), 3.77-3.88 (m, 4H), 6.79 (s, 2H), 6.89 (d, J=2 Hz, 2H), 7.16 (d, J=2 Hz, 2H).

$^{13}$C NMR (125.7 MHz, δ, ppm, CDCl$_3$)

11.9, 19.1, 19.2, 20.8, 25.9, 26.1, 31.3, 35.3, 50.3, 121.1, 123.2, 128.8, 132.3, 137.3, 158.8.

Reference Example 9

Synthesis of [Cyclooctanediyl-trans-1,2-bis(2-oxoyl-3-triisopropylsilyl-5-methylbenzylsulfanyl)]dichlorohafnium (Transition Metal Compound (A-5))

In a glove box under nitrogen atmosphere, to a toluene (1 L) solution of 150 mg (0.20 mmol) of trans-1,2-bis(2-hydroxy-3-triisopropylsilyl-5-methylbenzylsulfanyl)cyclooctane, a toluene (1 mL) solution of 100 mg (0.20 mmol) of dichloro{1,1'-oxybis[ethane][bis(phenylmethyl)hafnium]} was dropped in a 50-mL Schlenk tube at room temperature. After 1 hour of stirring, a volatile component was distilled off under reduced pressure. A residue thus obtained was washed with pentane, and was dried under reduced pressure. As a result, 74 mg (yield: 38%) of [cyclooctanediyl-trans-1,2-bis(2-oxoyl-3-triisopropylsilyl-5-methylbenzylsulfanyl)]dichlorohafnium was obtained as white powder.

$^1$H-NMR (400 MHz, δ, ppm, CDCl$_3$)

0.80-2.0 (m, 54H), 2.36 (s, 6H), 2.70 (brs, 2H), 3.80 (d, J=14 Hz, 2H), 4.41 (d, J=14 Hz, 2H), 6.80 (s, 2H), 7.27 (s, 2H).

(2) Synthesis of Transition Metal Compound (a)

Reference Example 10

The transition metal compound (a) shown below, which was used in Comparative Examples, was synthesized by a method disclosed in the Reference: United State Patent Application Publication No. 2006/0205588, specification.

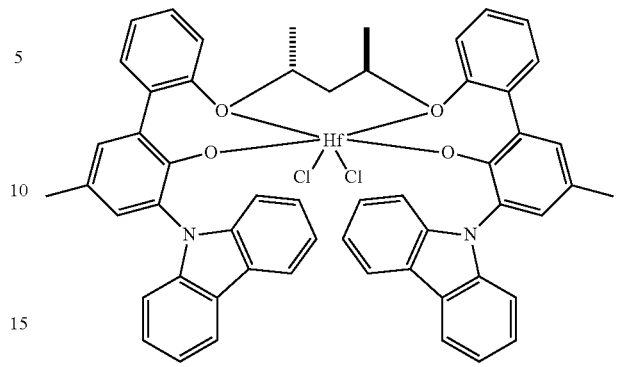

[Chem. 26]

(3) Synthesis of Transition Metal Compound (b)

Reference Example 11

The transition metal compound (b) shown below, which was used in Comparative Examples, was synthesized by a method disclosed in the Reference: United State Patent Application Publication No. 2004/0220050, specification.

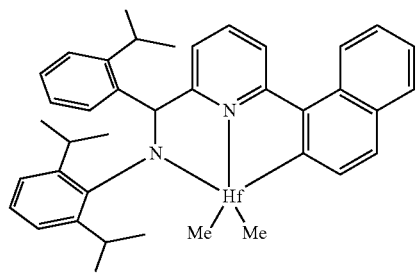

[Chem. 27]

Comparative Example 12

Synthesis of d-MAO

Air in a 200-mL two-neck flask, which contained a stirring bar and to which a three-way cock was attached, was replaced by nitrogen gas, and 100 mL of a PMAO-S toluene solution (aluminum content: 6.1 wt %) manufactured by Tosoh Finechem Corporation was measured off with use of a syringe and was supplied to the flask. This solution was decompressed and a volatile component was removed. A white solid thus obtained was redissolved in 100 mL of dehydrated toluene, and, after that, the volatile component was removed under reduced pressure. This operation was further carried out twice. As a result, 14.1 g of white powder was obtained.

Values of physical properties shown in this example were calculated by the following methods.

(1) Intrinsic Viscosity (η) [Unit: dl/g]

Reduced viscosities at three concentrations of 0.1, 0.2, and 0.5 g/dl were measured under the condition of a tetralin solvent and a temperature of 135° C. with use of a Ubbelohde viscometer. Next, intrinsic viscosity was calculated by an extrapolation method in which the reduced viscosities were plotted with respect to the concentrations and the concentrations were extrapolated to zero in accordance with a calculation method described on page 491 of Reference: "Polymer solution (Polymer science experiment study 11" (published in 1982 by Kyoritsu Shuppan Co., Ltd.).

(2) Average Molecular Weight (Mw, Mn) and Molecular Weight Distribution (Mw/Mn) [Unit: g/mol]

Measurement was carried out by gel permeation chromatography (GPC) under the conditions below. A calibration curve was prepared with use of standard polystyrene.

Model: 150C type manufactured by MILLIPORE-WATERS ASSOCIATES, INC.

Column: two columns of TSK-GEL GMH-HT 7.5×600

Measurement temperature: 140° C., 152° C.

Solvent: Orthodichlorobenzene

Measurement concentration: 5 mg/5 mL (3) Glass Transition Temperature ($T_g$), Crystallization Temperature ($T_a$), Melting Temperature ($T_m$) [Unit: ° C.], and Amount of Heat of Fusion (ΔH) [Unit: J/g]

Measurement was carried out with use of d thermal-analysis equipment, a differential scanning calorimeter (manufactured by TA Instruments Company), by methods below.

| | |
|---|---|
| 1) Isothermal holding | 220° C., 5 minutes |
| 2) Measurement | 220° C. to −90° C. (10° C./min) |
| 3) Measurement | −90° C. to 220° C. (10° C./min) |
| 4) Cooling | 220° C. to −90° C. (10° C./min) |
| 5) Isothermal holding | −90° C., 5 minutes |
| 6) Measurement | −90° C. to 60° C. (2° C./min) |

(modulation amplitude: ±0.16° C., modulation period: 30 sec)

(4) Ethylene content ($C_2'$), EP content [unit: wt %], and ΔEP [unit: %] in polymer Measurement was carried out with use of a nuclear magnetic resonance spectrometer (NMR) by using the result of the $^{13}$C-NMR spectrum of a polymer measured as follows in conformity to a method described in the report (Reference: Macromolecules, 1982, No. 15, pp. 1150-1152) by Kakugo et al. Moreover, the EP content and the ΔEP were calculated by the above-mentioned calculation method.

| | |
|---|---|
| Device | AVANCE600 10 mm cryoprobe manufactured by Bruker Corporation |
| Measurement solvent | Mixed solution of 1,2-dichlorobenzene/1,2-dichlorobenzene-$d_4$ = 75/25 (volume ratio) |
| Measurement temperature | 130° C. |
| Measuring method | Proton decoupling method |
| Pulse width | 45° |
| Pulse repetition time | 4 seconds |
| Chemical-shift value basis | tetramethylsilane |

Example 1

(1) Two-Stage Polymerization of Ethylene/Propylene Copolymerization (Former Stage), and Propylene Homopolymerization (Latter Stage)

Former stage: inside of a 3-L autoclave with a stirrer was sufficiently dried and then was vacuumized. After 800 mL of toluene and 100 g of propylene were added, a temperature was increased to 30° C., and 0.2 MPa (partial pressure) of ethylene was further added. Thereafter, 1.00 mmol of triisobutylaluminum (organometallic compound (C)), 0.20 mmol of diethyl zinc (organometallic compound (C)), 5.00 mL (1.0 mM, 5.0 μmol) of a toluene solution of the transition metal compound (A-1), and 5.00 mL (4.0 mM, 20.0 μmol) of a toluene solution of trityl tetrakis(pentafluorophenyl) borate (activating co-catalyst agent (B)) were added in this order to the autoclave from a pressurization injection machine, and polymerization was performed at 30° C. for 30 minutes. After polymerization reaction, au unreacted monomer was purged. Then, 2.0 MPa of argon was added, and purging was carried out again. This operation was repeated twice.

Latter stage: the inside of the autoclave was cooled to a room temperature while being kept in an argon atmosphere, and 100 g of propylene was added again. Then the temperature was increased to 30° C. Subsequently, 10.00 mL (1.0 mM, 10.0 μmol) of the toluene solution of the transition metal compound (A-1) and 5.00 mL (4.0 mM, 20.0 μmol) of the toluene solution of trityl tetrakis(pentafluorophenyl) borate (activating co-catalyst agent (B)) were added to the autoclave from the pressurization injection machine, and polymerization was performed at 30° C. for 30 minutes. A small amount of ethanol was added to terminate the reaction, and an unreacted monomer was purged. Then, the autoclave was opened, the solvent was distilled off with use of an evaporator, and, after that, sufficient drying was carried out under reduced pressure with use of a vacuum dryer. Thus, 96.8 g of a mass of two-stage polymerization polymer was obtained.

(2) Solvent Fractionation of Two-Stage Polymerization Polymer

To a 1-L eggplant flask, 2.00 g of the two-stage polymerization polymer synthesized in Example 1(1) and 1.00 L of xylene were added, and a reflux condenser was attached, then the mixture was stirred in the oil bath at 140° C. for 3 hours. A homogeneous solution thus obtained was ice-chilled, and then was stirred at a room temperature for 2 hours. Subsequently, a deposit was filtered off and a filtrate was concentrated to solid, and then the deposit and the filtrate were respectively dried under reduced pressure, thereby obtaining 0.70 g of a CXIS component and 1.30 g of a CXS component.

(3) Structure Analysis of Polymers

The two-stage polymerization polymer (Whole), the CXS component (CXS) and the CXIS component (CXIS) of the two-stage polymerization polymer, which were obtained from the Example 1(1) and (2), were analyzed in terms of intrinsic viscosity [η], Mn, Mw, Mw/Mn, Tm, Tc, Tg, ΔH, ethylene content, EP content, and ΔEP. The analysis is shown in Table 1.

TABLE 1

| | | ratio | η (dl/g) | GPC $M_w$ (g/mol) | $M_n$ (g/mol) | $M_w/M_n$ (—) | DSC Tm (° C.) | Tc (° C.) | Tg (° C.) | ΔH (J/g) | NMR $C_2'$ (wt %) | EP (wt %) | ΔEP (%) |
|---|---|---|---|---|---|---|---|---|---|---|---|---|---|
| Example 1 (A-1) | Whole | — | 0.35 | 26,000 | 7,000 | 3.5 | 156.44 | 115.55 | −54.71 | 39.82 | — | — | — |
| | CXS | 65.0 | 0.26 | 15,000 | 5,000 | 2.7 | — | — | — | — | 37.4 | 100.0 | 20 |
| | CXIS | 35.0 | 0.43 | 46,000 | 21,000 | 2.2 | 154.41 | 118.10 | nd | 111.5 | 1.1 | 3.0 | |

Example 2

(1) Two-Stage Polymerization of Ethylene/Propylene Copolymerization (Former Stage), and Propylene Homopolymerization (Latter Stage)

Former stage: inside of a 0.4-L autoclave with a stirrer was sufficiently dried. After 100 mL of toluene and 50 g of propylene were added, a temperature was increased to 50° C., and 0.4 MPa (partial pressure) of ethylene was further added. Thereafter, 0.50 mmol of triisobutylaluminum (organometallic compound (C)), 1.00 mL (0.5 mM, 0.5 μmol) of the toluene solution of a transition metal compound (A-2), and 1.00 mL (4.0 mM, 4.0 μmol) of a toluene solution of trityl tetrakis(pentafluorophenyl)borate (activating co-catalyst agent (B)) were added in this order to the autoclave from a pressurization injection machine, and polymerization was performed at 50° C. for 10 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 50 g of propylene was added again. Then the temperature was increased to 50° C. Subsequently, 2.00 mL (0.5 mM, 1.0 μmol) of the toluene solution of the transition metal compound (A-2) and 1.00 mL (4.0 mM, 4.0 μmol) of the toluene solution of trityl tetrakis(pentafluorophenyl)borate (activating co-catalyst agent (B)) were added in this order to the autoclave from the pressurization injection machine, and polymerization was performed at 50° C. for 15 minutes. A small amount of ethanol was added to terminate the reaction, and an unreacted monomer was purged. Then, the autoclave was opened, and 500 ml of ethanol and 5 ml of a 1N hydrochloric acid aqueous solution were added. The mixture was stirred at a room temperature for 30 minutes, and a polymer thus deposited was suction filtered. After that, the polymer was sufficiently dried under reduced pressure by the vacuum dryer. Thus, 16.0 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 2(1) was herein used. As a result, 0.82 g of the CXIS component and 1.18 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 2(1) and (2), were analyzed in terms of intrinsic viscosity [η], Mn, Mw, Mw/Mn, Tm, Tc, Tg, ΔH, ethylene content, EP content, and ΔEP. The analysis is shown in Table 2.

Example 3

(1) Two-Stage Polymerization of Ethylene/Propylene Copolymerization (Former Stage), and Propylene Homopolymerization (Latter Stage)

This two-stage polymerization was carried out in accordance with the method described in Example 2(1) except that 0.10 mmol of diethyl zinc (organometallic compound (C)) was added immediately after the triisobutylaluminum (organometallic compound (C)) had been added in the former stage. As a result, 15.8 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 3(1) was herein used. As a result, 0.84 g of the CXIS component and 1.16 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 3(1) and (2), were analyzed in terms of intrinsic viscosity [η], Mn, Mw, Mw/Mn, Tm, Tc, Tg, ΔH, ethylene content, EP content, and ΔEP. The analysis is shown in Table 2.

Example 4

(1) Two-Stage Polymerization of Ethylene/Propylene Copolymerization (Former Stage), and Propylene Homopolymerization (Latter Stage)

This two-stage polymerization was carried out in accordance with the method described in Example 2(1) except that 0.50 mmol of diethyl zinc (organometallic compound (C)) was added immediately after the triisobutylaluminum (organometallic compound (C)) had been added in the former stage. As a result, 16.4 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 4(1) was herein used. As a result, 0.69 g of the CXIS component and 1.31 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 4(1) and (2), were analyzed in terms of intrinsic viscosity [η], Mn, Mw, Mw/Mn, Tm, Tc, Tg, ΔH, ethylene content, EP content, and ΔEP. The analysis is shown in Table 2.

TABLE 2

|  |  |  | | GPC | | | | DSC | | | | NMR | |
| --- | --- | --- | --- | --- | --- | --- | --- | --- | --- | --- | --- | --- | --- |
|  |  | ratio | η (dl/g) | $M_w$ (g/mol) | $M_n$ (g/mol) | $M_w/M_n$ (—) | Tm (° C.) | Tc (° C.) | Tg (° C.) | ΔH (J/g) | $C_2'$ (wt %) | EP (wt %) | ΔEP (%) |
| Example 2(A-2) | Whole | — | 0.38 | 28,000 | 7,000 | 4.0 | 152.46 | 111.58 | −53.27 | 42.76 | — | — | — |
|  | CXS | 58.9 | 0.23 | 11,000 | 5,000 | 2.4 | — | — | — | — | 35.1 | 100.0 | 17 |
|  | CXIS | 41.1 | 0.54 | 58,000 | 26,000 | 2.2 | 151.32 | 100.6 | nd | 104.40 | 1.3 | 3.6 |  |
| Example 3 (A-2) | Whole | — | 0.33 | 24,000 | 6,000 | 3.7 | 153.48 | 111.57 | −52.34 | 40.34 | — | — | — |
|  | CXS | 57.8 | 0.20 | 10,000 | 4,000 | 2.3 | — | — | — | — | 34.6 | 100.0 | 15 |
|  | CXIS | 42.2 | 0.41 | 42,000 | 19,000 | 2.2 | 150.20 | 114.91 | nd | 96.76 | 1.7 | 4.8 |  |
| Example 4 (A-2) | Whole | — | 0.23 | 14,000 | 5,000 | 3.0 | 151.40 | 105.13 | −54.75 | 34.63 | — | — | — |
|  | CXS | 65.6 | 0.18 | 8,000 | 3,000 | 2.3 | — | — | — | — | 36.1 | 100.0 | 4 |
|  | CXIS | 34.4 | 0.35 | 26,000 | 13,000 | 2.1 | 154.82 | 115.39 | nd | 103.70 | 3.2 | 8.8 |  |

Example 5

(1) Two-Stage Polymerization of Ethylene/Propylene Copolymerization (Former Stage), and Propylene Homopolymerization (Latter Stage)

This two-stage polymerization was carried out in accordance with the method described in Example 2(1) except that (i) 1.00 mL (5.0 mM, 5.0 μmol) of a toluene solution of the transition metal compound (A-3) was used instead of the transition metal compound (A-2) in the former stage, (ii) 2.00 mL (5.0 mM, 10.0 μmol) of a toluene solution of the transition metal compound (A-3) was used instead of the transition metal compound (A-2) in the latter stage, and (iii) an amount of the toluene solution of trityl tetrakis(pentafluorophenyl)borate (activating co-catalyst agent (B)) was set to 5.00 mL (4.0 mM, 20.0 μmol) in the former and latter stages. As a result, 26.3 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 5(1) was herein used. As a result, 1.34 g of the CXIS component and 0.66 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 5(1) and (2), were analyzed in terms of intrinsic viscosity [η], Mn, Mw, Mw/Mn, Tm, Tc, Tg, ΔH, ethylene content, EP content, and ΔEP. The analysis is shown in Table 3.

Example 6

(1) Two-Stage Polymerization of Ethylene/Propylene Copolymerization (Former Stage), and Propylene Homopolymerization (Latter Stage)

This two-stage polymerization was carried out in accordance with the method described in Example 3(1) except that (i) 1.00 mL (5.0 mM, 5.0 μmol) of a toluene solution of the transition metal compound (A-3) was used instead of the transition metal compound (A-2) in the former stage, (ii) 2.00 mL (5.0 mM, 10.0 μmol) of a toluene solution of a transition metal compound (A-3) was used instead of the transition metal compound (A-2) in the latter stage, and (iii) an amount of the toluene solution of trityl tetrakis(pentafluorophenyl)borate (activating co-catalyst agent (B)) was set to 5.00 mL (4.0 mM, 20.0 μmol) in the former and latter stages. As a result, 25.6 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 6(1) was herein used. As a result, 1.36 g of the CXIS component and 0.64 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 6(1) and (2), were analyzed in terms of intrinsic viscosity [η], Mn, Mw, Mw/Mn, Tm, Tc, Tg, ΔH, ethylene content, EP content, and ΔEP. The analysis is shown in Table 3.

Example 7

(1) Two-Stage Polymerization of Ethylene/Propylene Copolymerization (Former Stage), and Propylene Homopolymerization (Latter Stage)

This two-stage polymerization was carried out in accordance with the method described in Example 4(1) except that (i) 1.00 mL (5.0 mM, 5.0 μmol) of a toluene solution of the transition metal compound (A-3) was used instead of the transition metal compound (A-2) in the former stage, (ii) 2.00 mL (5.0 mM, 10.0 μmol) of a toluene solution of the transition metal compound (A-3) was used instead of the transition metal compound (A-2) in the latter stage, and (iii) an amount of the toluene solution of trityl tetrakis(pentafluorophenyl)borate (activating co-catalyst agent (B)) was set to 5.00 mL (4.0 mM, 20.0 μmol) in the former and latter stages. As a result, 22.4 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 7(1) was herein used. As a result, 1.19 g of the CXIS component and 0.81 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 7(1) and (2), were analyzed in terms of intrinsic viscosity [η], Mn, Mw, Mw/Mn, Tm, Tc, Tg, ΔH, ethylene content, EP content, and ΔEP. The analysis is shown in Table 3.

Example 8

(1) Two-Stage Polymerization of Ethylene/Propylene Copolymerization (Former Stage), and Propylene Homopolymerization (Latter Stage)

Former stage: inside of a 0.4-L autoclave with a stirrer was sufficiently dried. After 100 mL of toluene and 50 g of propylene were added, a temperature was increased to 50° C., and 0.4 MPa (partial pressure) of ethylene was further added. Thereafter, 30.4 mg of d-MAO (activating co-catalyst agent (B)), 0.05 mL of diethyl zinc (organometallic compound (C)), and 2.00 mL (1.0 mM, 2.0 μmol) of a toluene solution of a transition metal compound (A-3) were added in this order to the autoclave from a pressurization injection machine, and polymerization was performed at 50° C. for 60 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 50 g of propylene was added again. Then the temperature was increased to 50° C. Subsequently, 4.00 mL (1.0 mM, 4.0 μmol) of a toluene solution of the transition metal compound (A-3) was added to the autoclave from the pressurization injection machine, and polymerization was performed at 50° C. for 120 minutes. A small amount of ethanol was added to terminate the reaction, and an unreacted monomer was purged. Then, the autoclave was opened, and 500 ml of ethanol and 5 ml of a 1N hydrochloric acid aqueous solution were added. The mixture was stirred at a room temperature for 30 minutes, and a polymer thus deposited was suction filtered. After that, the polymer was sufficiently dried under reduced pressure by the vacuum dryer, and 16.0 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 8(1) was herein used. As a result, 1.40 g of the CXIS component and 0.60 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 8(1) and (2), were analyzed in terms of intrinsic viscosity [η], Mn, Mw, Mw/Mn, Tm, Tc, Tg, ΔH, ethylene content, EP content, and ΔEP. The analysis is shown in Table 3.

TABLE 3

| | | | | GPC | | | DSC | | | | NMR | | |
|---|---|---|---|---|---|---|---|---|---|---|---|---|---|
| | | ratio | η (dl/g) | $M_w$ (g/mol) | $M_n$ (g/mol) | $M_w/M_n$ (—) | Tm (° C.) | Tc (° C.) | Tg (° C.) | ΔH (J/g) | $C_2$ (wt %) | EP (wt %) | ΔEP (%) |
| Example 5(A-3) | Whole | — | 0.63 | 64,000 | 23,000 | 2.8 | 153.98 | 115.70 | −47.90 | 66.08 | — | — | — |
| | CXS | 32.8 | 0.48 | 33,000 | 15,000 | 2.2 | — | — | — | — | 30.2 | 100.0 | 10 |
| | CXIS | 67.2 | 0.72 | 79,000 | 34,000 | 2.3 | 154.54 | 116.11 | nd | 108.1 | 1.9 | 6.4 | |
| Example 6 (A-3) | Whole | — | 0.47 | 47,000 | 15,000 | 3.1 | 157.51 | 113.59 | −49.44 | 71.79 | — | — | — |
| | CXS | 31.8 | 0.34 | 21,000 | 9,000 | 2.2 | — | — | — | — | 30.7 | 100.0 | 5 |
| | CXIS | 68.2 | 0.56 | 62,000 | 26,000 | 2.4 | 149.31 | 117.22 | nd | 102.40 | 2.4 | 7.8 | |
| Example 7 (A-3) | Whole | — | 0.35 | 26,000 | 8,000 | 3.1 | 157.00 | 111.28 | −48.70 | 60.73 | — | — | — |
| | CXS | 40.4 | 0.24 | 14,000 | 5,000 | 2.7 | — | — | — | — | 31.1 | 100.0 | 4 |
| | CXIS | 59.6 | 0.43 | 34,000 | 15,000 | 2.2 | 152.73 | 117.75 | nd | 101.7 | 4.1 | 13.0 | |
| Example 8 (A-3) | Whole | — | 0.47 | 49,000 | 21,000 | 2.4 | 155.14 | 112.79 | −40.45 | 32.36 | — | — | — |
| | CXS | 30.0 | 0.42 | 44,000 | 15,000 | 2.8 | n.d. | n.d. | −43.03 | n.d. | 25.0 | 100 | 16 |
| | CXIS | 70.0 | 0.54 | 61,000 | 27,000 | 2.3 | 153.88 | 120.15 | n.d. | 107.8 | 1.4 | 5.5 | |

Example 9

(1) Two-Stage Polymerization of Ethylene/Propylene Copolymerization (Former Stage), and Propylene Homopolymerization (Latter Stage)

Former stage: inside of a 0.4-L autoclave with a stirrer, air was sufficiently dried. After 100 mL of toluene and 50 g of propylene were added, a temperature was increased to 50° C., and 0.8 MPa (partial pressure) of ethylene was further added. Thereafter, 0.50 mmol of triisobutylaluminum (organometallic compound (C)), 1.00 mL (1.0 mM, 1.0 µmol) of a toluene solution of a transition metal compound (A-4), and 1.00 mL (4.0 mM, 4.0 µmol) of a toluene solution of trityl tetrakis(pentafluorophenyl)borate (activating co-catalyst agent (B)) were added in this order to the autoclave from a pressurization injection machine, and polymerization was performed at 50° C. for 30 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 50 g of propylene was added again. Then the temperature was increased to 50° C. Subsequently, 2.00 mL (1.0 mM, 2.0 µmol) of the toluene solution of the transition metal compound (A-4) was added to the autoclave from the pressurization injection machine, and polymerization was performed at 50° C. for 60 minutes. A small amount of ethanol was added to terminate the reaction, and an unreacted monomer was purged. Then, the autoclave was opened, and 500 ml of ethanol and 5 ml of a 1N hydrochloric acid aqueous solution were added. The mixture was stirred at a room temperature for 30 minutes, and a polymer thus deposited was suction filtered. After that, the polymer was sufficiently dried under reduced pressure by the vacuum dryer, and 20.5 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 9(1) was herein used. As a result, 1.72 g of the CXIS component and 0.28 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 9(1) and (2), were analyzed in terms of intrinsic viscosity [η], Mn, Mw, Mw/Mn, Tm, Tc, Tg, ΔH, ethylene content, EP content, and LAP. The analysis shown in Table 4.

Example 10

(1) Two-Stage Polymerization of Ethylene/Propylene Copolymerization (Former Stage), and Propylene Homopolymerization (Latter Stage)

This two-stage polymerization was carried out in accordance with the method described in Example 9(1) except that (i) an amount of toluene of the solvent was set to 160 ml, (ii) an amount of propylene in the former stage was set to 20 g, and (iii) an amount of triisobutylaluminum (organometallic compound (C)) was set to 0.25 mmol. As a result, 17.8 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 10(1) was herein used. As a result, 1.71 g of the CXIS component and 0.29 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 10(1) and (2), were analyzed in terms of intrinsic viscosity [η], Mn, Mw, Mw/Mn, Tm, Tc, Tg, ΔH, ethylene content, EP content, and ΔEP. The analysis is shown in Table 4.

Example 11

(1) Two-Stage Polymerization of Ethylene/Propylene Copolymerization (Former Stage), and Propylene Homopolymerization (Latter Stage)

This two-stage polymerization was carried out in accordance with the method described in Example 10(1) except that polymerization was carried out for 60 minutes in the former stage. As a result, 24.1 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 11(1) was herein used. As a result, 1.20 g of the CXIS component and 0.80 g of the CXS component were obtained.

(3) Structure Analysis of Polymers

The two-stage polymerization polymer (Whole), the CXS component (CXS) and the CXIS component (CXIS) of two-Stage Polymerization polymer, which were obtained from the Example 11(1) and (2), were analyzed in terms of intrinsic viscosity [η], Mn, Mw, Mw/Mn, Tm, Tc, Tg, ΔH, ethylene content, EP content, and ΔEP. The analysis is shown in Table 4.

Example 12

(1) Two-Stage Polymerization of Ethylene/Propylene Copolymerization (Former Stage), and Propylene Homopolymerization (Latter Stage)

This two-stage polymerization was carried out in accordance with the method described in Example 11(1) except that an amount of the triisobutylaluminum (organometallic compound (C)) in the former stage was set to 0.20 mmol and 0.05 mmol of diethyl zinc (organometallic compound (C)) was added immediately thereafter. As a result, 19.3 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 12(1) was herein used. As a result, 1.06 g of the CXIS component and 0.94 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 12(1) and (2), were analyzed in terms of intrinsic viscosity [η], Mn, Mw, Mw/Mn, Tm, Tc, Tg, ΔH, ethylene content, EP content, and ΔEP. The analysis is shown in Table 4.

Example 13

(1) Two-Stage Polymerization of Ethylene/Propylene Copolymerization (Former Stage), and Propylene Homopolymerization (Latter Stage)

This two-stage polymerization was carried out in accordance with the method described in Example 12(1) except that the partial pressure of ethylene in the former stage was set to 0.4 MPa. As a result, 13.7 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 13(1) was herein used. As a result, 1.03 g of the CXIS component and 0.97 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 13(1) and (2), were analyzed in terms of intrinsic viscosity [η], Mn, Mw, M, Tm, Tc, Tg, ΔH, ethylene content, EP content, and ΔEP. The analysis is shown in Table 4.

Example 14

(1) Two-Stage Polymerization of Ethylene/Propylene Copolymerization (Former Stage), and Propylene Homopolymerization (Latter Stage)

Former stage: inside of a 0.4-L autoclave with a stirrer was sufficiently dried. After 100 mL of toluene and 50 g of propylene were added, a temperature was increased to 50° C., and 0.4 MPa (partial pressure) of ethylene was further added. Thereafter, 30.5 mg of d-MAO (activating co-catalyst agent (B)), 0.01 mL of diethyl zinc (organometallic compound (C)), and 2.00 mL (1.0 mM, 2.0 μmol) of a toluene solution of the transition metal compound (A-4) were added in this order to the autoclave from a pressurization injection machine, and polymerization was performed at 50° C. for 30 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 50 g of propylene was added again. Then the temperature was increased to 50° C. Subsequently, 4.00 mL (1.0 mM, 4.0 μmol) of the toluene solution of the transition metal compound (A-4) was added to the autoclave from the pressurization injection machine, and polymerization was performed at 50° C. for 120 minutes. A small amount of ethanol was added to terminate the reaction, and an unreacted monomer was purged. Then, the autoclave was opened, and 500 ml of ethanol and 5 ml of a 1N hydrochloric acid aqueous solution were added. The mixture was stirred at a room temperature for 30 minutes, and a polymer thus deposited was suction filtered. After that, the polymer was sufficiently dried under reduced pressure by the vacuum dryer, and 10.7 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 14(1) was herein used. As a result, 1.11 g of the CXIS component and 0.89 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 14(1) and (2), were analyzed in terms of intrinsic viscosity [η], Mn, Mw, Mw/Mn, Tm, Tc, Tg, ΔH, ethylene content, EP content, and ΔEP. The analysis is shown in Table 4.

Example 15

(1) Two-Stage Polymerization of Ethylene/Propylene Copolymerization (Former Stage), and Propylene Homopolymerization (Latter Stage)

This two-stage polymerization was carried out in accordance with the method described in Example 14(1) except that an amount of diethyl zinc (organometallic compound (C)) was 0.05 mmol in the former stage. As a result, 15.4 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 15(1) was herein used. As a result, 1.18 g of the CXIS component and 0.82 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 15(1) and (2), were analyzed in terms of intrinsic viscosity [η], Mn, Mw, Mw/Mn, Tm, Tc, Tg, ΔH, ethylene content, EP content, and ΔEP. The analysis is shown in Table 4.

compound (A-4) was added to the autoclave from the pressurization injection machine, and polymerization was performed at 50° C. for 60 minutes. A small amount of ethanol was added to terminate the reaction, and an unreacted monomer was purged. Then, the autoclave was opened, and 500 ml of ethanol and 5 ml of a 1N hydrochloric acid aqueous solution were added. The mixture was stirred at a room temperature for 30 minutes, and a polymer thus deposited was suction filtered. After that, the polymer was sufficiently dried under reduced pressure by the vacuum dryer, and 16.1 g of a mass of two-stage polymerization polymer was obtained.

TABLE 4

| | | | | GPC | | | DSC | | | | NMR | | |
|---|---|---|---|---|---|---|---|---|---|---|---|---|---|
| | | ratio | η (dl/g) | $M_w$ (g/mol) | $M_n$ (g/mol) | $M_w/M_n$ (—) | Tm (° C.) | Tc (° C.) | Tg (° C.) | ΔH (J/g) | $C_2'$ (wt %) | EP (wt %) | ΔEP (%) |
| Example 9 (A-4) | Whole | — | 0.75 | 92,000 | 13,000 | 7.2 | 153.79 | 118.52 | −52.39 | 94.18 | 9.6 | 28.2 | — |
| | CXS | 14.0 | 0.60 | 37,000 | 7,000 | 5.2 | 106.26 | 77.42 | −49.63 | 8.66 | 34.1 | 100.0 | 2 |
| | CXIS | 86.0 | 0.82 | 112,000 | 16,000 | 6.9 | 154.35 | 118.17 | −53.88 | 107.2 | 6.3 | 18.3 | |
| Example 10 (A-4) | Whole | — | 0.97 | 124,000 | 21,000 | 5.9 | 153.90 | 112.74 | −56.01 | 81.05 | 16 | 33.2 | — |
| | CXS | 14.5 | 0.52 | 44,000 | 13,000 | 3.5 | 98.50 | 62.35 | −54.77 | 3.144 | 48.2 | 100.0 | 2 |
| | CXIS | 85.5 | 1.05 | 140,000 | 24,000 | 5.9 | 154.27 | 114.62 | −56.18 | 93.33 | 11.1 | 22.9 | |
| Example 11 (A-4) | Whole | — | 1.42 | 175,000 | 46,000 | 3.8 | 156.02 | 113.39 | −54.49 | 55.27 | — | — | — |
| | CXS | 40.0 | 0.95 | 85,000 | 29,000 | 3.0 | nd | n.d. | −54.76 | n.d. | 52.1 | 100.0 | 1 |
| | CXIS | 60.0 | 1.66 | 237,000 | 42,000 | 5.6 | 156.56 | 117.65 | −58.98 | 93.79 | 11.5 | 22.1 | |
| Example 12 (A-4) | Whole | — | 0.89 | 102,000 | 36,000 | 2.8 | 155.77 | 112.65 | −54.88 | 50.79 | — | — | — |
| | CXS | 47.1 | 0.69 | 61,000 | 21,000 | 3.0 | nd | n.d. | −54.80 | n.d. | 50.6 | 100.0 | 1 |
| | CXIS | 52.9 | 1.12 | 135,000 | 39,000 | 3.5 | 157.15 | 118.73 | −61.82 | 96.96 | 9.7 | 19.2 | |
| Example 13 (A-4) | Whole | — | 1.05 | 131,000 | 37,000 | 3.6 | 155.92 | 115.37 | −47.50 | 56.0 | — | — | — |
| | CXS | 48.4 | 0.57 | 54,000 | 18,000 | 2.9 | n.d. | n.d. | −46.59 | n.d. | 33.9 | 100.0 | 6 |
| | CXIS | 51.6 | 1.52 | 203,000 | 49,000 | 4.1 | 157.11 | 117.90 | −51.95 | 104.1 | 4.1 | 12.1 | |
| Example 14 (A-4) | Whole | — | 1.13 | 138,000 | 52,000 | 2.6 | 155.17 | 115.84 | −33.05 | 54.55 | — | — | — |
| | CXS | 44.5 | 0.78 | 82,000 | 29,000 | 2.8 | nd | n.d. | −31.91 | n.d. | 16.7 | 100.0 | 11 |
| | CXIS | 55.5 | 1.45 | 187,000 | 73,000 | 2.6 | 157.10 | 117.87 | n.d | 97.64 | 1.9 | 11.3 | |
| Example 15 (A-4) | Whole | — | 0.79 | 91,000 | 35,000 | 2.6 | 159.02 | 114.76 | −32.74 | 63.01 | — | — | — |
| | CXS | 41.2 | 0.61 | 65,000 | 20,000 | 3.3 | 53.91 | 2.57 | −30.19 | 18.14 | 14.6 | 100.0 | 9 |
| | CXIS | 58.8 | 0.93 | 111,000 | 48,000 | 2.3 | 156.29 | 119.02 | n.d | 102.8 | 1.6 | 11.0 | |

Example 16

(1) Two-Stage Polymerization of Ethylene/Propylene Copolymerization (Former Stage), and Propylene Homopolymerization (Latter Stage)

Former stage: inside of a 0.4-L autoclave with a stirrer was sufficiently dried. Then, 160 mL of toluene and 20 g of propylene were added, then a temperature was increased to 50° C., and 0.4 MPa (partial pressure) of ethylene was further added. Thereafter, 0.25 mmol of triisobutylaluminum (organometallic compound (C)), 1.00 mL (1.0 mM, 1.0 µmol) of a toluene solution of the transition metal compound (A-5), and 1.00 mL (4.0 mM, 4.0 µmol) of a toluene solution of trityl tetrakis(pentafluorophenyl)borate (activating co-catalyst agent (B)) were added in this order to the autoclave from a pressurization injection machine, and polymerization was performed at 50° C. for 30 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 50 g of propylene was added again. Then the temperature was increased to 50° C. Subsequently, 2.00 mL (1.0 mM, 2.0 µmol) of the toluene solution of the transition metal (2) Solvent Fractionation of Two-Stage Polymerization Polymer This solvent fractionation was carried out in accordance with the method described in Example 1(2) except that the two-stage polymerization polymer synthesized in Example 16(1) was herein used. As a result, 1.19 g of the CXIS component and 0.81 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 16(1) and (2), were analyzed in terms of intrinsic viscosity [η], Mn, Mw, Mw/Mn, Tm, Tc, Tg, ΔH, ethylene content, EP content, and ΔEP. The analysis is shown in Table 5.

Example 17

(1) Two-Stage Polymerization of Ethylene/Propylene Copolymerization (Former Stage), and Propylene Homopolymerization (Latter Stage)

This two-stage polymerization was carried out in accordance with the method described in Example 16(1) except that an amount of the triisobutylaluminum (organometallic compound (C)) in the former stage was set to 0.20 mmol and 0.05 mmol of diethyl zinc (organometallic compound (C)) was added immediately thereafter. As a result, 12.5 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 17(1) was herein used. As a result, 1.41 g of the CXIS component and 0.59 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 17(1) and (2), were analyzed in terms of intrinsic viscosity [η], Mn, Mw, Mw/Mn, Tm, Tc, Tg, ΔH, ethylene content, EP content, and ΔEP. The analysis is shown in Table 5.

Example 18

(1) Two-Stage Polymerization of Ethylene/Propylene Copolymerization (Former Stage), and Propylene Homopolymerization (Latter Stage)

This two-stage polymerization was carried out in accordance with the method described in Example 16(1) except that a polymerization time was carried out for 60 minutes. As a result, 21.9 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 18(1) was herein used. As a result, 0.95 g of the CXIS component and 1.05 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 18(1) and (2), were analyzed in terms of intrinsic viscosity [η], Mn, Mw, Mw/Mn, Tm, Tc, Tg, ΔH, ethylene content, and EP content. The analysis is shown in Table 5.

Example 19

(1) Two-Stage Polymerization of Ethylene/Propylene Copolymerization (Former Stage), and Propylene Homopolymerization (Latter Stage)

This two-stage polymerization was carried out in accordance with the method described in Example 17(1) except that a polymerization time was carried out for 60 minutes. As a result, 17.3 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Example 19(1) was herein used. As a result, 0.95 g of the CXIS component and 1.05 g of the CXS component were obtained.

(3) Structure Analysis of Polymers

The two-stage polymerization polymer (Whole), the CXS component (CXS) and the CXIS component (CXIS) of the two-stage polymerization polymer, which were obtained from the Example 19(1) and (2), were analyzed in terms of intrinsic viscosity [η], Mn, Mw, Mw/Mn, Tm, Tc, Tg, ΔH, ethylene content, EP content, and ΔEP. The analysis is shown in Table 5.

TABLE 5

| | | ratio | GPC | | | | DSC | | | | NMR | | |
| --- | --- | --- | --- | --- | --- | --- | --- | --- | --- | --- | --- | --- | --- |
| | | | $\eta$ (dl/g) | $M_w$ (g/mol) | $M_n$ (g/mol) | $M_w/M_n$ (—) | Tm (° C.) | Tc (° C.) | Tg (° C.) | ΔH (J/g) | $C_2$ (wt %) | EP (wt %) | ΔEP (%) |
| Example 16 | Whole | — | 1.06 | 121,000 | 27,000 | 4.5 | 155.9 | 116.19 | −56.23 | 64.46 | — | — | — |
| (A-5→A-4) | CXS | 40.5 | 1.05 | 92,000 | 28,000 | 3.3 | nd | n.d. | −55.97 | n.d. | 60.3 | 100.0 | 8 |
| | CXIS | 59.5 | 1.18 | 149,000 | 26,000 | 5.8 | 156.78 | 119.06 | n.d. | 113.4 | 3.7 | 6.2 | |
| Example 17 | Whole | — | 0.73 | 81,000 | 25,000 | 3.2 | 156.15 | 177.38 | −57.25 | 76.64 | — | — | — |
| (A-5→A-4) | CXS | 29.5 | 0.66 | 57,000 | 22,000 | 2.6 | nd | n.d. | −57.06 | n.d. | 57.3 | 100.0 | 3 |
| | CXIS | 70.5 | 0.79 | 93,000 | 26,000 | 3.6 | 156.50 | 118.70 | n.d. | 111.7 | 4.9 | 8.6 | |
| Example 18 | Whole | — | 1.05 | 119,000 | 22,000 | 5.3 | 154.64 | 113.08 | −55.57 | 49.58 | — | — | — |
| (A-5→A-4) | CXS | 52.5 | 0.98 | 87,000 | 23,000 | 3.8 | nd | n.d. | −55.61 | n.d. | 60.4 | 100.0 | 3 |
| | CXIS | 47.5 | 0.92 | 149,000 | 19,000 | 7.8 | 155.22 | 118.54 | −63.11 | 104.40 | 8.8 | 14.6 | |
| Example 19 | Whole | — | 0.79 | 82,000 | 23,000 | 3.5 | 155.43 | 113.98 | −57.95 | 52.08 | — | — | — |
| (A-5→A-4) | CXS | 52.6 | 0.69 | 64,000 | 27,000 | 2.3 | nd | n.d. | −57.96 | n.d. | 55.6 | 100.0 | 2 |
| | CXIS | 47.4 | 0.86 | 102,000 | 24,000 | 4.3 | 156.61 | 119.32 | −62.37 | 102.20 | 8.7 | 15.7 | |

Comparative Example 1

(1) Two-Stage Polymerization of Ethylene/Propylene Copolymerization (Former Stage), and Propylene Homopolymerization (Latter Stage)

Former stage: inside of a 3-L autoclave with a stirrer was sufficiently dried, and was vacuumized. After 800 mL of toluene and 100 g of propylene were added, a temperature was increased to 80° C., and 0.4 MPa (partial pressure) of ethylene was further added. Thereafter, 1.00 mmol of triisobutylaluminum (organometallic compound (C)), 0.20 mmol of diethyl zinc (organometallic compound (C)), 1.00 mL (0.1 mM, 0.1 μmol) of a toluene solution of the transition metal compound (a), and 1.00 mL (4.0 mM, 4.0 μmol) of a toluene solution of trityl tetrakis(pentafluorophenyl)borate (activating co-catalyst agent (B)) were added in this order to the autoclave from a pressurization injection machine, and polymerization was performed at 80° C. for 30 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 100 g of propylene was added again. Then the temperature was increased to 80° C. Subsequently, 1.00 mL (0.1 mM, 0.1 μmol) of the toluene solution of the transition metal compound (a) and 1.00 mL (4.0 mM, 4.0 μmol) of the toluene solution of trityl tetrakis(pentafluorophenyl)borate (activating co-catalyst agent (B)) were added in this order to the autoclave from the pressurization injection machine, and polymerization was performed at 80° C. for 30 minutes. A small amount of ethanol was added to terminate the reaction, and an unreacted monomer was purged. Then, the autoclave was opened, and 500 ml of ethanol and 5 ml of a 1N hydrochloric acid aqueous solution were added. The mixture was stirred at a room temperature for 30 minutes, and a polymer thus deposited was suction filtered. After that, the polymer was sufficiently dried under reduced pressure by the vacuum dryer, and 29.0 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer obtained in Comparative Example 1(1) was herein used. As a result, 1.34 g of the CXIS component and 0.66 g of the CXS component were obtained.

(3) Structure Analysis of Polymers

The two-stage polymerization polymer (Whole), the CXS component (CXS) of the two-stage polymerization polymer, and the CXIS component (CXIS) of the two-stage polymerization polymer, which were obtained from the Comparative Example 1(1) and (2), were analyzed in terms of intrinsic viscosity [η], Mn, Mw, Mw/Mn, Tm, Tc, Tg, ΔH, ethylene content, EP content, and ΔEP. The analysis is shown in Table 6.

Comparative Example 2

(1) Two-Stage Polymerization of Propylene Homopolymerization (Former Stage), and Ethylene/Propylene Copolymerization (Latter Stage)

Former stage: inside of a 3-L autoclave with a stirrer was sufficiently dried, and was vacuumized. After 800 mL of toluene and 100 g of propylene were added, a temperature was increased to 80° C. Thereafter, 1.00 mmol of triisobutylaluminum (organometallic compound (C)), 0.25 mmol of diethyl zinc (organometallic compound (C)), 1.00 mL (1.0 mM, 1.0 μmol) of a toluene solution of the transition metal compound (b), and 1.00 mL (4.0 mM, 4.0 μmol) of a toluene solution of trityl tetrakis(pentafluorophenyl)borate (activating co-catalyst agent (B)) were added in this order to the autoclave from a pressurization injection machine, and polymerization was performed at 80° C. for 30 minutes. After polymerization reaction, an unreacted monomer was purged. Then, 2.0 MPa of argon was added, and purging was carried out again. This operation was repeated twice.

Latter stage: the inside of the autoclave was cooled to a room temperature while being kept in an argon atmosphere, and 100 g of propylene was added again. Then the temperature was increased to 50° C., and 0.2 MPa (partial pressure) of ethylene was further added. Subsequently, 1.00 mL (1.0 mM, 1.0 μmol) of the toluene solution of the transition metal compound (b) and 1.00 mL (4.0 mM, 4.0 μmol) of a toluene solution of trityl tetrakis(pentafluorophenyl)borate (activating co-catalyst agent (B)) were added in this order to the autoclave from the pressurization injection machine, and polymerization was performed at 50° C. for 30 minutes. A small amount of ethanol was added to terminate the reaction, and an unreacted monomer was purged. Then, the autoclave was opened, and 500 ml of ethanol and 5 ml of a 1N hydrochloric acid aqueous solution were added. The mixture was stirred at a room temperature for 30 minutes, and a polymer thus deposited was suction filtered. After that, the polymer was sufficiently dried under reduced pressure by the vacuum dryer, and 32.1 g of a mass of two-stage polymerization polymer was obtained.

(2) Solvent Fractionation of Two-Stage Polymerization Polymer

This solvent fractionation was carried out in accordance with the method described in Example 1(2) except that the two-stage polymerization polymer synthesized in Comparative Example 2(1) was herein used. As a result, 0.59 g of the CXIS component and 1.41 g of the CXS component were obtained.

(3) Structure Analysis of Polymers

The two-stage polymerization polymer (Whole), the CXS component (CXS) of the two-stage polymerization polymer and the CXIS component (CXIS) of the two-stage polymerization polymer, which were obtained from the Comparative Example 2(1) and (2), were analyzed in terms of intrinsic viscosity [η], Mn, Mw, Mw/Mn, Tm, Tc, Tg, ΔH, ethylene content, EP content, and ΔEP. The analysis is shown in Table 6.

TABLE 6

|  |  | ratio | η (dl/g) | GPC | | | DSC | | | | NMR | | |
|---|---|---|---|---|---|---|---|---|---|---|---|---|---|
|  |  |  |  | $M_w$ (g/mol) | $M_n$ (g/mol) | $M_w/M_n$ (—) | Tm (° C.) | Tc (° C.) | Tg (° C.) | ΔH (J/g) | $C_2$ (wt %) | EP (wt %) | ΔEP (%) |
| Comparative Example 1 | Whole | — | 3.22 | 412,000 | 139,000 | 3.0 | 155.42 | 115.21 | −45.58 | 67.26 | — | — | — |
|  | CXS | 33.0 | 4.86 | 608,000 | 213,000 | 2.9 | — | — | — | — | 34.5 | 100.0 | 10 |
|  | CXIS | 67.0 | 2.63 | 347,000 | 125,000 | 2.8 | 156.1 | 116.0 | −4.8 | 102.6 | 0.5 | 1.3 |
| Comparative Example 2 | Whole | — | 2.17 | 218,000 | 63,000 | 3.5 | 150.09 | 105.94 | −57.18 | 23.89 | — | — | — |
|  | CXS | 70.5 | 2.69 | 272,000 | 106,000 | 2.6 | n.d. | n.d. | −57.46 | n.d. | 45.7 | 100.0 | 3 |
|  | CXIS | 29.5 | 0.70 | 69,000 | 25,000 | 2.8 | 152.3 | 115.68 | n.d. | 102.2 | 1.0 | 2.2 |

The EP contents of the CXIS components in the two-stage polymerization polymers obtained in Examples 1 through 19 are all larger than those in the two-stage polymerization polymers obtained in Comparative Examples 1 and 2. This indicates that an amorphous EP segment, which will be to be extracted as a CXS component if it exists solely, more exists as an insoluble component in a CXIS component due to a property of a crystalline $^i$PP segment which is chemically connected to the EP segment. That is, a generation efficiency of olefin block polymer is higher in the two-stage polymerization polymers obtained in Examples 1 through 19 than in the two-stage polymerization polymers obtained in Comparative Examples 1 and 2.

INDUSTRIAL APPLICABILITY

According to a method of the present invention for producing an olefin block polymer, it is possible to manufacture the olefin block polymer with a high productivity, and therefore the method is industrially highly valuable.

The invention claimed is:
1. A method for producing an olefin block polymer, the method comprising:
   polymerizing olefins using a polymerization catalyst (X) and an organometallic compound (C) containing an atom of any of Groups 2, 12, and 13 of the periodic table of the elements, the organometallic compound (C) excluding an activating co-catalyst agent (B),
   wherein the polymerization catalyst (X) is formed by bringing a transition metal compound (A) into contact with the activating co-catalyst agent (B), and the transition metal compound (A) is represented by the following general formula (1),

[Chem. 1]

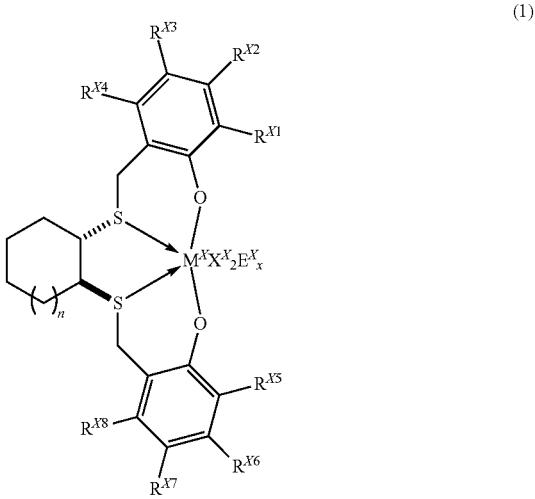

(1)

where
n is 1, 2, or 3;
$M^X$ represents a titanium atom, a zirconium atom, or a hafnium atom;
$R^{X1}$ to $R^{X8}$ are independently:
  a hydrogen atom,
  a halogen atom,
  an alkyl group having 1 to 20 carbon atoms,
  a cycloalkyl group having 3 to 10 ring carbon atoms,
  an alkenyl group having 2 to 20 carbon atoms,
  an alkynyl group having 2 to 20 carbon atoms,
  an aralkyl group having 7 to 30 carbon atoms,
  an aryl group having 6 to 30 carbon atoms,
  an alkoxy group having 1 to 20 carbon atoms,
  an aralkyloxy group having 7 to 30 carbon atoms,
  an aryloxy group having 6 to 30 carbon atoms,
  a substituted silyl group, or
  a heterocyclic compound residue having 3 to 20 ring carbon atoms;
the alkyl groups, the cycloalkyl groups, the alkenyl groups, the alkynyl groups, the aralkyl groups, the aryl groups, the alkoxy groups, the aralkyloxy groups, the aryloxy groups, and the heterocyclic compound residues represented by $R^{X1}$ to $R^{X8}$ each optionally have a substituent;

notwithstanding the above definitions of $R^{X1}$ to $R^{X8}$, each of the following pairs, $R^{X1}$ and $R^{X2}$, $R^{X2}$ and $R^{X3}$, $R^{X3}$ and $R^{X4}$, $R^{X5}$ and $R^{X6}$, $R^{X6}$ and $R^{X7}$, and $R^{X7}$ and $R^{X8}$, are optionally linked to each other to form a ring optionally having a substituent;

each $X^X$ is independently:
  a hydrogen atom,
  a halogen atom,
  an alkyl group having 1 to 20 carbon atoms,
  a cycloalkyl group having 3 to 10 ring carbon atoms,
  an alkenyl group having 2 to 20 carbon atoms,
  an aralkyl group having 7 to 30 carbon atoms,
  an aryl group having 6 to 30 carbon atoms,
  an alkoxy group having 1 to 20 carbon atoms,
  an aralkyloxy group having 7 to 30 carbon atoms,
  an aryloxy group having 6 to 30 carbon atoms,
  a substituted silyl group having 1 to 20 carbon atoms,
  a substituted amino group having 1 to 20 carbon atoms,
  a substituted thiolate group having 1 to 20 carbon atoms, or
  a carboxylate group having 1 to 20 carbon atoms;

the alkyl group, the cycloalkyl group, the alkenyl group, the aralkyl group, the aryl group, the alkoxy group, the aralkyloxy group, the aryloxy group, and the carboxylate group represented by $X^X$ optionally have a substituent;

$X^X$ groups are optionally linked to each other to form a ring;

$E^X$ is independently a neutral Lewis base, and the subscript x representing the number of $E^X$ groups is 0, 1, or 2; when the subscript x is 2, the $E^X$ groups are the same or different, the activating co-catalyst agent (B) is selected from among an organoaluminumoxy compound (B-1), an organoboron compound (B-2), a zinc co-catalyst component (B-3), and ion-exchange layered silicate (B-4), wherein the olefin block polymer is an ethylene/propylene copolymer composition that satisfies the following requirements (1) through (5):
(1) $EP_{CXIS} \geq 3.0$ wt %;
(2) $\Delta EP \leq 20\%$;
(3) $15.0 \geq M_w/M_n \geq 1.7$;
(4) ($T_m$ of the ethylene/propylene copolymer composition)$\geq 135°$ C.; and
(5) ($T_g$ of the ethylene/propylene copolymer composition)$\leq -30°$ C. where:

$EP_{CXIS}$ represents an EP (ethylene/propylene random copolymer) content in a room temperature xylene insoluble component;

$\Delta EP$ is an arithmetic mean of absolute values of ratio differences of five triads, excluding PPP (propylene triad), each of the ratio differences being a difference between a ratio of one of the five triads in the room-temperature xylene-insoluble component and a ratio of the triad in the room-temperature xylene-soluble component;

$M_w/M_n$ represents a molecular weight distribution;
$T_m$ represents a melting point; and
$T_g$ represents a glass transition point.

2. The method as set forth in claim 1, wherein:
$R^{X1}$ and $R^{X5}$ are independently:
  a hydrogen atom,
  a halogen atom,
  an alkyl group having 1 to 20 carbon atoms,
  a cycloalkyl group having 3 to 10 ring carbon atoms,
  an aralkyl group having 7 to 30 carbon atoms,
  an alkoxy group having 1 to 20 carbon atoms,
  an aralkyloxy group having 7 to 30 carbon atoms,
  an aryloxy group having 6 to 30 carbon atoms, or
  a substituted silyl group.

3. The method as set forth in claim 1, wherein n is 3.

4. The method as set forth in claim 1, wherein:
the organometallic compound (C) contains an organoaluminum compound and/or an organozinc compound.

5. The method as set forth in claim 4, wherein:
the organometallic compound (C) contains an organoaluminum compound having 3 to 24 carbon atoms and/or an organozinc compound having 2 to 16 carbon atoms.

6. The method as set forth in claim 1, wherein:
the method is multistage polymerization including a plurality of polymerization steps;
any two adjacent polymerization steps differ in the polymerization catalyst (X) to be formed and/or olefin composition; and
in each of the polymerization steps, the olefins are polymerized in the presence of a polymer obtained by the last preceding polymerization step.

7. The method as set forth in claim 6, wherein:
in the multistage polymerization, each polymerization step is carried out in the same reaction vessel or the same reaction zone in the presence of a polymer produced by the last preceding polymerization step.

8. The method as set forth in claim 6, wherein:
the multistage polymerization is two-stage polymerization, wherein the former stage and the latter stage differ in the polymerization catalyst (X) to be formed and/or olefin composition; and the olefins are polymerized in the presence of a polymer obtained by the last preceding polymerization step.

9. The method as set forth in claim 8, wherein:
the former stage and the latter stage of the two-stage polymerization differ in olefin composition.

10. The method as set forth in claim 9, wherein:
copolymerization of two or more olefins is carried out in one of the former stage and the latter stage of the two-stage polymerization; and
homopolymerization of one olefin is carried out in the other one of the former stage and the latter stage.

11. The method as set forth in claim 10, wherein:
copolymerization of ethylene and propylene is carried out in one of the former stage and the latter stage of the two-stage polymerization; and
homopolymerization of propylene is carried out in the other one of the former stage and the latter stage.

12. An ethylene/propylene copolymer composition that satisfies the following requirements (1) through (5):
(1) $EP_{CXIS} \geq 3.0$ wt %;
(2) $\Delta EP \leq 20\%$;
(3) $15.0 \geq M_w/M_n \geq 1.7$;
(4) ($T_m$ of the ethylene/propylene copolymer composition)$\geq 135°$ C.; and
(5) ($T_g$ of the ethylene/propylene copolymer composition)$\leq -30°$ C. where:

$EP_{CXIS}$ represents an EP (ethylene/propylene random copolymer) content in a room temperature xylene insoluble component;

$\Delta EP$ is an arithmetic mean of absolute values of ratio differences of five triads, excluding PPP (propylene triad), each of the ratio differences being a difference between a ratio of one of the five triads in the room-temperature xylene-insoluble component and a ratio of the triad in the room-temperature xylene-soluble component;

$M_w/M_n$ represents a molecular weight distribution;
$T_m$ represents a melting point; and
$T_g$ represents a glass transition point.

13. The ethylene/propylene copolymer composition as set forth in claim 12, wherein:

$T_g$ assigned to an EP segment in a CXIS component after fractionation with a solvent $\leq -30°$ C.

14. The ethylene/propylene copolymer composition as set forth in claim 12, wherein $\Delta EP \leq 9\%$.

15. The ethylene/propylene copolymer composition as set forth in claim 12, wherein $\Delta EP \leq 5\%$.

16. The ethylene/propylene copolymer composition as set forth in claim 12, wherein $\Delta EP \leq 3\%$.

17. The ethylene/propylene copolymer composition as set forth in claim 12, wherein Tg of the ethylene/propylene copolymer composition $\geq -45°$ C.

* * * * *